US007809732B2

(12) United States Patent
Kusama et al.

(10) Patent No.: US 7,809,732 B2
(45) Date of Patent: Oct. 5, 2010

(54) METHOD, APPARATUS, AND STORAGE MEDIA FOR IMAGE PROCESSING

(75) Inventors: Kiyoshi Kusama, Kanagawa-ken (JP); Kentaro Matsumoto, Tokyo (JP); Miyuki Enokida, Kanagawa-ken (JP); Kunihiro Yamamoto, Kanagawa-ken (JP); Yasuo Fukuda, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 549 days.

(21) Appl. No.: 10/628,407

(22) Filed: Jul. 29, 2003

(65) Prior Publication Data
US 2004/0022453 A1 Feb. 5, 2004

Related U.S. Application Data

(62) Division of application No. 09/366,767, filed on Aug. 4, 1999, now Pat. No. 6,633,685.

(30) Foreign Application Priority Data

| Aug. 5, 1998 | (JP) | 10-221981 |
| Aug. 31, 1998 | (JP) | 10-246295 |
| Sep. 8, 1998 | (JP) | 10-253802 |
| Nov. 25, 1998 | (JP) | 10-333772 |
| Jan. 6, 1999 | (JP) | 11-001102 |

(51) Int. Cl.
*G06F 7/00* (2006.01)
(52) U.S. Cl. .................. 707/749; 707/756; 352/282; 352/284
(58) Field of Classification Search .......... 707/104.1, 707/3.1, 10, 100, 200, 2, 5, 999.007, 999.004; 382/284, 299
See application file for complete search history.

(56) References Cited

U.S. PATENT DOCUMENTS

| 3,976,982 | A | * | 8/1976 | Eiselen | 382/284 |
| 4,760,385 | A | * | 7/1988 | Jansson et al. | 345/641 |
| 4,984,013 | A | | 1/1991 | Terashita | 355/38 |
| 5,313,636 | A | * | 5/1994 | Noble et al. | 1/1 |

(Continued)

FOREIGN PATENT DOCUMENTS

JP 6-189090 7/1994

OTHER PUBLICATIONS

Masatsugu Kidode et al., "Multi-media Databases in Image Information Processing," Information Processing, Information Processing Society of Japan, Jun. 15, 1987, vol. 28, No. 6, pp. 756-764 (in Japanese with partial English translation).

*Primary Examiner*—Hosain T Alam
*Assistant Examiner*—Eliyah S Harper
(74) *Attorney, Agent, or Firm*—Fitzpatrick, Cella, Harper & Scinto

(57) ABSTRACT

To generating a mosaic image by combining a plurality of material images, an original image is divided into tiles and a material image having a characteristic similar to that of an image in each tile is applied to the tile. If more than one version of image data having different resolutions is provided as the image data for the material image, a low-resolution version of the image data is used to calculate a characteristic quantity of the image. Thus, the amount of time required to generate the mosaic image can be reduced.

13 Claims, 43 Drawing Sheets

U.S. PATENT DOCUMENTS

| | | | |
|---|---|---|---|
| 5,325,449 A * | 6/1994 | Burt et al. | 382/240 |
| 5,617,224 A * | 4/1997 | Ichikawa et al. | 358/530 |
| 5,652,881 A * | 7/1997 | Takahashi et al. | 707/104.1 |
| 5,991,444 A * | 11/1999 | Burt et al. | 382/232 |
| 6,021,256 A * | 2/2000 | Ng et al. | 358/1.9 |
| 6,075,905 A * | 6/2000 | Herman et al. | 382/284 |
| 6,134,347 A * | 10/2000 | Niwamoto | 382/166 |
| 6,137,498 A * | 10/2000 | Silvers | 345/629 |
| 6,175,663 B1 * | 1/2001 | Huang | 382/284 |
| 6,182,127 B1 * | 1/2001 | Cronin et al. | 709/219 |
| 6,205,246 B1 | 3/2001 | Usami | 382/167 |
| 6,249,613 B1 | 6/2001 | Crinon et al. | 382/236 |
| 6,259,828 B1 | 7/2001 | Crinon et al. | 382/305 |
| 6,704,654 B2 * | 3/2004 | Carroll et al. | 702/5 |
| 7,421,154 B2 * | 9/2008 | Kinjo | 382/305 |
| 7,539,666 B2 * | 5/2009 | Ashworth et al. | 1/1 |
| 7,565,028 B2 * | 7/2009 | Saed | 382/284 |

* cited by examiner

DATA=1000
ID=1  R=100  G=212  B= 0
ID=2  R=  2  G= 30  B=80
ID=3  R=255  G=  0  B= 0

| TILE NUMBER | OFFSET | SIZE | FORMAT |
|---|---|---|---|
| 0 | 0 | 1024 | JPEG |
| 1 | 1024 | 32 | LINK |
| 2 | 1056 | 32 | LINK |
| 3 | 1088 | 32 | LINK |

4901

4902

HEADER

+0
+1024  C:\tmp\image1, 1
+1056  E:\images\image2, 2
+1088  http://www.abc/image3, 3

4900 IMAGE DATA FILE

REFERENCE NUMBER 601 INDICATES THE ENTIRE IMAGE AND EACH OF NUMBER 602 TO 605 INDICATES A QUARTER IMAGE

METHOD, APPARATUS, AND STORAGE MEDIA FOR IMAGE PROCESSING

CROSS-REFERENCE TO RELATED APPLICATION

This application is a division of application Ser. No. 09/366,767, filed Aug. 4, 1999.

BACKGROUND OF THE INVENTION

1. Field of Invention

The present invention relates to a method, apparatus, and storage media for image processing.

2. Background of the Invention

A mosaic technique is known which generates a mosaic image by combining, like tiles, material images. The color of each part of the resulting mosaic image is represented by that of each material image. A vast amount of processing time and memory is required for calculating the average density of a mosaic image if the resolution of its original image or material image is high or the size of the original image is very large in generating images using a mosaic technique. Furthermore, a large amount of time is required to transform an image into a desired size during positioning.

In a network system to which a remote server for generating mosaic images is connected, if a client requests the remote server to generate a mosaic image using material images contained in the client, the client must send them to the server. The client cannot prevent a possible unauthorized use of the material images sent to the server.

Because a mosaic image is created by combining material images, the resulting mosaic image redundantly contains images contained in those material images. Thus, a large amount of storage area is required to contain the mosaic image.

SUMMARY OF THE INVENTION

In view of the problems mentioned above, it is an objective of the present invention to provide an image processing apparatus and method which allow a mosaic image to be generated at higher speed with a small amount of memory.

It is another objective of the present invention to provide an image processing apparatus and method which prevent an unauthorized use of material images even if the mosaic image generation is performed in a remote server. To achieve these objectives, the present invention provides a method that comprises holding first information including a characteristic quantity of each of a plurality of material images by an image processing apparatus, the first information corresponds to each of the plurality of material images and has an amount of information less than that of each of the plurality of material images. Selected material images and their positions are determined according to an original image and the first information by the image processing apparatus, and the plurality of material images are stored in an image storage apparatus. The selected material images determined in the determining step are then outputted out of the plurality of material images stored in the storage apparatus according to the position determined in the determining step.

As an alternative, there is provided a method that selecting a material image from a plurality of material images stored in a image storage apparatus and then combining the selected material images to generate a mosaic image in imitation of an original image, according to a characteristic of an original image. The method comprises holding information including a characteristic of each of the plurality of material images, determining selected material images according to the original image and the information, and outputting information indicating the selected material images determined in the determining step to the image storage apparatus.

Preferably, image data whose resolution is most suitable for the segment is fitted into the segment.

Alternately, according to the present invention, material images are provided in a server and scale-down images of the material images are distributed to a client. The client determines material images to be applied as the tiles of a mosaic image based on a characteristic quantity such as the average density of their scale-down images and communicates the determined material images and their position to the server. The server combines the material images to generate the mosaic image in accordance with the position information provided by the client and output it.

Preferably, instead of scale-down images, characteristic parameters are distributed to the client in advance which represent the characteristics of each material image. The client uses these characteristic parameters to determine the position of the material images. Material images held by the server are divided into a plurality of databases according to their type or the like. The user can generate a mosaic image with material images of a desired motif by specifying databases to be used.

Alternately, according to the present invention, an image database is provided in the server and scale-down images or characteristic parameters of images contained in the database are provided. The user inputs an image to be retrieved to the client. The client calculates a characteristic quantity of the input image and compares it with the characteristic quantity of scale-down images or a predetermined characteristic quantity to obtain a similitude. The client determines the identifier of an image whose similitude exceeds a predetermined threshold and obtains the image corresponding to the identifier from the server. This is applicable to the case where the similitude of the two images is high enough to exceed the threshold. An image whose similitude is below the predetermined threshold may be determined as a similar image if the similitude of the two images is low.

Alternately, according to the present invention, the client sends, instead of images themselves, the characteristic quantity of material images based on the characteristic quantity and an original image to the server. The server determines the position of the material images based on the characteristic quantity and returns it to the client. The client fits the material image held by the client into each tile of the original image according to the position information sent from the server to generate an image.

Alternately, according to the present invention, a plurality of partial images are combined to generate an integrated image. The image data file generated contains image data of partial images constituting the integrated image. Or, it contains link information for referencing to the image data. An increase in data amount can be prevented because the data file is configured to contain no image data. Alternately, according to the present invention, the client sends a request to the server based on the identifier of a duplicated image in a situation where the whole-image file stored on the server contains the identifier and the duplicated image file which is an entire or partial duplication of its original image file is on the client. Thus, the original image file on the server and the duplicated image file on the client can be viewed as the same file and information concerning original image file on the server can easily be retrieved.

Preferably, if the original image is updated at the time when the client requests information concerning the original image, a new duplicated image is generated from the updated original image and delivered to the client.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 shows an example of material image position information;

FIG. 24 shows an example of an image characteristic quantity of a material image;

FIG. 25 shows an example of an image characteristic quantity of each tile of an original image;

FIG. 32 shows an example of the data structure of an image data file according to the sixth embodiment;

DETAILED DESCRIPTION OF THE PREFERRED EMBODIMENTS

Figure 1:
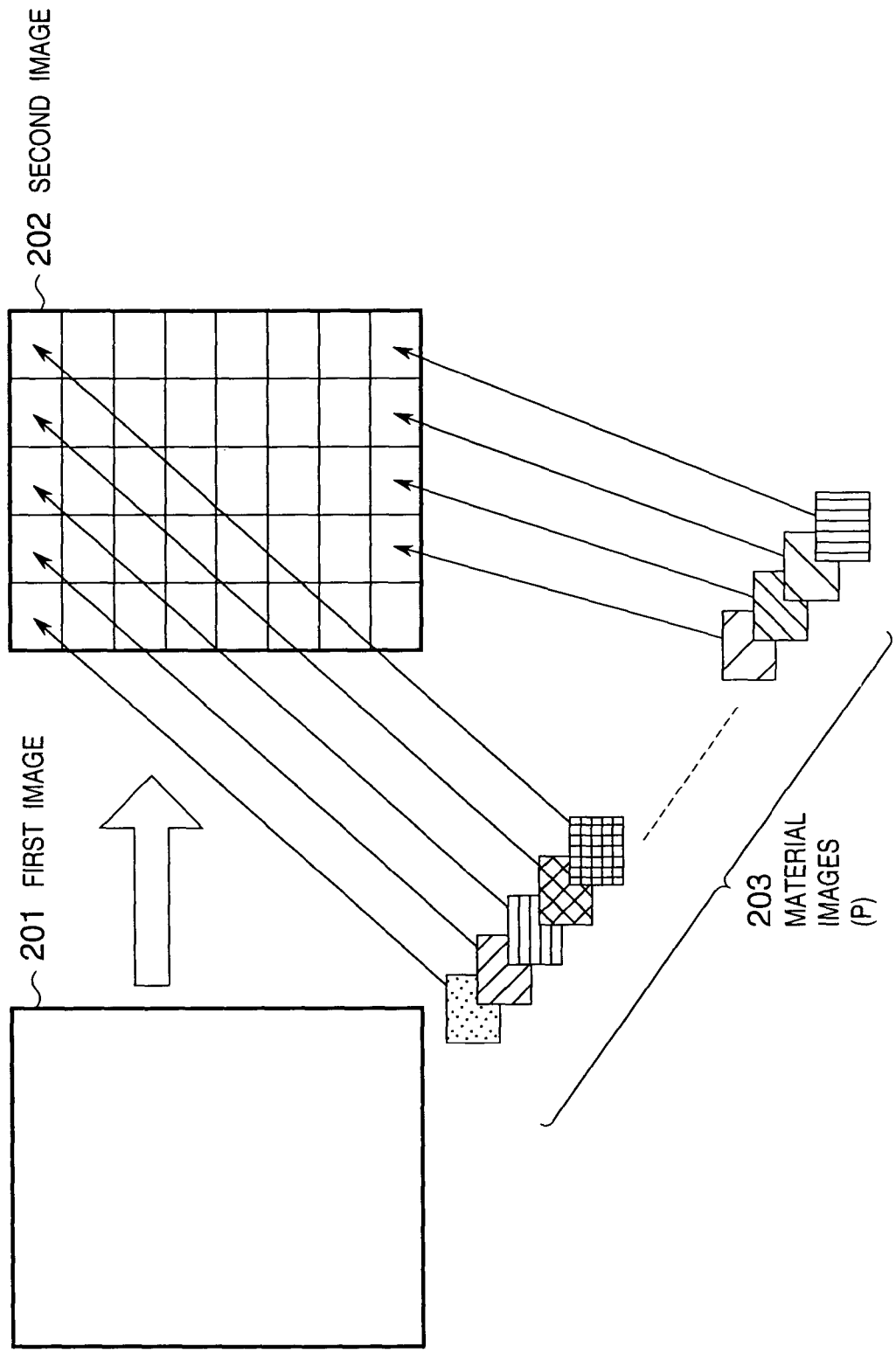
FIG. 1 shows the relationship between images used in a mosaic technique.

First, an overview of the embodiments of the invention described herein is provided.

First Embodiment

A multi-resolution image is used as a material image constituting a mosaic image. A multi-resolution image is an image for which more than one item of image data that has different resolutions is provided for a single image. The mosaic image is generated by dividing an original image to be presented as a mosaic image into a plurality of segments (tiles) and an appropriate material image is applied to each segment. In selecting a material image to be applied to a segment, the distance between the average density of the original image contained in the segment and the average density of each material image is determined. A material image that has the closest distance is then fitted into the segment. Since each material image is a multi-resolution image, the lowest-resolution image data of each material image is used to calculate the average density in selecting a material image.

Second Embodiment

According to a second embodiment, a mosaic image is generated in a way substantially similar to the first embodiment. Material image is scaled up or down according to the size of a segment in the first embodiment, whereas, in the second embodiment image data whose resolution is most suitable for the segment is fitted into the segment.

Third Embodiment

According to a third embodiment, material images are provided in a server and scale-down images of those material images are distributed to a client. The client determines material images to be applied as tiles of a mosaic image based on a characteristic quantity such as the average density of their scale-down images and communicates the determined material images and their position to the server. The server combines the material images to generate the mosaic image in accordance with the position information provided by the client and output it.

As a variation of the third embodiment, a technique is disclosed where, instead of a scale-down image, a characteristic parameter representing each material image is distributed to the client. The client uses the characteristic parameter to determine the position of the material images. Another technology is disclosed in which material images contained in the server are divided into a plurality of databases according to their type or the like. The user can generate a mosaic image with material images of a desired motif by specifying a database to be used.

Fourth Embodiment

In a fourth embodiment, an image retrieval system is disclosed. In this system, an image database is provided in the server and scale-down images or characteristic parameters of images contained in the database are provided. The user inputs an image to be retrieved to the client. The client calculates a characteristic quantity of the input image and compares it with the characteristic quantity of scale-down images or a predetermined characteristic quantity to obtain a similitude. The client determines the identifier of an image whose similitude exceeds a predetermined threshold and obtains an image corresponding to the identifier from the server. This is applicable to the case where the high similitude of the two images means much similarity. In the case where the high similitude of the two images means less similarity, an image whose similitude is below the predetermined threshold may be determined as a similar image.

Fifth Embodiment

According to a fifth embodiment, the client sends, instead of images themselves, the characteristic parameters of material images and an original image to the server. The server determines the position of the material images based on the characteristic quantity and returns it to the client. The client fits the material image held by the client into each tile of the original image according to the position information sent from the server to generate an image.

Sixth Embodiment

According to an image generation system of a sixth embodiment, a plurality of partial images are combined to generate an integrated image. The image data file generated contains image data of partial images constituting the integrated image. Or, it contains link information for referencing to the image data. An increase in data amount can be prevented because the data file is configured to contain no image data.

Seventh Embodiment

According to a seventh embodiment, the client sends a request to the server based on the identifier of a duplicated image in a situation where the whole-image file stored on the server contains the identifier and the duplicated image file which is an entire or partial duplication of its original image file is on the client. Thus, the original image file on the server and the duplicated image file on the client can be viewed as the same file and information concerning original image file on the server can easily be retrieved.

Eighth Embodiment

In an eighth embodiment, a system similar to that of the seventh embodiment is disclosed. According to the eighth embodiment, if the original image is updated at the time when the client requests information concerning the original image, a new duplicated image is generated from the updated original image and delivered to the client.

Detailed description of the embodiments will be presented below in order from the first to the eighth.

First Embodiment

FIG. 1 shows the relationship among a first image (referred to as an original image) 201, a second image (referred to as a mosaic image) 202, and material images 203 used in a mosaic image generation process.

In FIG. 1, the first image 201 is a design or an image on which to base an image construction using the mosaic technique. In generating the mosaic image, the original image is divided into segments of an appropriate size. Each segment is referred to as a tile in some cases in the following description.

The second image 202 is constructed with a plurality of small images using the mosaic technique.

The material images 203 are used for constructing the second image 202. The number P of material images 203 is large enough to provide variations of colors and textures which is typically required to construct the second image 202.

It is assumed herein that the size of each of the P material images is the same as the tile for explanation. However, the size of each material image need not be the same size as the tile and all of the P material images need not be of the same size either.

Figure 2:
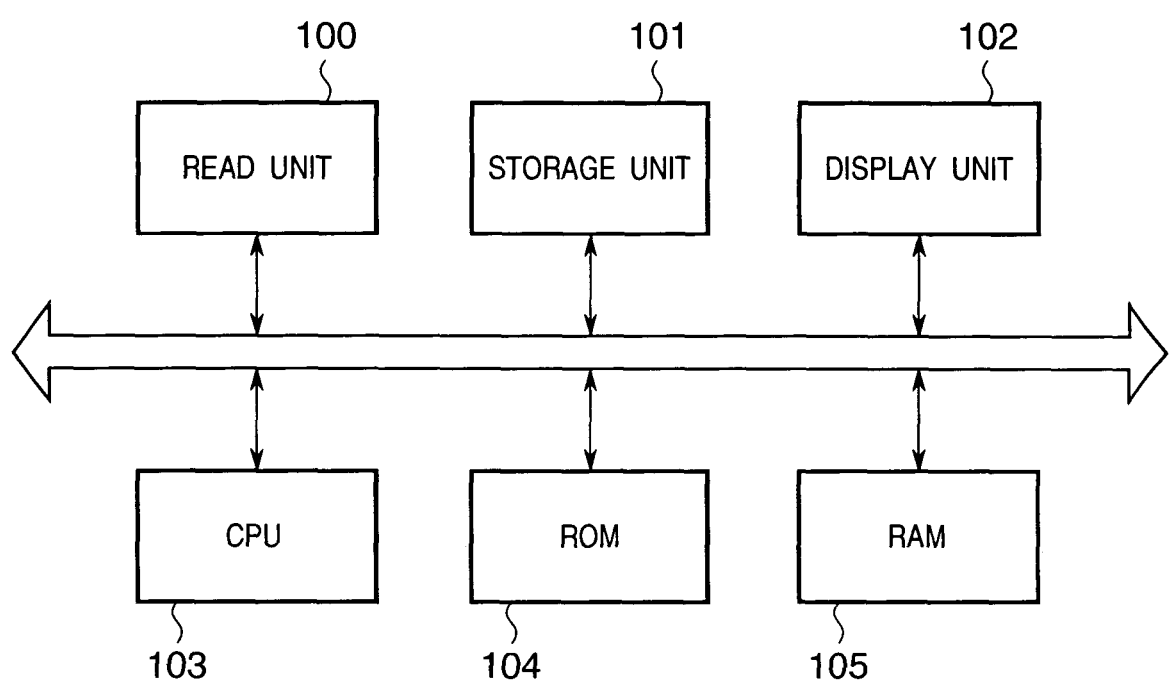
FIG. 2 shows a block diagram of the configuration of an apparatus for generating a mosaic image according to a first embodiment.

FIG. 2 shows a block diagram of the configuration of a mosaic generation apparatus according to the first embodiment of the invention.

A read unit 100 reads an image through a device such as a scanner. A storage unit 101 stores the image. Typically, a database is used as the storage unit 101. A display unit 102 displays the image stored in the storage unit 101 or read by the read unit 100.

ROM 104 stores a program and data used in the program for implementing processes shown in the flowcharts of FIGS. 3 and 5 which will be described bellow, according to the present embodiment.

RAM 105 is used as a working area for implementing processes shown in the flowcharts of FIGS. 3 and 5 which will be described bellow, by using a CPU 103.

Figure 3:
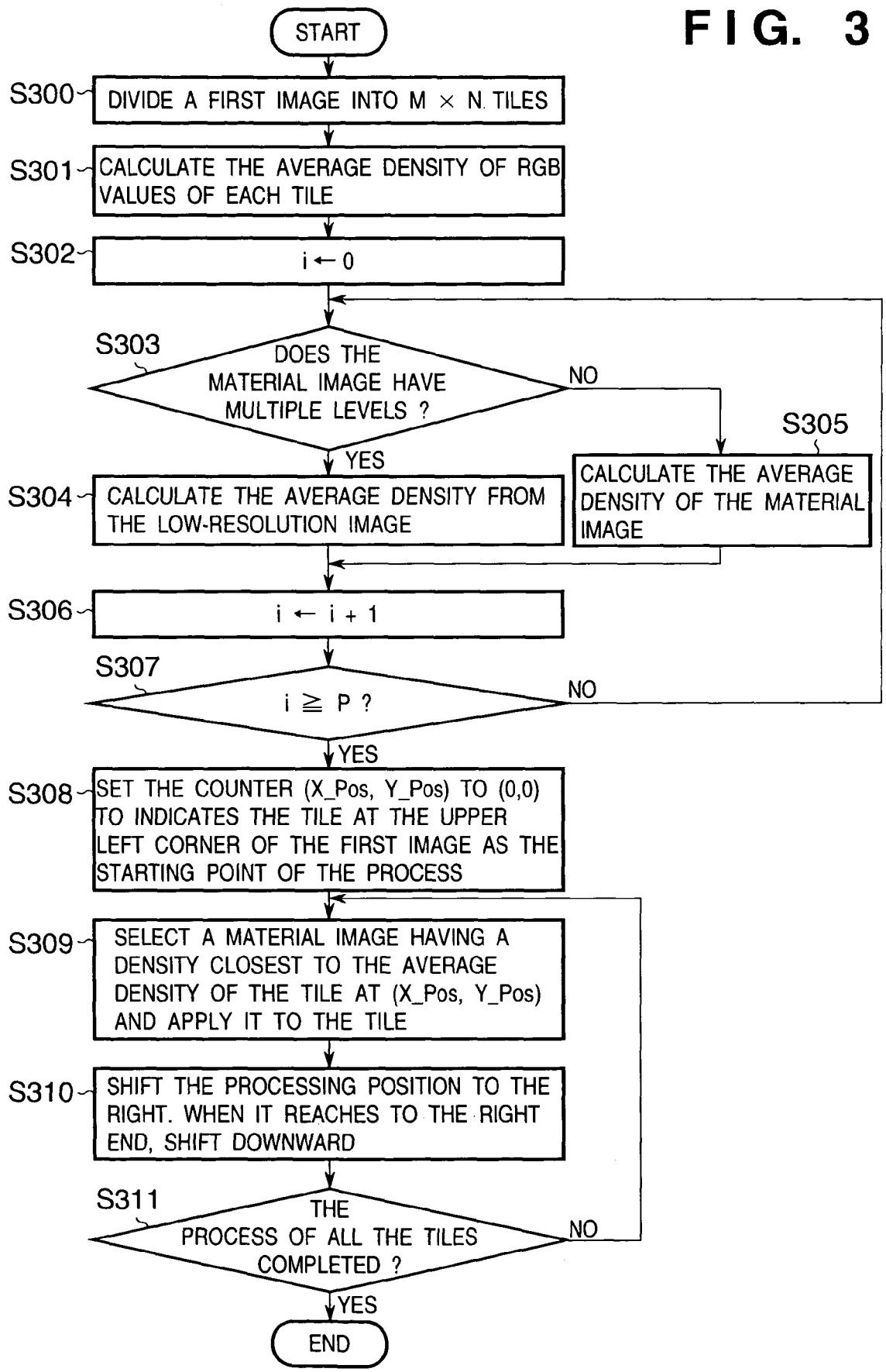
FIG. 3 shows a flowchart of an operation for generating a mosaic image according to the first embodiment.
Figure 5:
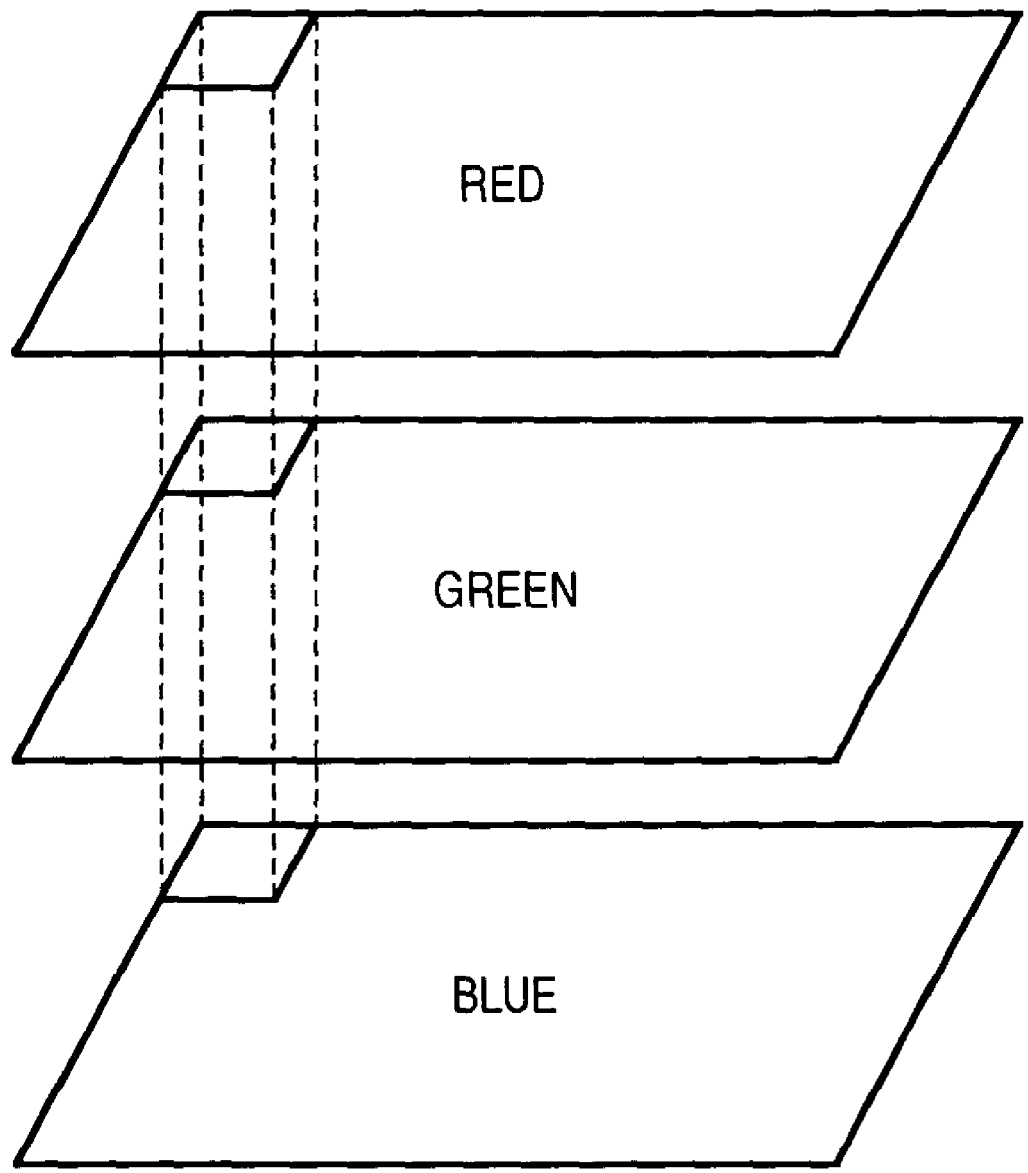
FIG. 5 shows the construction of each tile.

The CPU 103 executes programs stored in the ROM 104 to implement processes shown in the flowcharts shown in FIGS. 3 and 5 by using the RAM 105 as a working area, and also controls the entire mosaic image generation apparatus. Besides these components, various components are provided in the mosaic image generation apparatus of the first embodiment, although the description of which is omitted since they are not important for the description of the present embodiment.

Now, an operation for generating a mosaic image in the mosaic image generation apparatus configured as described above will be described with reference to FIGS. 2 and 3.

FIG. 3 is a flowchart showing mosaic image generation method according to the embodiment of the present invention. Each step is performed by the CPU 103.

At step S300, a first image (original image) which is read by the read unit 100 and stored in the RAM 105 is divided into M×N tiles. In the description of this embodiment, M=4 and N=5 by way of example. As the result of the division, M×N rectangular tiles TL (0, 0), TL(0, 1), TL(0, 2) . . . , TL(M−1, N−2), TL(M−1, N−1) are generated.

Figure 4:
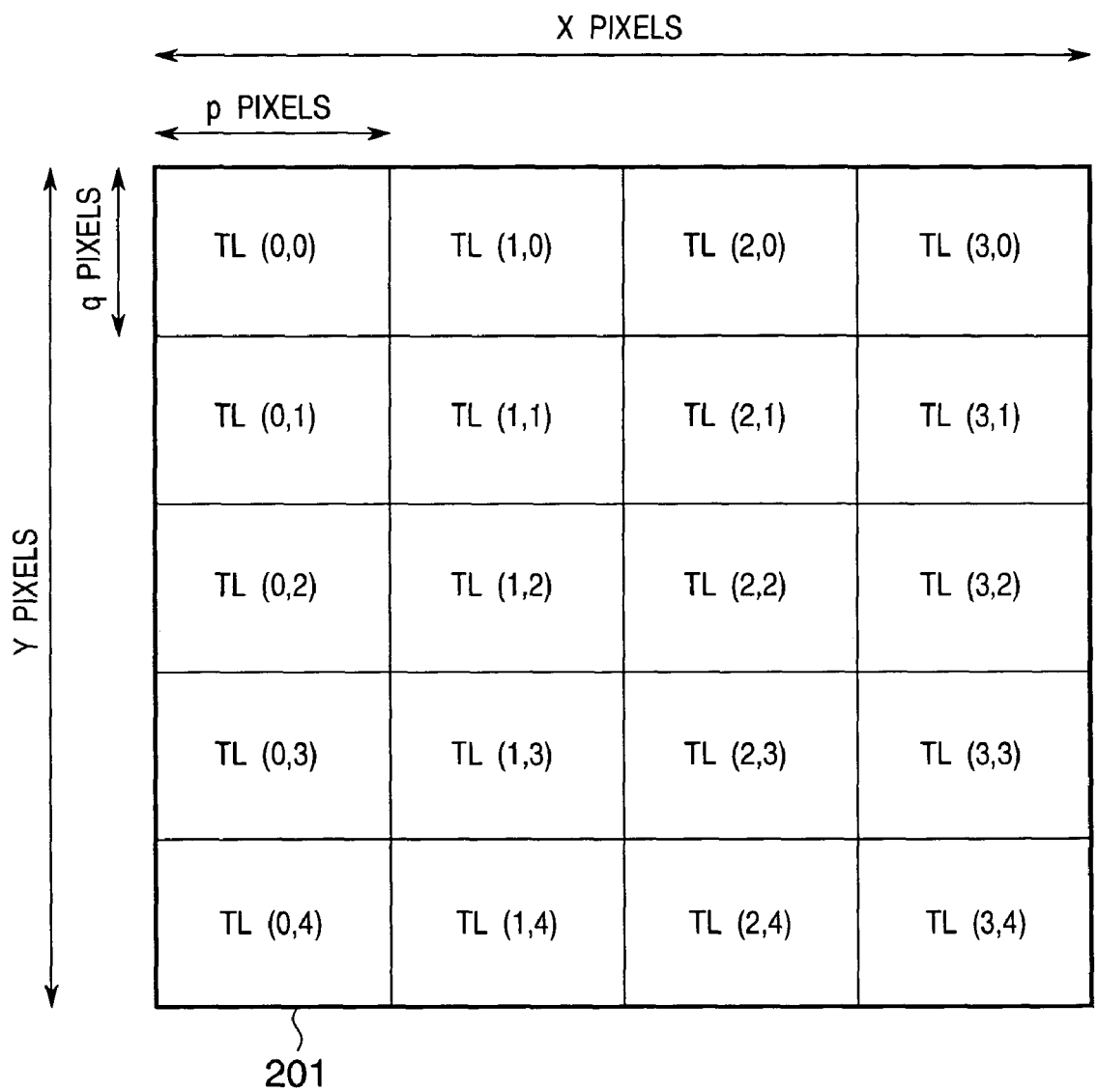
FIG. 4 shows a first image which is divided into M N rectangles.

FIG. 4 shows the first image divided into 4×5 rectangles. In FIG. 4, "X" and "Y" represent the number of pixels in the first image 201 along the horizontal and vertical axes, respectively. The letters "p" and "q" represent the number of pixels in each tile along the horizontal and vertical axes, respectively, where the first image is divided into 4×5 rectangular tiles of the same size, TL(0, 0), TL(0, 1), TL(0, 2) . . . , TL(3, 3), TL(3, 4). Thus, the relationship $$X = p \times M, Y = q \times N$$

is yielded.

FIG. 5 shows the construction of each tile. Each tile breaks down into p×q pixels for each component color: red (R), green (G), and blue (B).

At the step S301 in FIG. 3, the average density of the RGB is calculated for each of the N×M tiles j on the memory which was divided at step S300, as follows:

$$Rd\_av_j = 1/(p*q) \cdot \Sigma Rj$$

$$Gd\_av_j = 1/(p*q) \cdot \Sigma Gj$$

$$Bd\_av_j = 1/(p*q) \cdot \Sigma Bj.$$

The calculated values are stored in the RAM 105.

Here, d is the "destination." $\Sigma Rj$, $\Sigma Gj$, and $\Sigma Bj$ are the sum of pixel values of R, G, and B, respectively, contained in the tile j.

At step S302, a counter i which indicates a material image of interest is initialized to "0," in order to calculate the average density of each of the P material images stored in the storage unit 101. The counter i is preferably a register in the CPU 103.

At step S303, it is determined whether the ith material image has multiple resolutions. If so, the average density is calculated from a low-resolution image at step S304. The calculated value is stored in the RAM 105.

Figure 6:
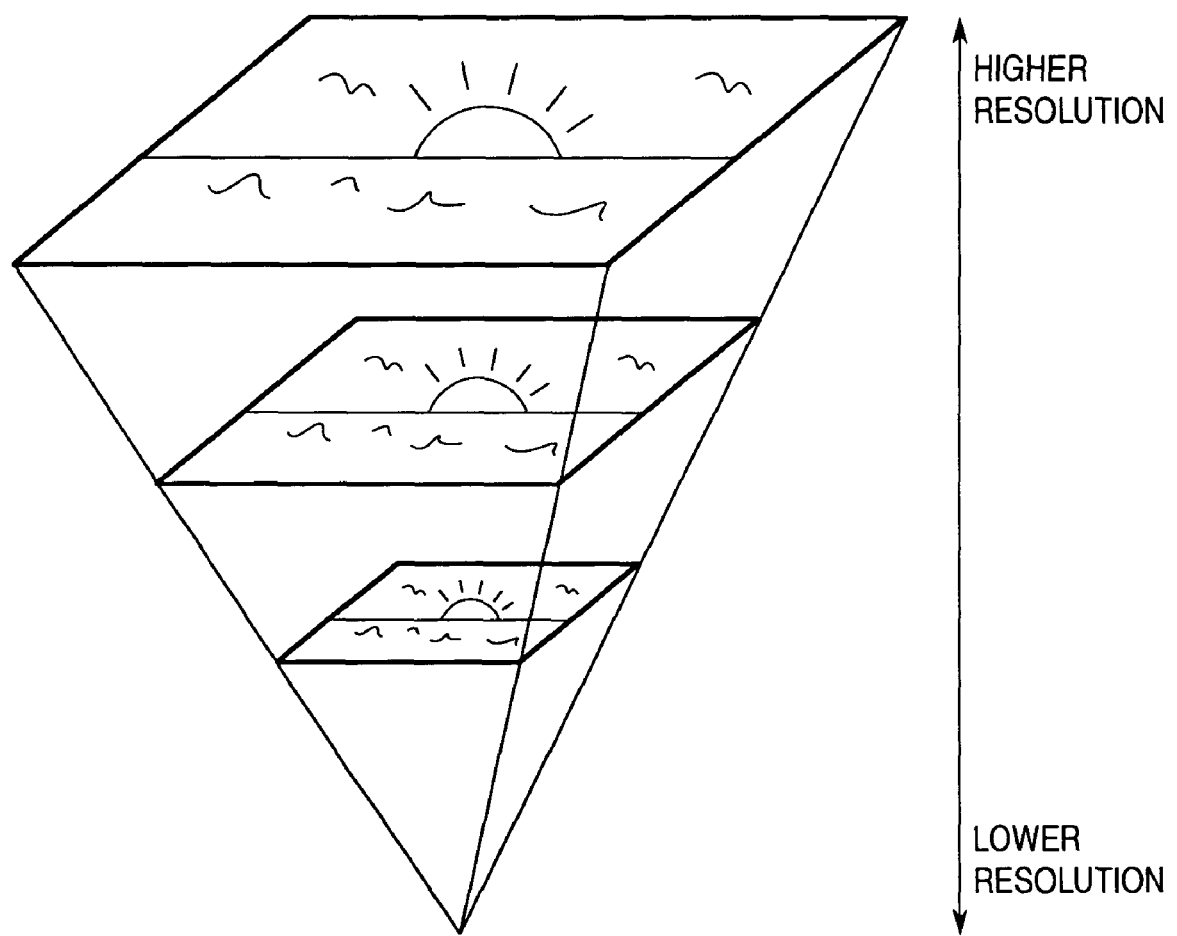
FIG. 6 shows image data having multiple levels.

Here, a multi-resolution is described with reference to FIG. 6.

For image formats, such as FlashPix™ and PhotoCD™, more than one item of image data having different resolutions which represents the same image is contained in a single file. While it is preferable to use image data of higher resolution to provide high-quality printout, low-resolution image data is enough for uses like calculation of average density of images. Therefore, if a material image includes multilevel image data, the average density is calculated from a low-resolution image data. If a material image does not include multi-resolution, the average density is calculated from the material image data itself. The calculated values are stored in the RAM 105. The average density of the material image i is given by the expressions:

$$Rs\_av_i = 1/(p*q) \cdot \Sigma Ri$$

$$Gs\_av_i = 1/(p*q) \cdot \Sigma Gi$$

$$Bs\_av_i = 1/(p*q) \cdot \Sigma Bi$$

where, s is the "source." $\Sigma Ri$, $\Sigma Gi$, and $\Sigma Bi$ are the sum of pixel values of R, G, and B, respectively, contained in the material image i.

After the average density is calculated, the counter i is incremented by one (step S306).

At the step S307, it is determined whether the average density for all of the P material images is calculated, by comparing the value of the counter i with P. Step S303 and the subsequent steps are repeated until the average density of all the material images is calculated.

Thus, the average density of the material image can be calculated rapidly by using low-resolution data if the material image has multiple levels.

At step S308, counters X_Pos (0≦X_Pos≦M−1), Y_Pos (0≦Y_Pos≦N−1) which indicate the position of a tile being processed (referred to as a "tile of interest") are initialized to "0." (X_Pos, Y_Pos)=(0, 0) represents the tile at the upper left corner of the first image.

At step S309, an image is selected from material images which is appropriate for the tile indicated by the position counter X_Pos, Y_Pos. For example, if X_Pos =Y_Pos =0, the position of the tile is (0, 0), indicating the upper left corner. To select a material image used for the tile j of interest, the distance ΔEij between the RGB tristimulus value of the tile j of interest in the original image and that of each material i is calculated. A material image i which has the smallest distance is selected as the image to be applied to the tile j of interest. The evaluation formula of ΔE is as follows:

$$\Delta Eij = \{(Rs\_av_i - Rd\_av_j)^2 + (Gs\_av_i - Gd\_av_j)^2 + (Bs\_av_i - Bd\_av_j)^2\}^{\frac{1}{2}}.$$

ΔE will be smaller if the density of all the color of the tile j of interest approaches that of the material image i, and becomes zero if the two densities match. In contrast, the larger the value ΔE, the larger the difference in average hue and density of the image in the tile j of interest and the material image i.

At step S310, the highest-resolution image data corresponding to the selected material image is applied to the tile of interest. In doing so, the image data is scaled to the appropriate size if the size of the image data does not match the tile.

The process of step S309 is performed on each tile by proceeding horizontally and vertically to change the tile of interest sequentially until all the tiles are processed (steps S310, S311).

As described above, according to the first embodiment of the invention, a mosaic image can be generated rapidly by calculating the average density using low-resolution image data if a material image has multi-resolution image data.

In the first embodiment, if more than one item of image data having different resolutions is provided for a single image, low-resolution image data is used to calculate the characteristic quantity, i.e. the average density, of the material image. Similarly, if more than one type of image data having a different number of gradation levels is provided for a single image, image data which has a small number of gradation levels is used to calculate the characteristic quantity, i.e. the average density.

Second Embodiment

Figure 7:
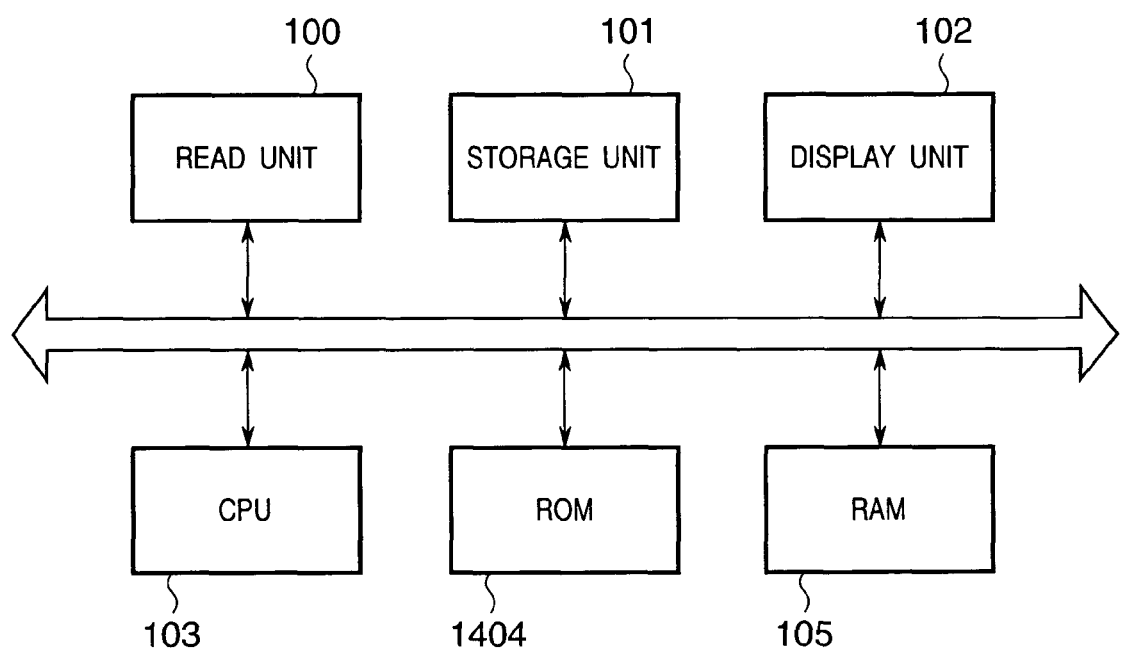
FIG. 7 shows a block diagram of the configuration of an apparatus for generating a mosaic image according to a second embodiment.

FIG. 7 shows a block diagram of the configuration of a mosaic image generation apparatus according to another embodiment of the present invention. The same number is applied to the same components as those in FIG. 2 to omit their description.

ROM 1404 contains a program and data used in the program for implementing the process of the flowcharts shown in FIGS. 8, 9, and 10 of the embodiment which will be described bellow.

RAM 105 is used as a working area for implementing the process of the flowcharts shown in FIGS. 8, 9, and 10 of the embodiment which will be described bellow.

Figure 8:
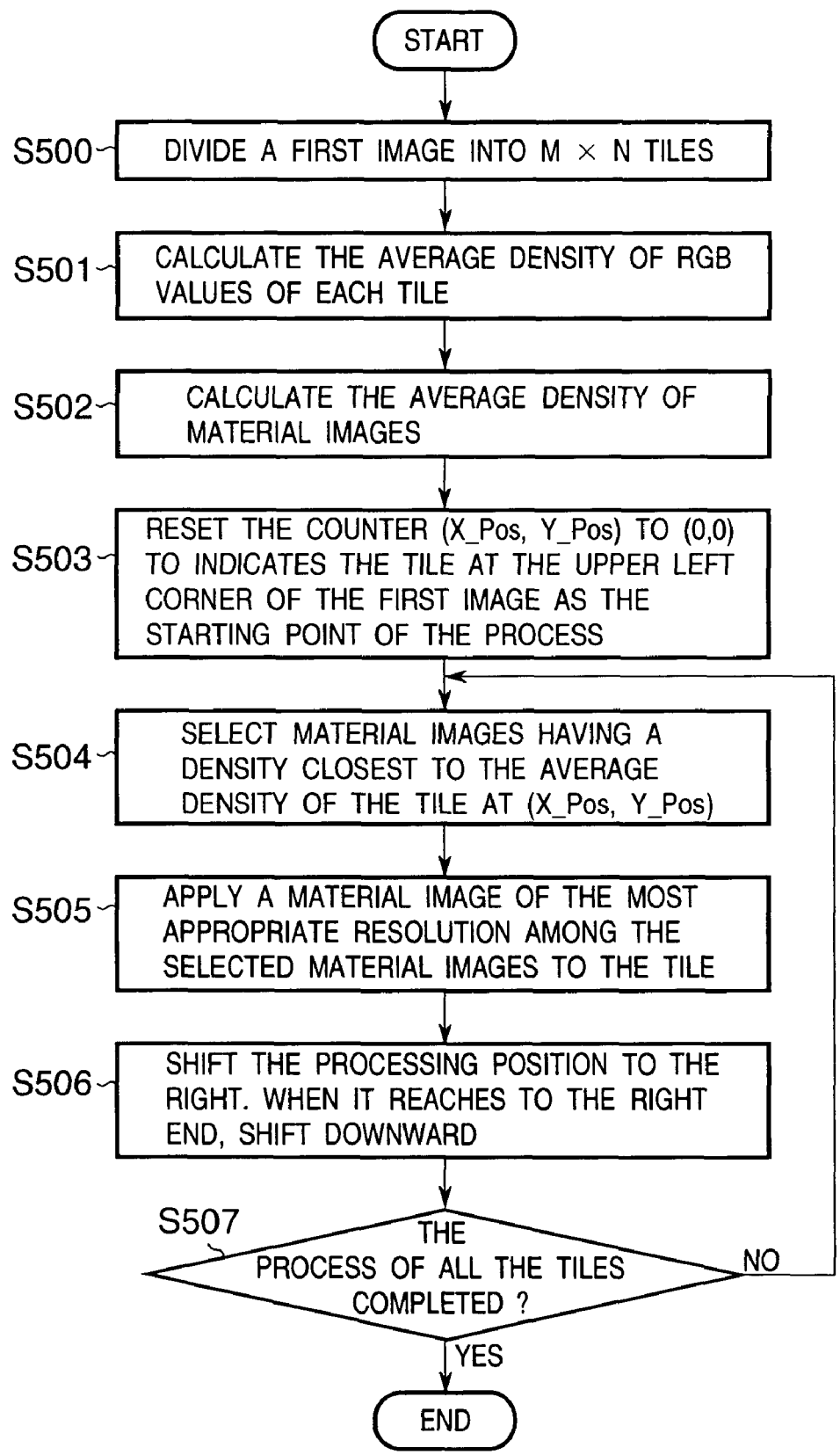
FIG. 8 shows a flowchart of an operation for generating a mosaic image according to the second embodiment.
Figure 9:
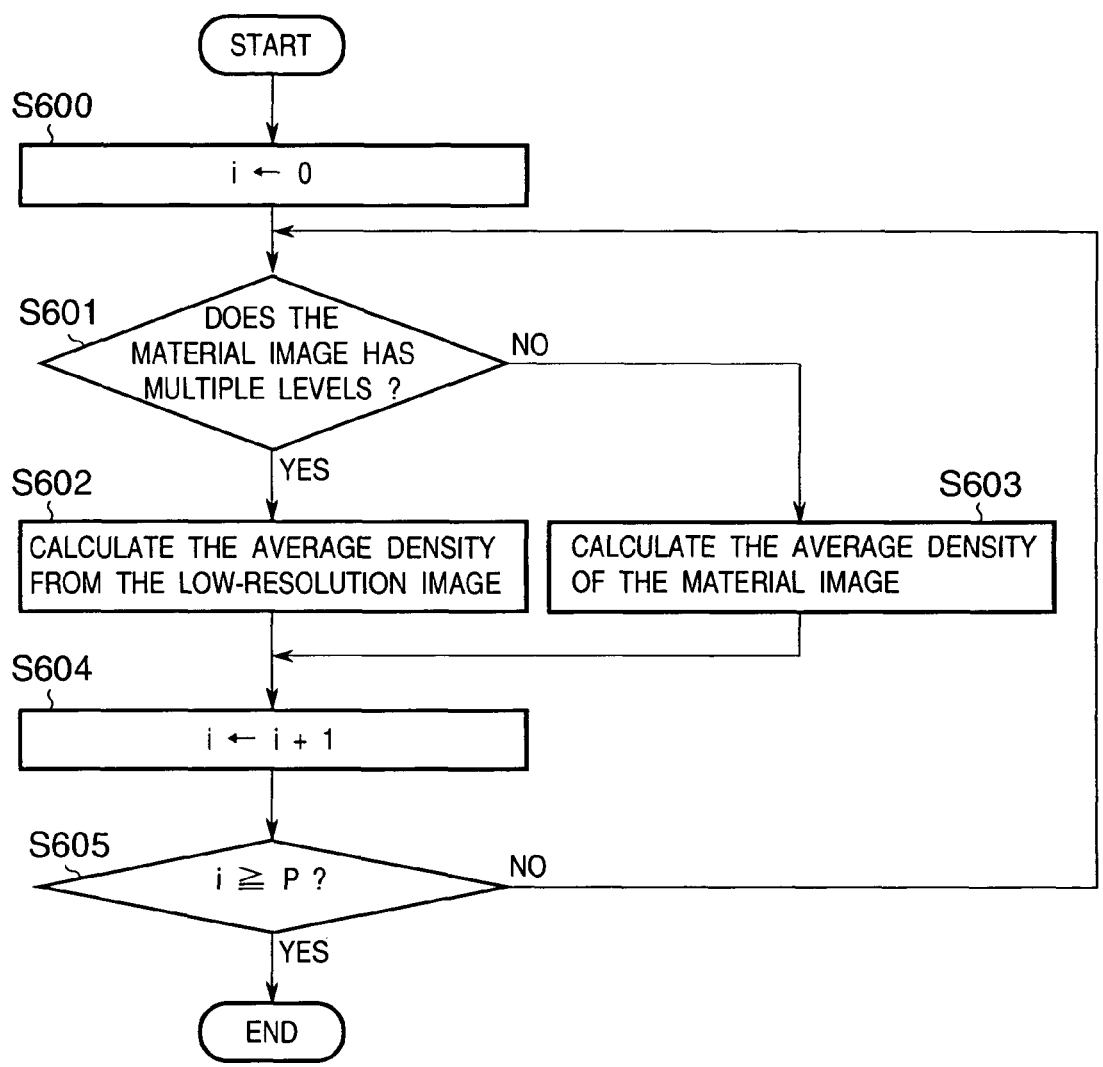
FIG. 9 shows a flowchart of an operation for calculating a characteristic quantity of all material images according to the second embodiment.
Figure 10:
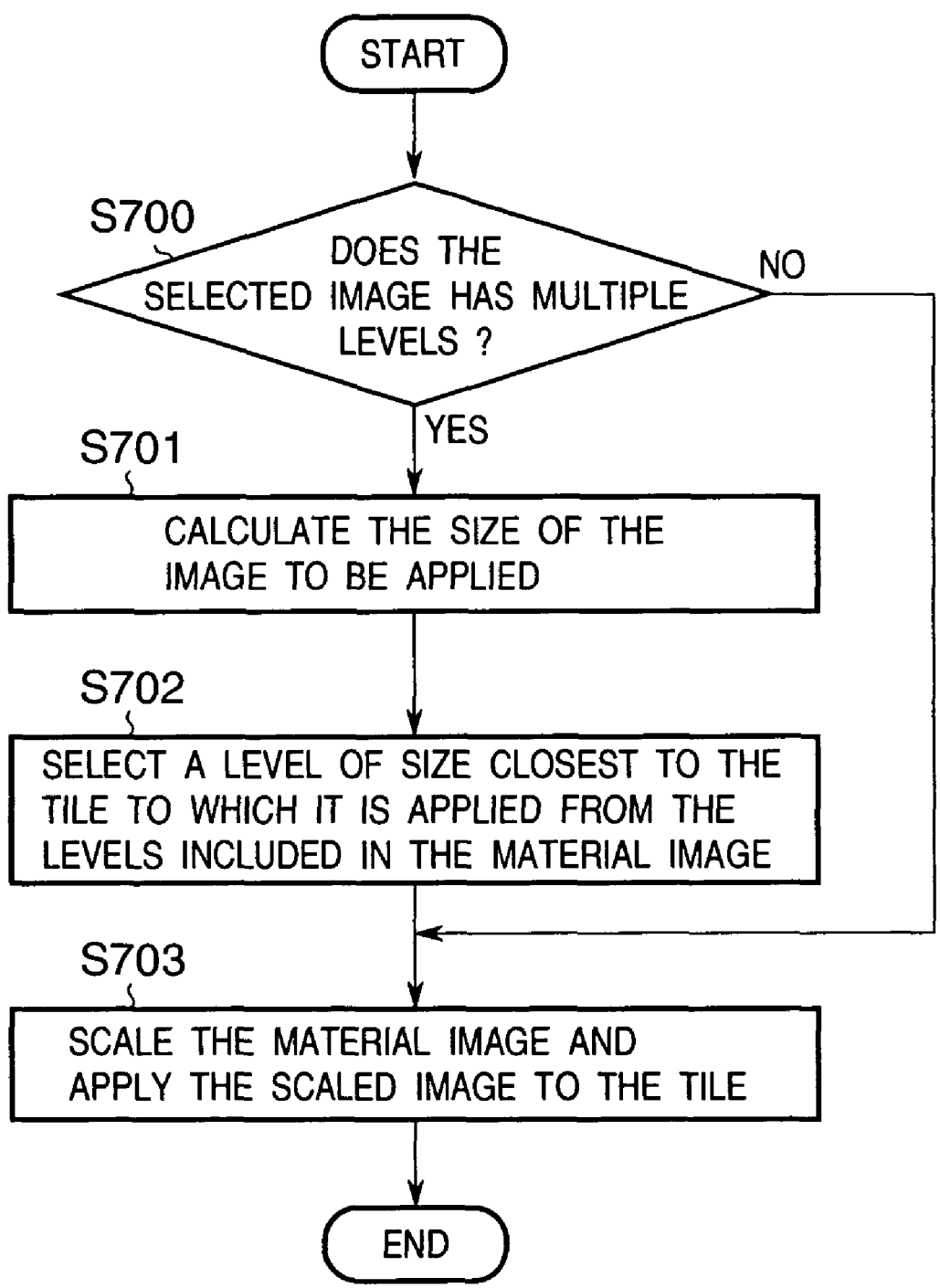
FIG. 10 shows a flowchart of an operation for applying a material image to a tile according to the second embodiment.

A CPU 103 executes programs stored in the ROM 1404 for implementing the process of the flowcharts shown in FIGS. 8, 9, and 10 by using the RAM 105 as a working area, and controls the entire mosaic image generation apparatus. In addition to these components, various components are provided in the mosaic image generation apparatus of the present embodiment, although the description of which is omitted since those components are not important for the description of the present embodiment.

Now, an operation for generating a mosaic image in the mosaic image generation apparatus configured as described above will be described with reference to FIGS. 7 and 8.

FIG. 8 is a flowchart showing mosaic image generation method according to the embodiment of the present invention.

At step S500 in FIG. 8, a first image which is read by the read unit 100 and stored in the RAM 105 is divided into M×N tiles. As the result of the division, M×N rectangular tiles TL (0, 0), TL(0, 1), TL(0, 2) . . . , TL(M−1, N−2), TL(M−1, N−1) are generated.

The construction of the first image divided into M×N rectangles is the same as in the first embodiment and is illustrated in FIG. 4.

In FIG. 4, "X" and "Y" represent the number of pixels in the first image 201 along the horizontal and vertical axes, respectively. The letters "p" and "q" represent the number of pixels in each tile along the horizontal and vertical axes, respectively, where the first image is divided into M×N rectangular tiles of the same size, TL(0, 0), TL(0, 1), TL(0, 2) . . . , TL(M−1, N−2), TL(M−1, N−1). Thus, the relationship X=p×M, Y=q×N is yielded.

The construction of each tile is the same as shown in the first embodiment. As shown in FIG. 5, each tile breaks down into p×q pixels for each component color: red (R), green (G), and blue (B).

At the step S501 in FIG. 8, the average density of the RGB is calculated for each of the M×N tiles j on the memory which was divided at step S500, as follows:

$Rd\_av_j = 1/(p*q) \cdot \Sigma Rj$ $Gd\_av_j = 1/(p*q) \cdot \Sigma Gj$ $Bd\_av_j = 1/(p*q) \cdot \Sigma Bj.$ The calculated values are stored in the RAM 105.

Here, d is the "destination." $\Sigma Rj$, $\Sigma Gj$, and $\Sigma Bj$ are the sum of pixel values of R, G, and B, respectively, contained in the tile j.

At step S502, the average density of the P material images is calculated.

FIG. 9 shows a detailed flowchart of step S502.

At step S600, a counter i which indicates a tile of interest is set to zero.

At step S601, it is determined whether the material image i has multiple resolutions.

A multi-resolution is described with reference to FIG. 6.

For image formats, such as FlashPix™ and PhotoCD™, more than one item of image data having different resolutions, which represents the same image is contained in a single file. While it is preferable to use image data of higher resolution to provide high-quality printout, low-resolution image data is enough for uses like calculation of the average density of images. Therefore, if a material image has multi-resolution image data, the average density is calculated from a low-resolution image data (step S602) If a material image does not have multi-resolution, the average density is calculated from the material image itself (step S603).

The average densities of R, G, and B of the material image i are given by the expressions bellow. The calculated values are stored in the RAM 105.

$Rs\_av_i = 1/(p*q) \cdot \Sigma Ri$ $Gs\_av_i = 1/(p*q) \cdot \Sigma Gi$ $Bs\_av_i = 1/(p*q) \cdot \Sigma Bi$ where, s is the "source." $\Sigma Ri$, $\Sigma Gi$, and $\Sigma Bi$ are the sum of pixel values of R, G, and B, respectively, contained in the material image i.

After the average density is calculated, the counter i is incremented by one (step S604). At the step S605, it is determined whether the average density for all of the P material images is calculated. If so, the sequence from steps S601 to S604 is repeated until the average density of all the material images is calculated.

Thus, the average density of the material image can be calculated rapidly by using low-resolution data if the material image has multiple resolutions.

Step S502 in FIG. 5 is now completed. At step S503, counters X_Pos (0≦X_Pos≦M−1), Y_Pos (0≦Y_Pos<N−1) which indicate the position of a tile being processed (referred to as a "tile of interest") are initialized to zero. (X_Pos, Y_Pos) and (0, 0) represent the tile at the upper left corner of the first image.

At step S504, an image is selected from material images which is appropriate for the tile indicated by the position counter X_Pos, Y_Pos.

For example, if X_Pos =Y_Pos =0, the position of the tile is (0, 0), indicating the upper left corner.

To select a material image to be used for the tile i of interest, the distance ΔEij between the RGB tristimulus value of the tile j of interest in the original image and that of each material image i is calculated. A material image i which has the smallest distance is selected as the image to be applied to the tile j of interest. The evaluation formula is as follows:

$$\Delta Eij = \{(Rs\_av_j - Rd\_av_i)^2 + (Gs\_av_j - Gd\_av_i)^2 + (Bs\_av_j - Bd\_av_i)^2\}^{\frac{1}{2}}.$$

At step S505, among the image data representing the selected image, an item of image data which has the most suitable resolution is applied to the tile.

FIG. 10 shows a detailed flowchart of step S505.

At step S700, it is determined whether the material image has multiple resolutions, and if so, the process proceeds to step S701. If not, the process proceeds to step S703. At step S701, the size of image to be applied to the tile of interest is calculated. At step S702, among image data, which correspond to the selected material image and have different resolutions, an item of image data is selected which has a size closest to the image size required for applying to the tile.

At step S703, the selected image is scaled to the appropriate size to apply to the tile. If the size of the selected image is the same as that of the tile, the scaling is not required.

The above mentioned process sequence is performed on each tile by proceeding horizontally and vertically to change the tile of interest sequentially (step S506) until all the tiles are processed (step S507).

As described above, according to the present embodiment, a mosaic image can be generated rapidly by calculating the average density using low-resolution image data if a material image has multi-resolution image data. In addition, in applying a material image to the tile, a mosaic image is rapidly generated by selecting image data of the appropriate resolution among multi-resolution image data.

(Variations of First and Second Embodiments)

If image data having different resolutions are provided for an original image, low-resolution image data can be used to calculate the characteristic quantity, for example, the average density of each block of the original image, thereby allowing faster calculation of the characteristic quantity.

In the embodiments described above, the similitude between the image in a tile and a material image is calculated based on the average density of the images. However, the similitude may be calculated in other ways. For example, it can be calculated based on the luminance of the image.

Furthermore, while the embodiments are described in connection with a computer system which generates a mosaic image, the processes of step S304 in FIG. 3 and step S505 in FIG. 8 can be applied to a computer system for retrieving a similar image. That is, if an image has multi-resolution image data, the technique of using low-resolution image data to calculate a characteristic quantity or similitude or the technique of using image data which has the most suitable resolution among the selected material images can be applied to the retrieval of an image. For example, in the case where an image similar to a particular image is retrieved from an image database, if the image database includes multiple levels, the retrieval can be performed rapidly by using low-resolution image data to calculate the similitude of images. In addition, when the retrieved data is output, resources used for scaling-up/down the image during the output operation can be saved by using the retrieval system to select image data having a resolution suitable for the target.

A computer system for retrieving a similar image is a system that retrieves an image similar to the image input by the user from the material images stored in the database and displays it on the computer's monitor to present it to the user.

The quantity which represents the characteristic of an image is not limited to its average density. For example, values obtained by boundary extraction or edge detection, or spatial frequency distribution obtained by orthogonal transformation may be used as the characteristic of the image. The less the number of pixels in the image data, the low the computational complexity for obtaining these values. Therefore, the complexity for calculating the characteristic quantity of low-resolution image data is lower than that for the high-resolution image data. Even though the resolution of an image is low, the characteristics of the image represented by boundaries, edges, or spatial frequency distribution are retained. That is, boundaries and edges are retained in the low-resolution image and the low-frequency component of a spatial frequency component in a low-resolution image is comparable to that of a high-resolution image. Consequently, when these characteristics are used for image retrieval, fast calculation of the characteristic quantity is achieved for an image having multilevel image data, which enables faster image retrieval.

As described above, if an image has multilevel image data, low-resolution image data is used to calculate the characteristic quantity of the image, thereby the calculation can be performed faster with a smaller amount of memory.

Thus, in the case where a mosaic image is generated by calculating the average density of material images as its characteristic quantity and fitting a material image having an average density similar to that of the tile of the original image into the tile, the mosaic image can be generated at a higher speed with a smaller amount of memory.

Furthermore, it is possible to arrange the material images at high speed and to generate the mosaic image by arranging the data of proper resolution in the material image having plural layers in accordance with each divided partial image (tile).

Third Embodiment

Figure 11:
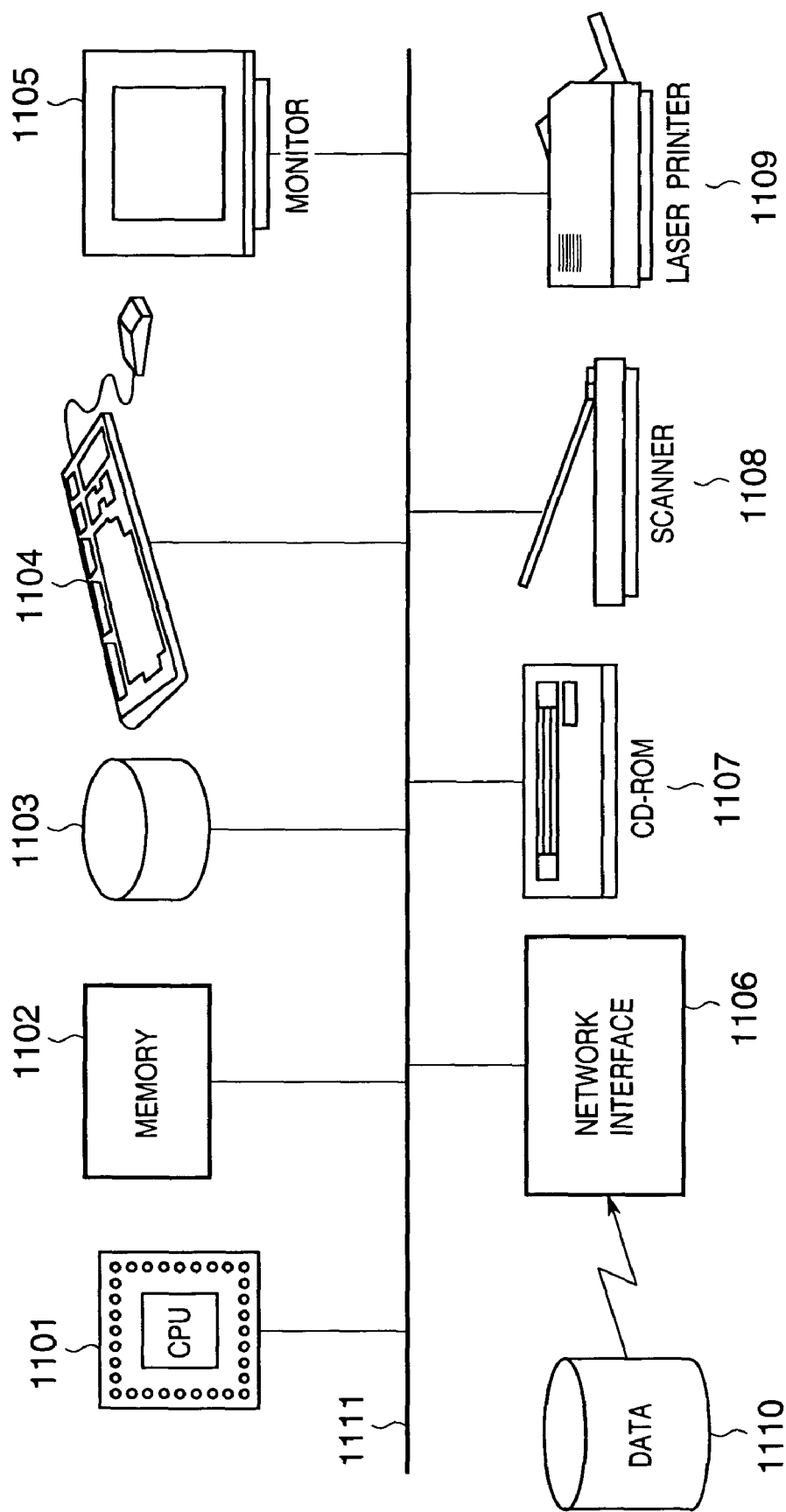
FIG. 11 shows a block diagram of the configuration of a computer system according to a third embodiment.

FIG. 11 shows a block diagram of a typical configuration of a client or server computer system that performs the third embodiment of the present invention.

A CPU 1101 controls the entire system according to a program stored in a hard disk 1103 and loaded into a main memory 1102. A keyboard and mouse 1104 are used to input commands and data to the system of the present embodiment. A monitor 1105 has, for example, a CRT or a liquid crystal panel. Main memory 1102 comprises ROM or RAM, constitutes a memory unit of the system of the embodiment, and stores program codes executed by the system and data used by the system. The program contains codes and data for implementing the processes shown in FIGS. 13, 15, 16, 17, and 19, which will be described bellow, and executed by the CPU 1101. The hard disk 1103 is used to store original images, material images, and image information (a number of scale-down images or image characteristic parameters) of the embodiment. A CD-ROM 1107 constitutes external storage used for the file system of the system in the embodiment. A scanner 1108 is used to read an original image in the embodiment. A printer 1109 is used to output a mosaic image formed according to the embodiment. A network interface 1106 connects to a network and allows data to be input/output to and from, for example, a hard disk unit 1110 on the network. The network interface also allows the system to communicate with a program running on another computer.

Figure 12:
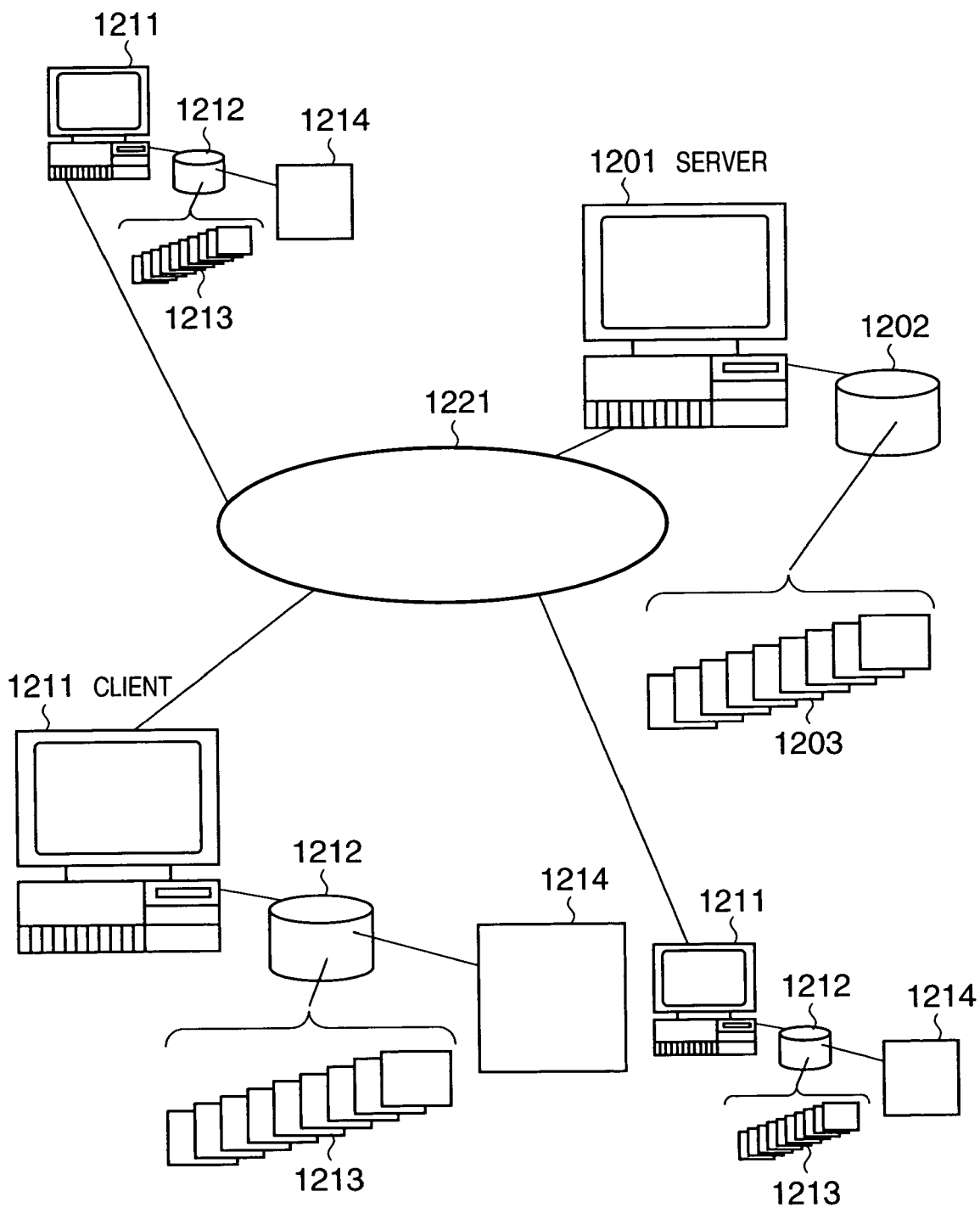
FIG. 12 shows a block diagram of the configuration of a system according to the third embodiment.

FIG. 12 shows a configuration of the system that performs image processing according to the third embodiment of the present invention. A client computer 1211 is comprised of components as shown in FIG. 11. A server computer 1201 is comprised of components as shown in FIG. 11, except for hard disks 1202 and 1212, which are illustrated as external devices in FIG. 12. The client computer 1211 and the server computer 1201 are interconnected through a communication channel 1221. The communication channel 1221 represents an Ethernet cable, a public telephone line, or a wireless communication channel, which interconnects computers. The communication channel 1221 is not essential to the embodiment, as will be described bellow.

The hard disk 1202 (1103 in FIG. 11) of the server computer 1201 contains a plurality of material images 1203 which are used as components of a mosaic image.

The hard disk 1212 (1103 in FIG. 11) of the client computer 1211 contains an original image 1214 on which to base a mosaic image, and scaled-down images 1213 of the material images contained in the 1202 of the server computer 1201.

The scale-down images 1213 contained in the hard disk 1212 of the client computer are images that are scaled down from the material images 1203 contained in the hard disk 1202 of the server computer. The original images are associated with their scale-down image using an identifier (file name or image identifier) and can be found uniquely using the identifier of the scaled-down image. In this example, it is assumed that the scale-down images 1213 are downloaded to the client computer through the communication channel 1221.

Figure 13:
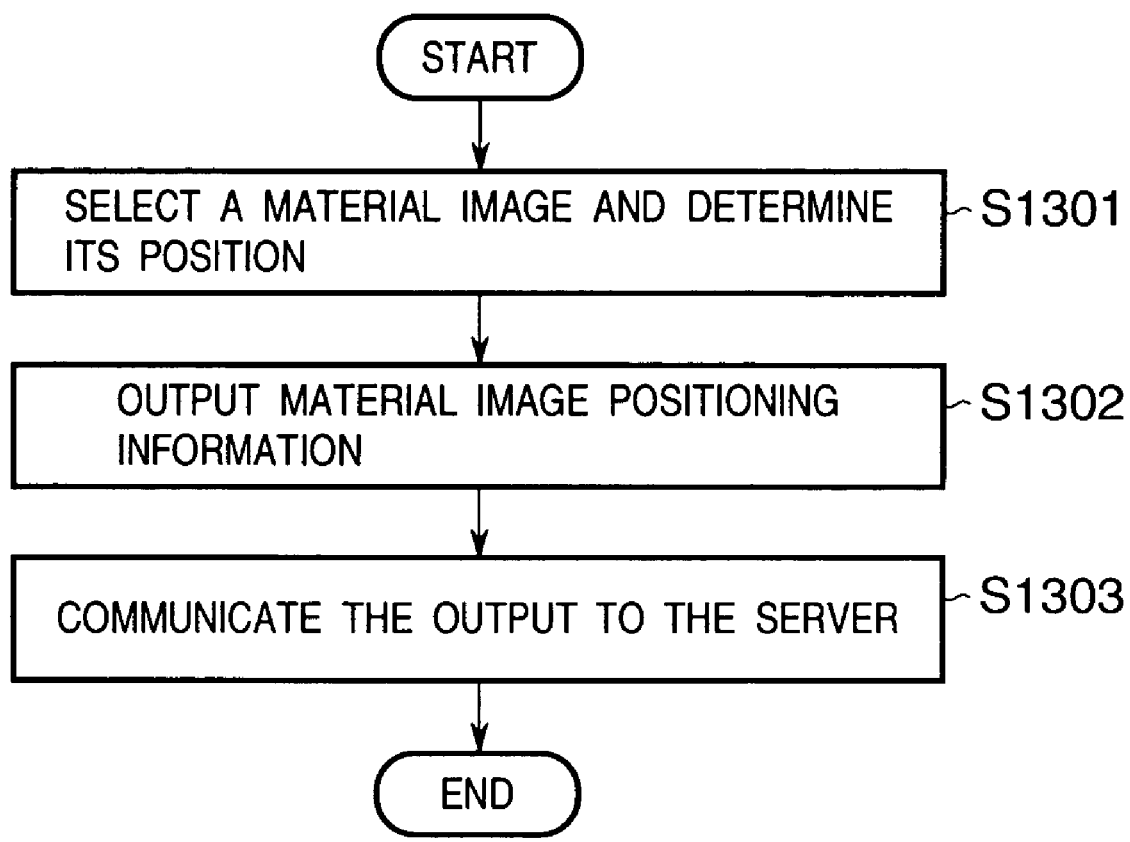
FIG. 13 shows a process flow on a client computer according to the third embodiment.

FIG. 13 shows the process flow on the client computer 1211 according to the embodiment. The client computer 1211 reads an original image and scale-down images of material images from the hard disk 1212, divides the original image into a plurality of areas (tiles), and determines material images that have color or shape information similar to the color or shape information of the plurality of divided areas. This process is performed for each divided area, to determine a material image to be used and its position (Step S1301).

Then, the client computer 1211 outputs the positioning information of the determined material (Step S1302). The positioning information includes at least information containing identifier required to retrieve the intended material image among the material images 1203 in the hard disk 1202 of the server computer 1201, and information that indicates the position of the selected material image on the mosaic image.

The information may be any format. As an example, a format of the positioning information is described below in which the original image is divided into 100 areas (tiles) horizontally and 250 areas (tiles) vertically. FIG. 14 shows the example of the output format.

In the code shown in FIG. 14, at first the number of tiles (X=100) along the horizontal axis and the number of tiles (Y=250) along the vertical axis are described, then the position of each tile and the identifier (ID) of a material image used at that position are described line by line. The format is just an example and any other information may be used as long as the above mentioned two items of information are included.

The position information of the material image at Step S1302 in FIG. 13 is transferred from the client computer 1211 to the server computer 1201 through the communication channel 1221, and stored in the server computer 1201 (S1303).

As mentioned earlier, the communication channel 1221 shown in FIG. 12 is not essential to the embodiment. In this embodiment, the communication channel 1221 is described which is used to download the scale-down image of the material image from the server 1201 to the client 1211, and transmit the position information of the material image from the client 1211 to the server 1201.

However, the scale-down image of the material image does not required to be downloaded from the server 1201 through the communication channel 1221, if they are distributed to the client beforehand via recording media such as a floppy disk, CD-ROM, or magneto-optical (MO) disc.

Similarly, the position information of the material image may be provided to the server 1201 without passing through the communication channel 1221, if the information is written to recording media such as a floppy disk, CD-R, or MO disc and provided to the server 1201 via the media.

Figure 15:
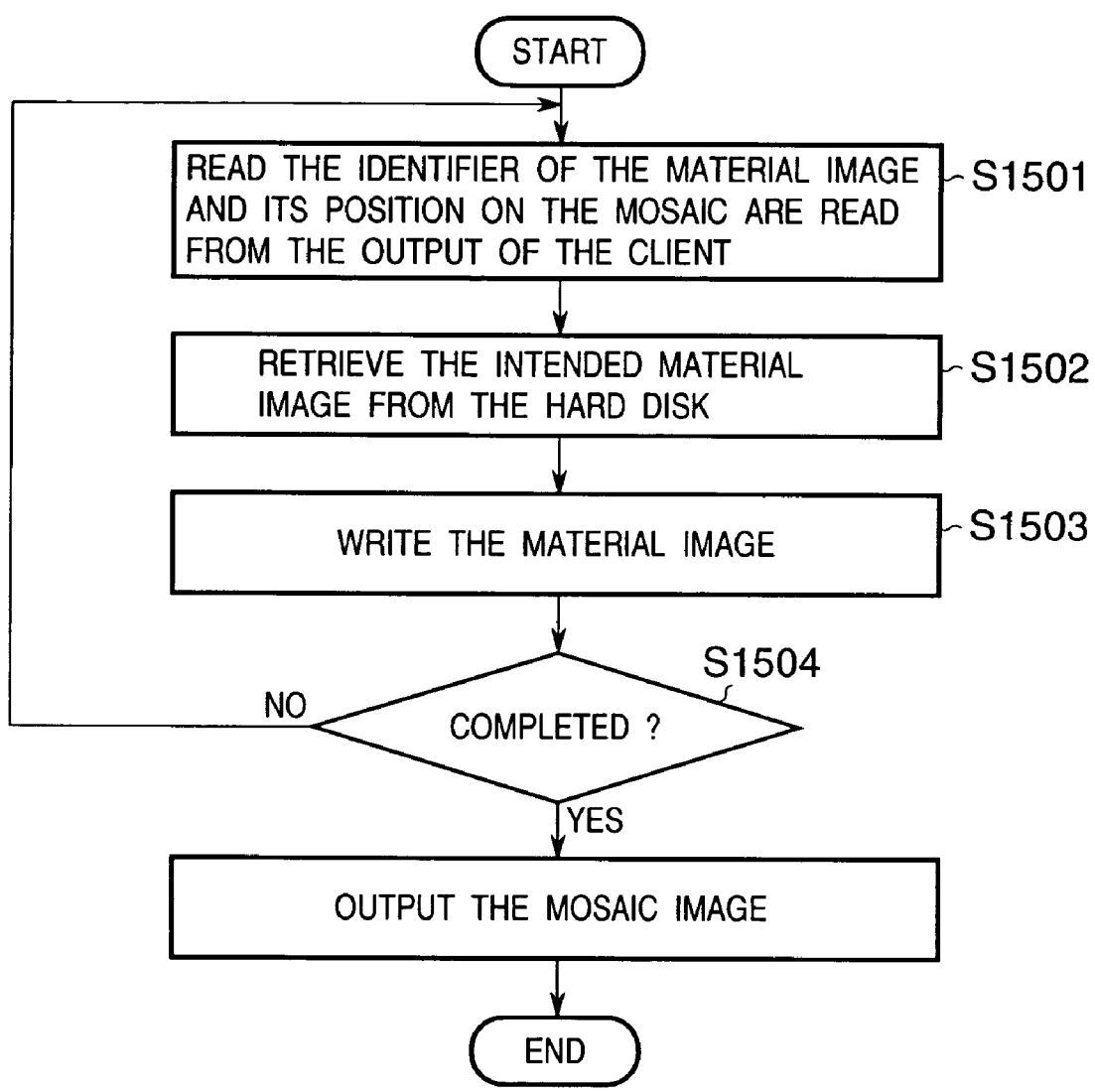
FIG. 15 shows a process flow on a server computer according to the third embodiment.

The server computer 1201 receives the output from the client computer 1211 and creates a mosaic image based on the information. FIG. 15 shows the process flow on the server computer 1201 according to the embodiment.

The server computer 1201 extracts the identifier of the material image and information indicating the position of the intended material image on the mosaic image (S1501) from the output of the client computer 1211.

The server computer 1201 then retrieves the intended material image from the hard disk 1202 (S1502) and calculates the actual coordinate of the image on the mosaic image from the position information extracted at Step S1501, and writes the material image into an appropriate area on the memory (S1503).

The steps S1501 through S1503 are repeated until all the information contained in the output of the client computer 1211 is processed (S1504).

After all the information contained in the output of the client computer 1211 is processed, the generated mosaic image is output (S1505). The "output" operation here may be the transmission of the information through the communication channel or printout on a printer. For example, the mosaic image may be transmitted to the client computer 1211 through the communication channel 1221 at step S1505 if both the client computer 1211 and the server computer 1201 are connected to the communication channel 1221, or the information may be output to the printer 1109 connected to the server computer. The printed information is provided to the user who operates the client computer 1211.

The delivery of scale-down images from the server 1201 to the client 1211 is described bellow. In this embodiment, the downloading of the scale-down images may be performed at various points in time, such as during activation of the client computer 1211, during start-up of a mosaic image generation software program on the client computer 1211, or when the downloading is directed manually by the user. Alternately, the downloading timing may be allowed to be selected by the user during initialization of the system. This arrangement allows the downloading at various points in time according to the user's preference. In addition, a mosaic image can be generated using the most recent version of a material image if the type of the material image is changed.

Figure 16:
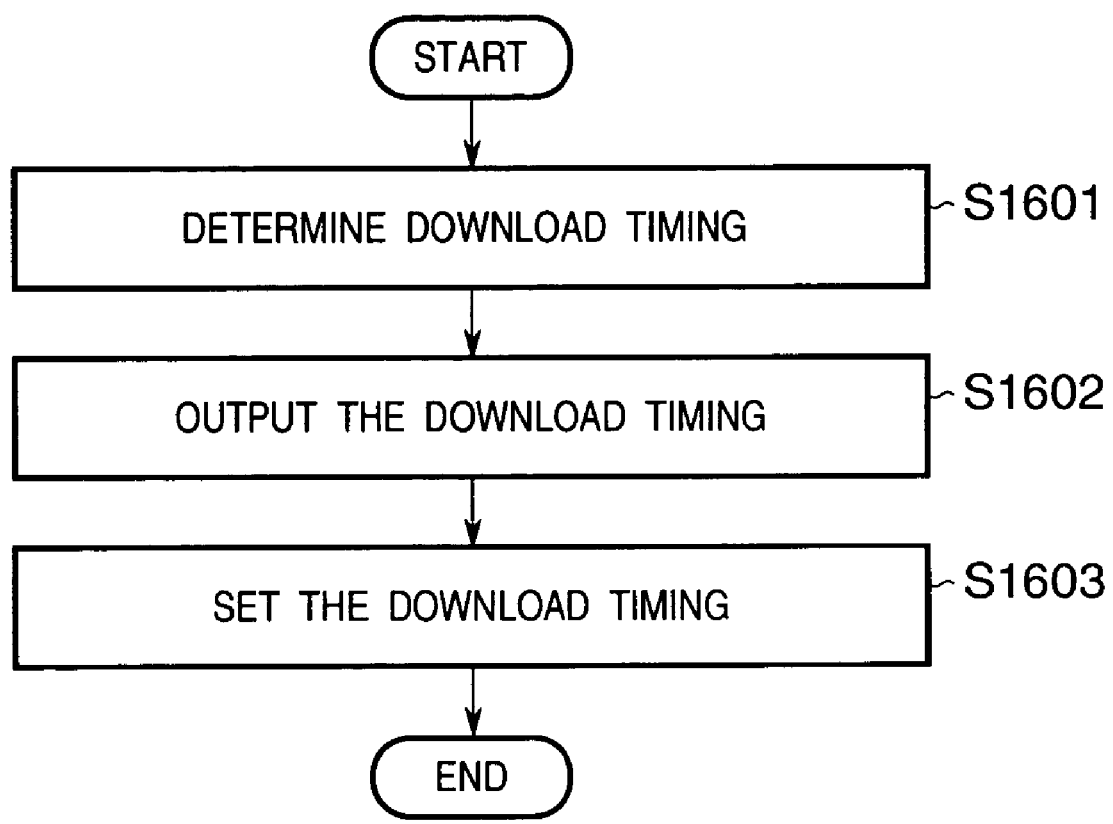
FIG. 16 shows a process flow to the point at which the timing of downloading is set on the client computer and the server computer according to the third embodiment.

FIG. 16 shows a process flow for setting the download timing on the client computer 1211 and the server computer 1201 according to the present embodiment.

During the initialization of the system, the client computer 1211 determines the download timing (step S1601). The download timing may be during activation of the client computer 1211, during start-up of a mosaic image generation software program on the client computer 1211, or when the downloading is directed manually by the user.

The client computer 1211 then provides the determined download timing information to the server computer 1201 (S1602).

Then the server computer 1201 sets the download timing according to the download timing information received from the client computer 1211 (S1603).

The server computer 1201 then monitors the client computer 1211 through the communication channel 1221, and when recognizing the timing set at the Step S1603, downloads the scale-down images of the material image to the client 1211.

Alternately, the client 1211 may request the downloading from the server 1201. That is, the system may be arranged in a manner that the download timing is set on the client computer 1211, and when the client computer 1211 detects this timing, it may request the scale-down versions of the material images from the server computer 1201.

In FIG. 16, the steps S1601 and S1602 are performed by the client computer 1211, and step S1603 is performed by the server computer 1201.

(Variation 1 of Third Embodiment)

In the third embodiment described above, the scale-down images 1213 of material images reside on the client computer 1211. The scale-down images are used for mosaic generation, i.e. for determining the placement of the material images in the tiles at step S1301 in FIG. 13. In this determination, a characteristic parameter indicating the characteristic of each material image is generated from its scale-down image. Instead of this scale-down image 1213, a characteristic parameter indicating each material image may be provided on the client computer 1211. A characteristic parameter may be, for example, information indicating a color that appears most frequently in a material image. Alternately, it may be the average color of the material image. In this variation of the third embodiment, the amount of data distributed to the client beforehand or downloaded from the server to the client is advantageously small because the amount of characteristic parameter data generally is smaller than that of scale-down images.

In addition, the calculation of the characteristic parameter of the material image is not required in the image material selection and positioning process at step S1301 in FIG. 13.

In the third embodiment described earlier, the characteristic parameter of each material image must be calculated each time a mosaic image is generated. In contrast, in this variation of the third embodiment, the calculation of the characteristic parameter of a material image is required only once when that material image is entered in the databases on the server and the client.

(Variation 2 of the Third Embodiment)

Material images in the third embodiment may be grouped into a plurality of databases and stored them on the hard disk 1202 of the sever computer 1201. Examples of the database include those for material images relating to flowers, material images relating to animals, and material images relating to landscapes. The user can select a database by providing a manual instruction. Thus, the range of database choices is extended and various mosaic images of different motifs can be formed.

Figure 17:
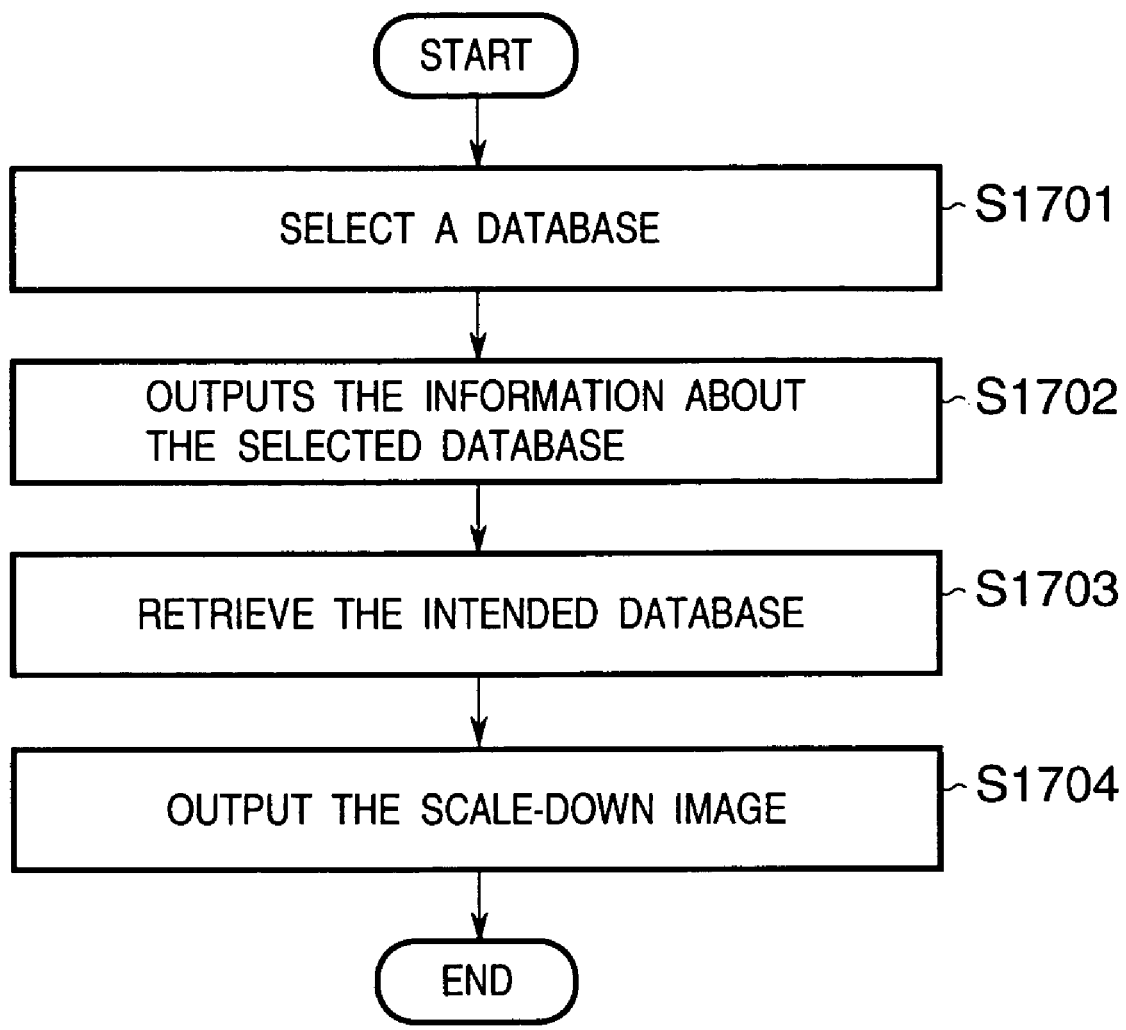
FIG. 17 shows a process flow to the point at which the scale-down image of a material image is downloaded on the client computer and the server computer according to the third embodiment.

FIG. 17 shows a process flow for downloading the scale-down image of a material image by the client computer 1211 and the server computer 1201 according to this variation of the third embodiment.

On the client computer 1211, a database to be used is selected by a manual instruction of the user (S1701). The selection of a database is performed by default of the client 1211 if the timing of material image downloading is set at the activation of the client computer 1211 or the star-up of mosaic image generation software program. If the download timing is set at a manual instruction, the selection of a database is performed each time the downloading of a material image is instructed. In either case, the selection is performed before downloading a scale-down image.

Next, the client computer 1211 outputs the information about the selected database to the server 1201 (S1702).

The server computer 1201 retrieves the intended database from the hard disk 1202 according to the information about the selected database from the client computer 1211 (S1703). The server computer 1201 then outputs the scale-down image of the material image entered in the intended database to the client computer 1211 (S1704).

Steps S1701 and S1702 in FIG. 17 are performed by the client computer 1211, and steps S1703 and S1704 are performed by the server computer 1201.

(Variation 3 of Third Embodiment)

A mosaic image can be generated in the client, rather than the server. In this case, the server retrieve material images based on positioning information and sends them to the client. The client put the material images received from the server in place according to the positioning information.

Fourth Embodiment

A computer system, which retrieves an image similar to an input image according to a fourth embodiment, is described bellow. A similar-image retrieval system herein is a system that retrieves an image similar to an image input by the user out of material images stored in a database and provides it to the user. In the embodiments described above, the mosaic image processing system retrieves a material image whose scale-down image or a characteristic parameter has color or shape information closest to that of the original image in each tile. In contrast, the similar image retrieval system retrieves the scale-down image or the color or shape information of the image characteristic parameter and, a material image whose similitude in color or shape with an image input by the user is equal to or over a predetermined value. If a plurality of material images have a similitude equal to or over the predetermined value, the plurality of images are output.

Figure 18:
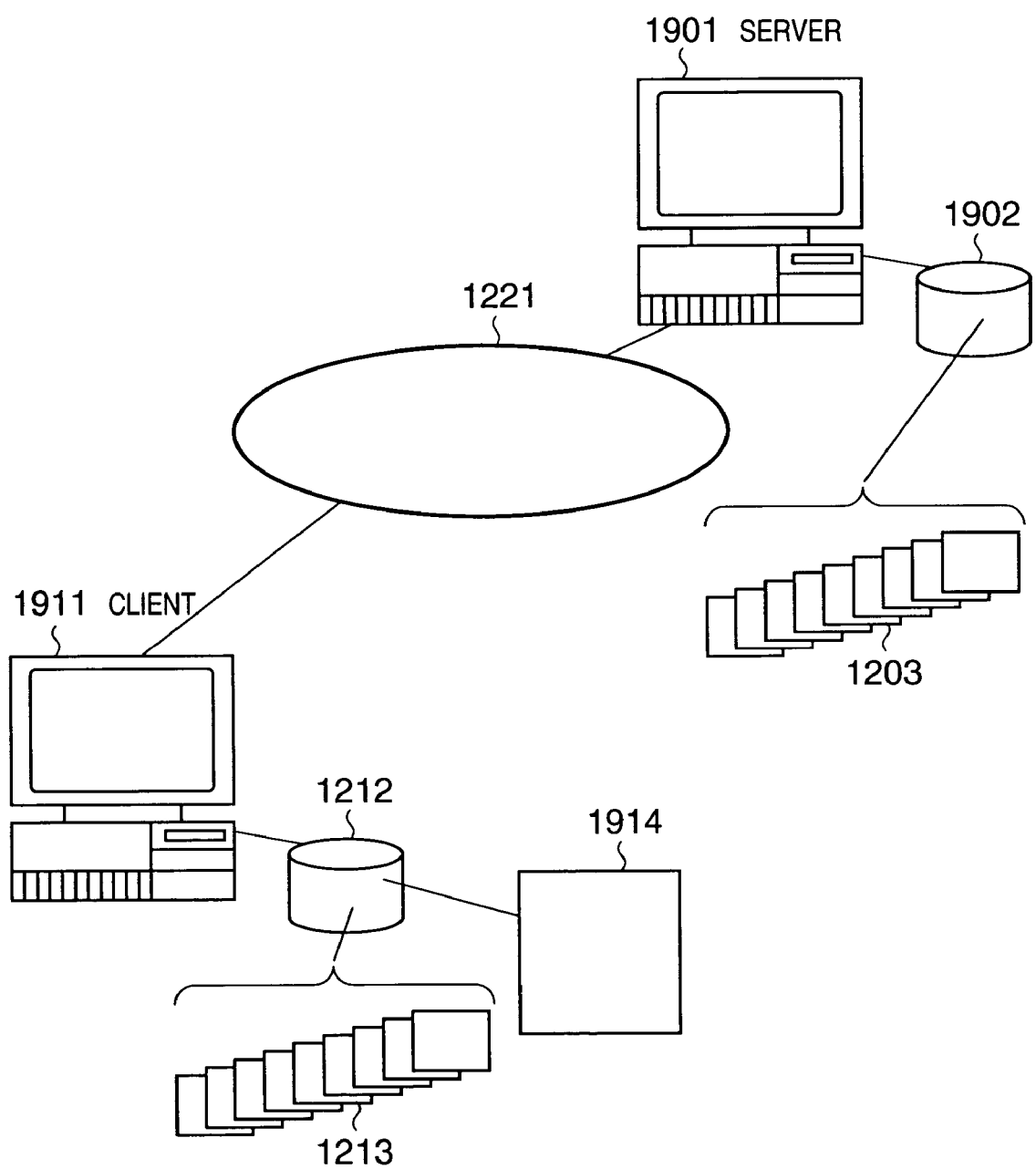
FIG. 18 shows a block diagram of a fourth embodiment.

FIG. 18 shows a similar-image retrieval system according to the fourth embodiment. The description of components that are the same as in the third embodiment shown in FIG. 12 will be omitted. There are two differences between the fourth embodiment and the third embodiment shown in FIG. 12. First, a server computer 1901 simply retrieves a material image from a hard disk 1902 and outputs it to a client computer 1911. Second, the client computer 1911 has a similar-image retrieval software program and determines a similitude between the scale-down images or characteristic parameters of a plurality of material images and an input image. The input image 1914 is image data input by the user or operator and images are retrieved which is similar to this input data 1914.

Figure 19:
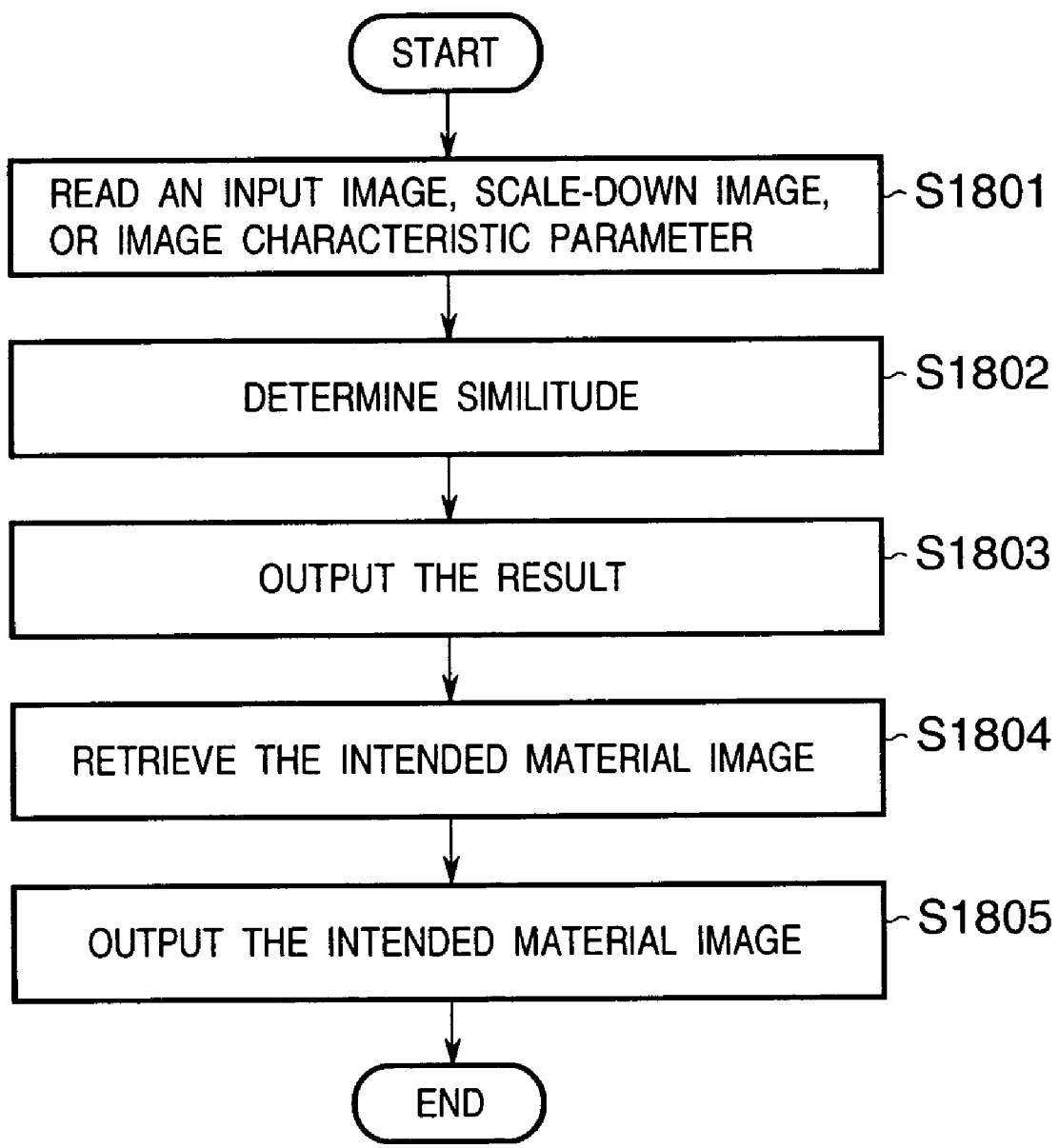
FIG. 19 shows a process flow on a client computer and a server computer according to the fourth embodiment.

FIG. 19 shows a flow diagram of processes on the client computer 1911 and on the server computer 1901 according to the embodiment. The processes in the flow diagram are performed by the similar-image retrieval program on the system shown in FIG. 1.

The client computer 1911 reads an input image and the scale-down images or image characteristic parameters of a plurality of material images from the hard disk 1212 (step S1801).

The client computer 1911 then determines a similitude between scale-down images or characteristic parameters of the plurality of material images and the input image (step S1802).

The client computer 1911 provides scale-down images or image characteristic parameters of the plurality of material images that have similitude equal to or more than a predetermined value to the server computer 1901 (step S1803).

The server computer 1901 retrieves the appropriate material images from the hard disk 1902 based on the output information from the client computer 1911 (step S1804).

The server computer 1901 then provides the retrieved material images to the client computer 1911 (step S1805).

In FIG. 19, steps S1801, S1802, and S1803 are performed by the client computer 1911 and steps S1804 and S1805 are performed by the server computer 1901. As in the third embodiment, a plurality of material images or image characteristic parameters may be downloaded from the server computer 1901 to the client computer 1911. The download can be performed at various time points. In addition, as in the variation 2 of the third embodiment, an image can be retrieved by specifying a desired database selected from a plurality of databases.

Thus, in the image retrieval system according to the fourth embodiment, images input on the client, or images having a characteristic parameter input on the client, are retrieved from scale-down images or characteristic parameters which are provided on the client according to the image databases on the server. The client obtained the retrieved images from the server. Therefore, tasks do not concentrate on the server. Instead, image retrieval load can be distributed to clients. In addition, because the client need not include a image database, storage space can be saved.

As described above, the image processing system comprising an image processing apparatus and image storage apparatus reduces storage requirements in the image processing apparatus.

In addition, when a material image database is updated, the client can obtain the updated data quickly by receiving information (scale-down images and image characteristic parameters) about the material image from the client through the communication channel.

The process of information corresponding to the material image can be started quickly by receiving the information during the activation of the image processing system or during start-up of a program that uses the material image.

The process of a plurality of scale-down images and image characteristic parameters corresponding to the material images can be started quickly by receiving them during the activation of the image processing system or during start-up of mosaic image generation software.

The material images can be specified by specifying the desired database out of a plurality of databases contained in the image storage apparatus by providing a manual instruction on the image processing system, thus, the range of database choices is extended and various mosaic images can be formed.

Because a mosaic image is created on the image storage apparatus and the image processing apparatus receives it, a vast amount of processing required for creating the mosaic image with material images can be performed on the image storage apparatus and the load on the image processing apparatus can be reduced.

When, for example, requests from clients (image processing apparatus) concentrate at a server (image storage apparatus) having an image database, it might take a large amount of time for the server to create mosaic images. The present embodiment can provide a mosaic image timely even in such a case by forming the mosaic image using the scale-down images or characteristic parameters of material images, which are downloaded to the client.

This embodiment allows material images on the server (image storage apparatus) to be shared by more than one client (image processing apparatus), thus large memory can be shared between the clients, resulting in memory cost reduction.

Information including at least an identifier required for retrieving a selected material image and information indicating the position of the selected material image on a mosaic image to be generated ensures that the desired mosaic image is provided.

Furthermore, the actual position of a material image on the mosaic image on the image storage apparatus can be determined based on the position information of the material image.

Fifth Embodiment

Suppose a service in which a service provider generates a mosaic image using image data held by a user as a material image of a mosaic image generation system of the first to fourth embodiments. In such a case, a copyright problem associated with the material image used for generating mosaic image may arise. In order to avoid such a problem, the service provider should use a material image whose copyright is held by the service provider, or the service provider should make a contract with a third party who has the copyright of the material image to purchase it.

However, because the generated mosaic image leaves the service provider and is passed to the user, the delivery of the entire or part (for example, a material image cut out from the mosaic image) of the generated mosaic image cannot be managed. That is, there are no measures to prevent all or part of the mosaic image from being used by a malicious user in a manner that the service provider does not intended.

The same problem may arise in an image retrieval system in which image data held by a user is transferred to the service provider and the service provider retrieves an image similar to the received image.

That is, because the material image itself is transferred to the service provider, there are no measures to prevent the material image owned by the user from being reused by the service provider in a manner that the user does not intended.

In the fifth embodiment, a mosaic image generation system will be described in which a service is provided by a service provider without passing an image itself to the service provider.

Figure 21:
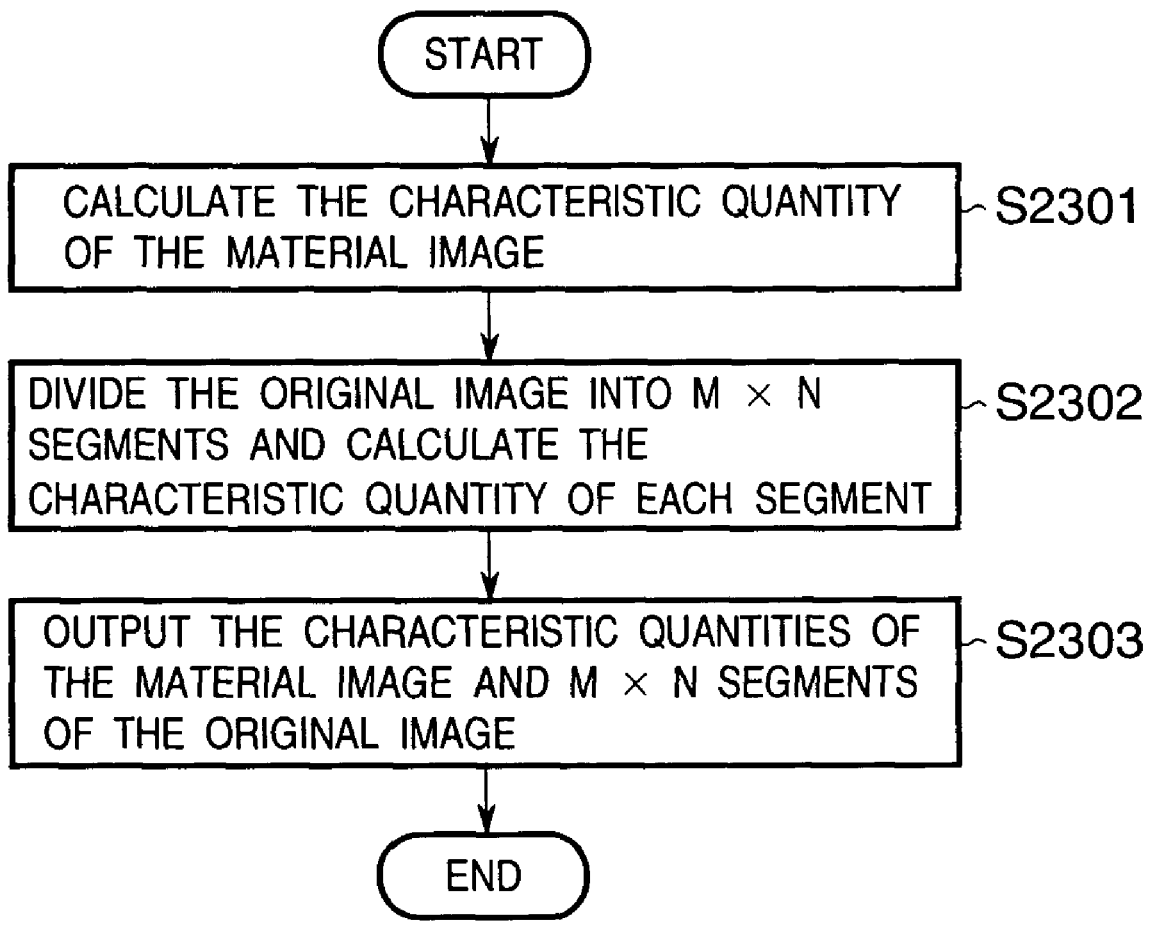
FIG. 21 shows a process flow to the point at which an image characteristic quantity is output on a client computer according to the fifth embodiment.
Figure 22:
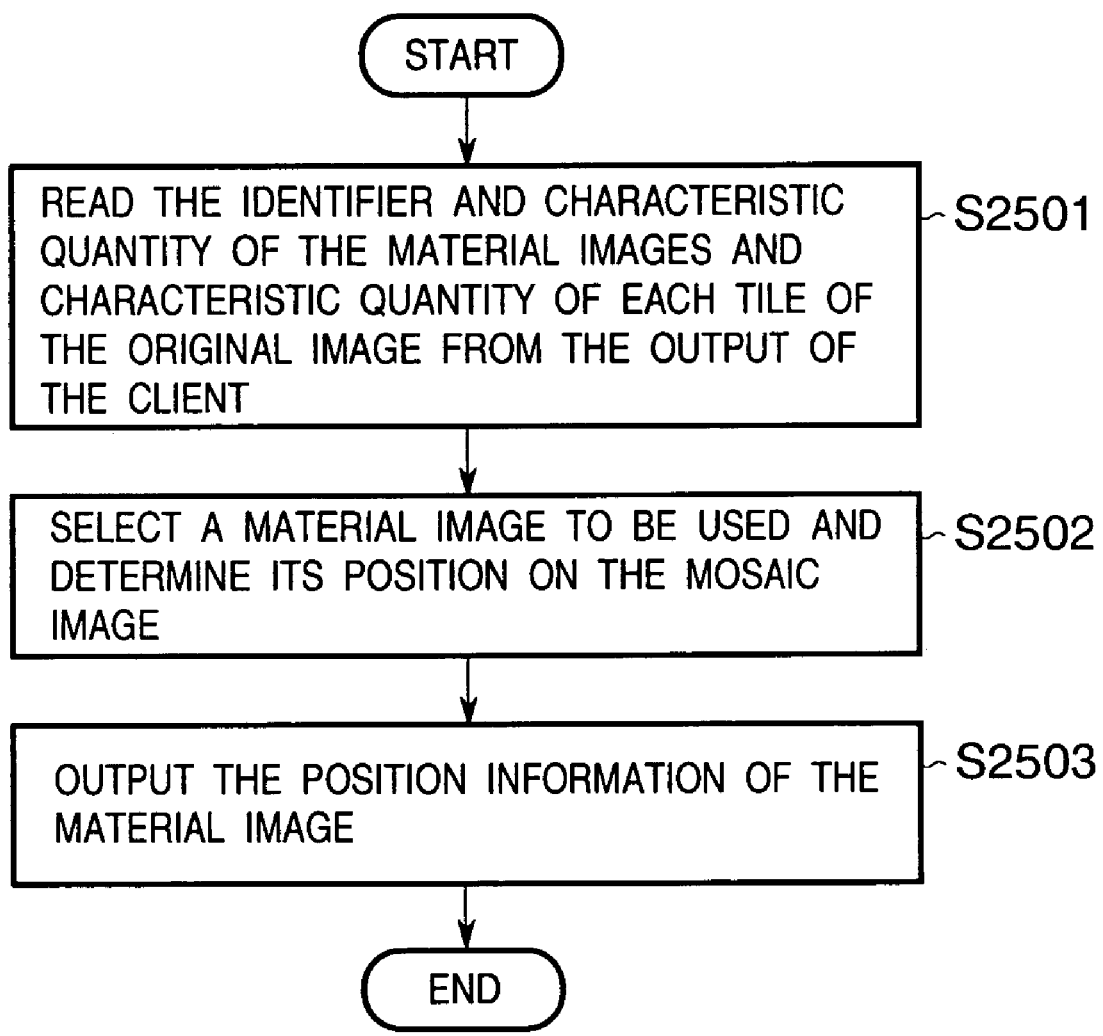
FIG. 22 shows a process flow on a server computer according to the fifth embodiment.
Figure 23:
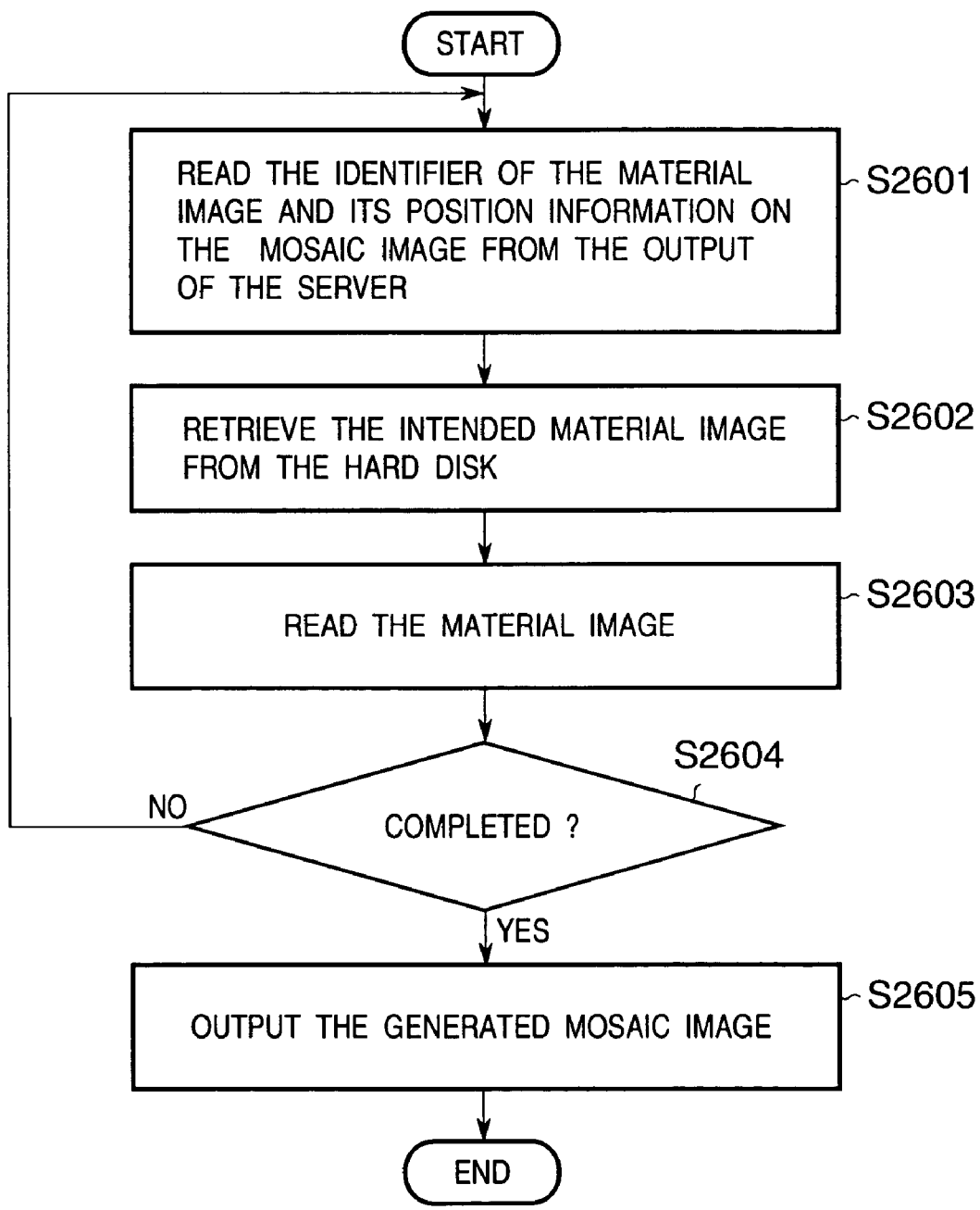
FIG. 23 shows a process flow for mosaic image generation on the client computer according to the fifth embodiment.

FIG. 11 shows a block diagram of a typical configuration of a client or a server computer system that performs image processing according to the fifth embodiment. Since this figure is the same as in the third embodiment, the description of which is omitted, except that a program executing procedures shown in FIGS. 21 to 23 is stored in the storage unit 102 for implementing the system according to the fifth embodiment.

Figure 20:
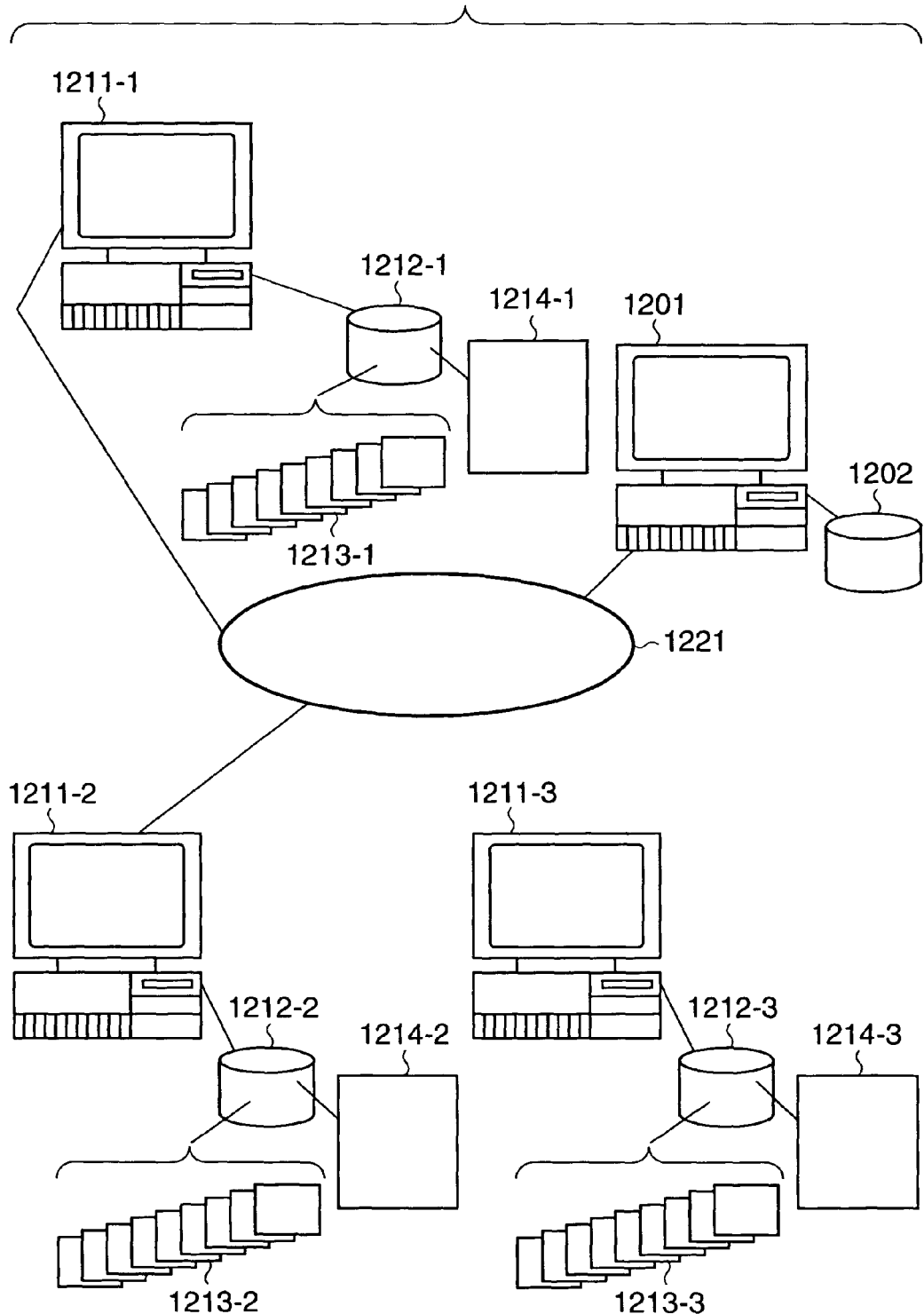
FIG. 20 shows a block diagram of the configuration of a system according to the fifth embodiment.

FIG. 20 shows a configuration of a system that performs image processing according to the fifth embodiment. A server computer 1201 is configured as shown in FIG. 11. Client computers 1211-1, 1211-2, and 1211-3 (hereinafter, only 1211-1 is described as a representative) are also configured as shown in FIG. 11. The server computer and the client computer are interconnected through a communication channel 1221.

As shown in FIG. 20, the server computer 1201 can be shared among more than one computer (e.g. 1211-1~1211-3).

The communication channel 1221 maybe an Ethernet cable, a public telephone line, or a wireless channel. Generally, it also refers to means for exchanging information between computers such as a floppy disk, CD-ROM, CD-R, MO disk, or other recording media on which information is recorded and distributed through common distribution channels.

A hard disk 1212-1 (1103 in FIG. 11) of the client computer 1211-1 stores an original image 1214-1 on which to base a mosaic image, and material images 1213-1.

An identifier (such as a file name or an image identifier) is applied to each of the material images 1213-1 stored on the hard disk 1212-1 of the client computer 1211-1. This identifier facilitates the finding of an intended image in the hard disk 1212-1.

FIG. 21 shows a process flow for outputting an image characteristic quantity on the client computer 1211-1 according to the present embodiment. The image characteristic quantity is the same as that described in connection with the first and second embodiments and is a value representing the characteristic of an image. The characteristic quantities may be, for example, the average density and the density distribution of an image. The steps shown in FIG. 21 are performed by the CPU 1101 of the client computer 1211-1.

The client computer 1211-1 reads a material image from the hard disk 1212-1 and calculates the image characteristic quantity of a material image according to a mosaic generation process performed by the server computer 1201 (S2301).

The image characteristic quantity will be used to determine the position of the intended material image on the mosaic image on the server computer 1201 as will be described below. While various methods may be used to determine the image characteristic quantity, the average density of RGB is used as the characteristic quantity in the present embodiment for ease of understanding.

The server computer 1201 will determine the placement of the material image in each segment (tile) in the original image based on this image characteristic quantity, i.e. the average density of RGB.

The image characteristic quantity of the material image may be calculated in advance, associated with the identifier of the image, and stored, for example, in the hard disk 1212-1. If the image characteristic quantity is calculated before the execution of the client program shown in FIG. 21, step S2301 in this program is not required to be performed.

Figure 26:
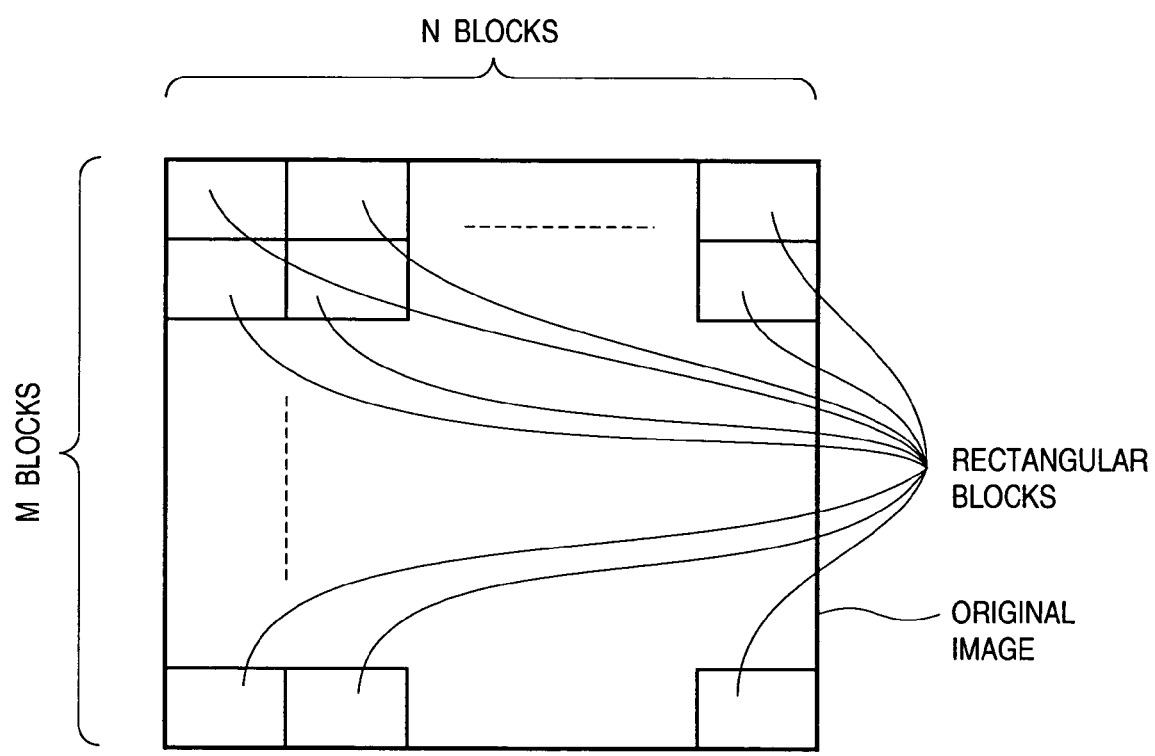
FIG. 26 shows division of the original image.

Next, the original image is read through a scanner 1108, divided into M (vertical)×N (horizontal) rectangular blocks as shown in FIG. 26, and the image characteristic quantity of each rectangular block (tile) is calculated (S2302).

While steps S2301 and S2302 are ordered as shown in FIG. 21 for explanation, the order is not essential. The order of the two steps may be reversed or they may be performed concurrently.

Then, the client program outputs the image characteristic quantity calculated at steps S2301 and S2302 (S2303). The output contains information of two broad categories: one concerning the characteristic quantity of the material image, which is calculated at step S2301, and the other concerning the characteristic quantity of the image in each tile of the original image, which is calculated at step S2302. The information concerning the characteristic quantity of the material image may be any in format as long as it includes at least the identifier required to retrieve the intended material image from material images 1213-1 and the characteristic quantity of each material image.

FIG. 24 shows an example of information concerning the characteristic quantity of the material image. In the code shown in FIG. 24, at first the number of material images (Data =1000) is described, then, the identifier (ID) of each material image and the characteristic quantities (RGB values) are described line by line. This format is just an example and any other information may be included as long as the number of material image and sets of ID and image characteristic quantity of each material image are contained.

FIG. 25 shows an example of information concerning the characteristic quantity of each tile in the original image. In the code shown in FIG. 25, at first the numbers of tiles along the vertical and horizontal axes (X=100, Y=250) are described. Then, the position of each tile (X,Y) and characteristic quantities (RGB values) of the tile are described line by line. This format is just an example and any other information may be included as long as at least the position of each tile and the image characteristic quantity of each tile are contained.

The characteristic quantity of the material image and that of each tile may be separately output or may be output as a unit in which one quantity is followed by the other.

The output of position information of the material image at step S2303 is provided from client computer 1211-1 to the server computer 1201 through the communication channel 1221.

The server computer 1201 receives the image characteristic quantity outputted from the client computer 1211-1 and creates a mosaic image according to the output information.

FIG. 22 shows a flow diagram of the process performed by the server computer 1201. These steps are performed by the CPU of the server computer 1201. The server computer 1201 first extracts the identifier and characteristic quantity of material images and the image characteristic quantity of each tile of the original image from the output of the client computer 1211-1 (S2501).

The server computer 1201 then calculates the similitude between the characteristic quantity of the material images and that of each tile of the original image, and determines a material image to be applied to each tile and its position on the mosaic image (S2502).

The server computer 1201 then outputs the position information including the material image and its position on the mosaic image determined at step S2502 (S2503).

The positioning information of the material image includes at least the identifier required to retrieve the intended material image from the material images 1213-1 stored on the hard disk 1212-1 of the client computer 1211-1 and information indicating the position of the selected material image on the mosaic image. The information may be in any format.

FIG. 14 shows an example of the positioning information of the material image. In the code shown in FIG. 14, at first the number of tiles along the horizontal axis (X=100) and the number of tiles along the vertical axis (Y=250) are described. Then, the position of each tile and the identifier (ID) of the material used for the tile are described on each line The positioning information of the material image output at step S2503 is provided from the server computer 1201 to the client computer 1211-1 through the communication channel 1221.

The client computer 1211-1 receives the positioning information of the material image from the server computer 1201 and creates a mosaic image according to the information. FIG. 23 shows a process flow of the mosaic image generation by the client computer 1211-1. These steps are performed by the CPU of the client computer 1211-1.

The client computer 1211-1 extracts information indicating a position on the mosaic image and the identifier of the material image to be applied to that position (S2601) from the output of the server computer 1201.

The client computer 1211-1 then retrieve the intended material image indicated by its identifier from the hard disk 1212-1 (S2602). The client computer 1211-1 calculates the actual coordinate on the mosaic image which corresponds to the position information read at step S2601 and reads the material image retrieved at step S2602 into an area on the main memory 1102 which corresponds to the coordinate (S2603).

The processes of steps S2601 to S2603 are repeated until all information included in the positioning information output from the server computer 1201 is processed (S2604).

After all the positioning information contained in the output of the server computer 1201 is processed, the generated mosaic image is output (S2605) and the process completes.

The generated mosaic image may be displayed on a monitor connected to the client computer 1211. Or, it may be output on a printer connected to the client computer 1211-1.

As described above, the client does not send the image itself to the server. Instead, it sends the characteristic quantities of the material image and the original image to the server. The server determines the position of the material image based on the characteristic quantities and returns the result to the client. The client applies the material image held by the client to each tile according to the positioning information from the server to generate the mosaic image. Thus, the image held by the client does not required to be sent to the server. Consequently, an unauthorized use of the image, which would otherwise be sent to the server, is prevented.

While in the present embodiment, t-he material image has been selected by calculating the characteristic quantities of the original image and the material image, the material image may be selected in other ways.

(Variation of Fifth Embodiment)

In the fifth embodiment, a computer system for generating a mosaic image has been described. The calculation of the characteristic quantity of material images at step S2301 in FIG. 21 and the selection of the desired material image at step S2502 in FIG. 22 may also be applied to a computer system for retrieving similar images.

A similar-image retrieval system is a system which retrieves an image similar to one input by the user from material images stored in a database and displays the selected similar image on a computer monitor to present it the user.

Applying the fifth embodiment to this image retrieval system, the client calculates the characteristic quantity of each image in a image database contained in the client and the characteristic quantity of the image to be retrieved, associates them with the identifier of each image, and sends them to the server. The server calculates the similitude between the characteristic quantity of the image to be retrieved and that of each image contained in the database and returns the identifier of an image that is determined as having a similitude exceeding a certain threshold to the client. The client outputs the image associated with the identifier returned from the server as the retrieved result.

Thus, the image database contained in the client can be searched on the server without sending the image itself to the server.

Because the client retrieves a similar image by using a material image owned by it as described above, no copyright problem associated with the material image will arise.

Similarly, because the client generates a mosaic image by using a material image owned by it, no copyright problem associated with the material image and generated mosaic image.

In addition, the material images can be specified by specifying the desired database out of a plurality of databases using a manual instruction on the image processing system, thus, the range of database choices is extended and various mosaic images can be formed.

Material images and other images are associated with each other through an identifier, thus a less amount of information is required to be output. The material image is selected based on its identifier and characteristic quantity, thus the process is performed faster.

Furthermore, the retrieval time can be reduced by calculating the characteristic quantity of the material image in advance, associating the identifier of the material image with it, and storing them in storage to eliminate the need for calculation of the characteristic quantity during the retrieval operation.

Sixth Embodiment

Technologies such as a FlashPix format are known in which image data is divided into a plurality of segments and managed. According to such an image storage technology in which an image is managed with a plurality of segments as a unit, a new image can be formed by combining segments of a plurality of images.

In such methods for forming an image with a plurality of segments, or, forming a new image by extracting segments from a plurality of images, the following procedures may be used.

Figure 35:
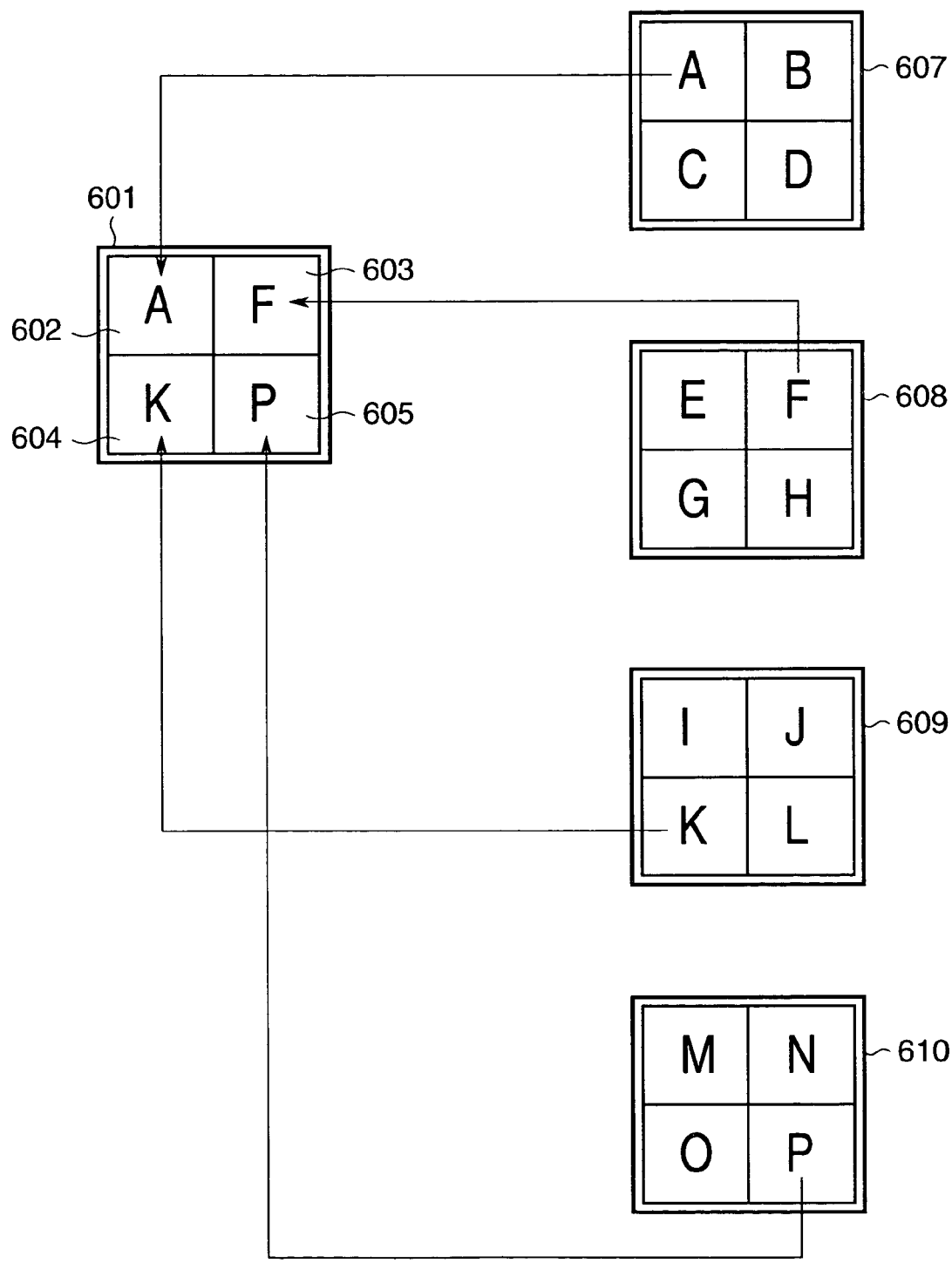
FIG. 35 shows how a new image is formed by combining images of a plurality of partial areas.

FIG. 35 shows how a new image is formed by combining segments from a plurality of images. Images 607, 608, 609, and 610 are existing images. Each image is divided into four segments: image 607 is divided into segments A, B, C, and D, image 608 into segments E, F, G, and H, image 609 into segments I, J, K, and L, and image 610 into segments M, N, O, and P.

Image 601 is an image newly formed by extracting segments from the four images 607 to 610 and combining them. Image 601 consists of four segments 602, 603, 604, and 605.

A segment extracted from images 607, 608, 609, and 610 is applied to each of these four segments. In the example shown in FIG. 35, segment A is applied to segment 602, segment F is applied to segment 603, segment K is applied to segment 604, and segment P is applied to segment 605.

As a result, new image data (image 601) which consists of segments A, F, K, and P is formed and stored in storage. Image 601 is said to be a mosaic image generated by using segments A, F, K, and P as material images.

When a new image data is generated and stored as described above, duplicated image data of the segment used for new image exists. In FIG. 35, because data of segments in the original images 607 to 610 are extracted and combined into the new image data 601, identical data exist redundantly: segment images A exist in image 601 and 607, segment images F exist in images 601 and 608, segment image K exist in images 601 and 609, and segment images P exist in images 601 and 610. Thus, when a new image data is formed by combining segments of existing images and stored it on media such as a hard disk, redundancy is produced duplicated data.

In a sixth embodiment, a image processing system is disclosed which avoids data duplication when image data such as a mosaic image formed by combining segments of existing images is stored, in order to allow storage media to be used efficiently.

FIG. 11 shows a hardware configuration for implementing an image processing system according to the present the sixth embodiment. The configuration is the same as in the third embodiment, therefore the description of which is omitted.

In FIG. 11, existing images contained in CD-ROM, stored in a hard disk 103, or images read through a scanner 108 can be used as original images for providing segment images.

Figure 27:
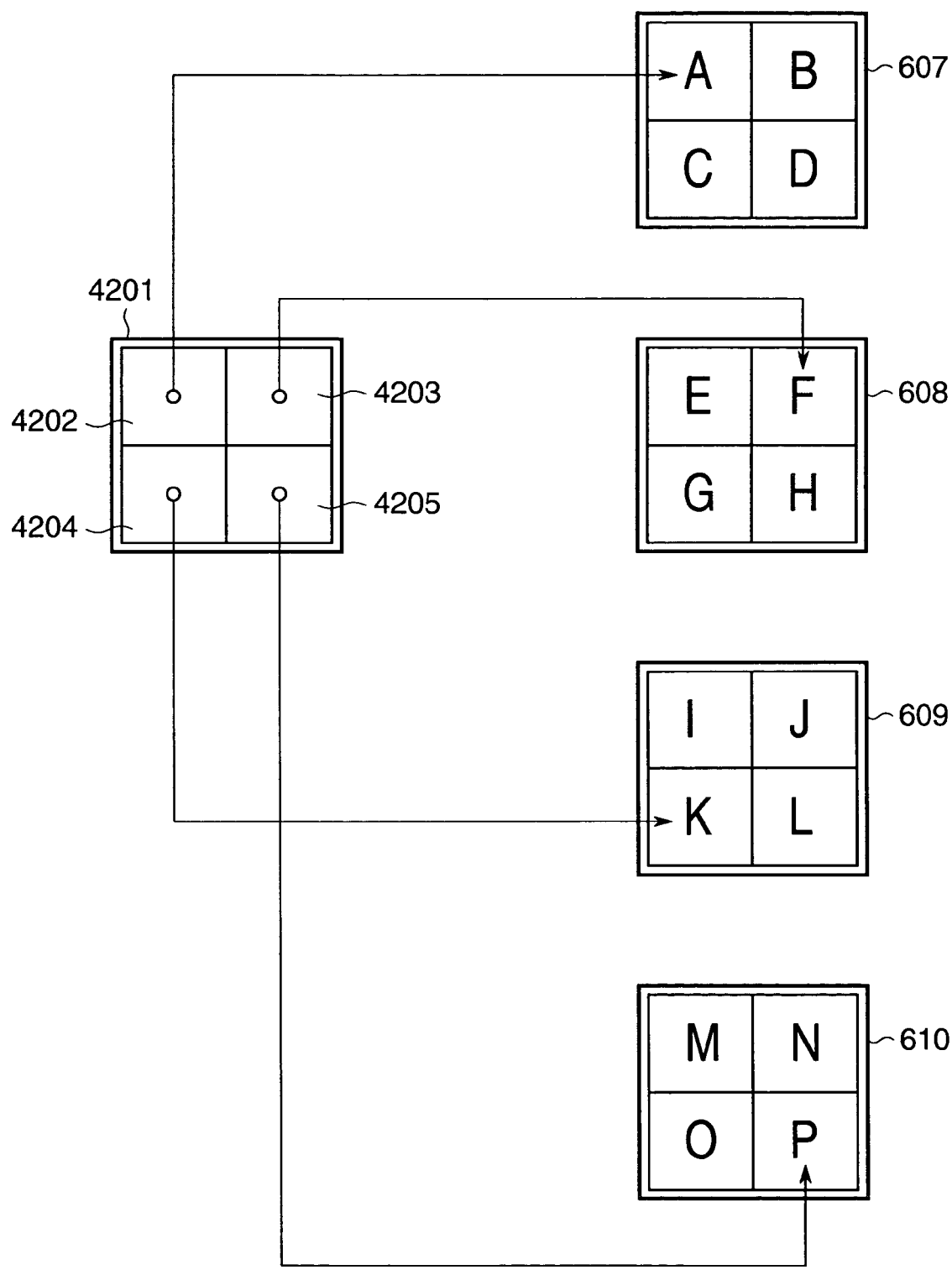
FIG. 27 shows the relationship between images generated and their original images according to a sixth embodiment.

FIG. 27 shows the relationship between an image being formed and its original images according to the embodiment. In FIG. 27, images 607, 608, 609, and 610 are original images and stored in a hard disk 1103, CD-ROM 1107, or a database 1110 connected to the system through a network interface. The original images may be images read through a scanner 1108 and stored in the hard disk 1103.

Each of images 607 to 610 is divided into rectangular segments, such as A, B, C, and D and each segment image data which represents each segments is managed separately. The image data representing each of images 607 to 610 has an image data file format as shown in FIG. 28.

Figure 28:
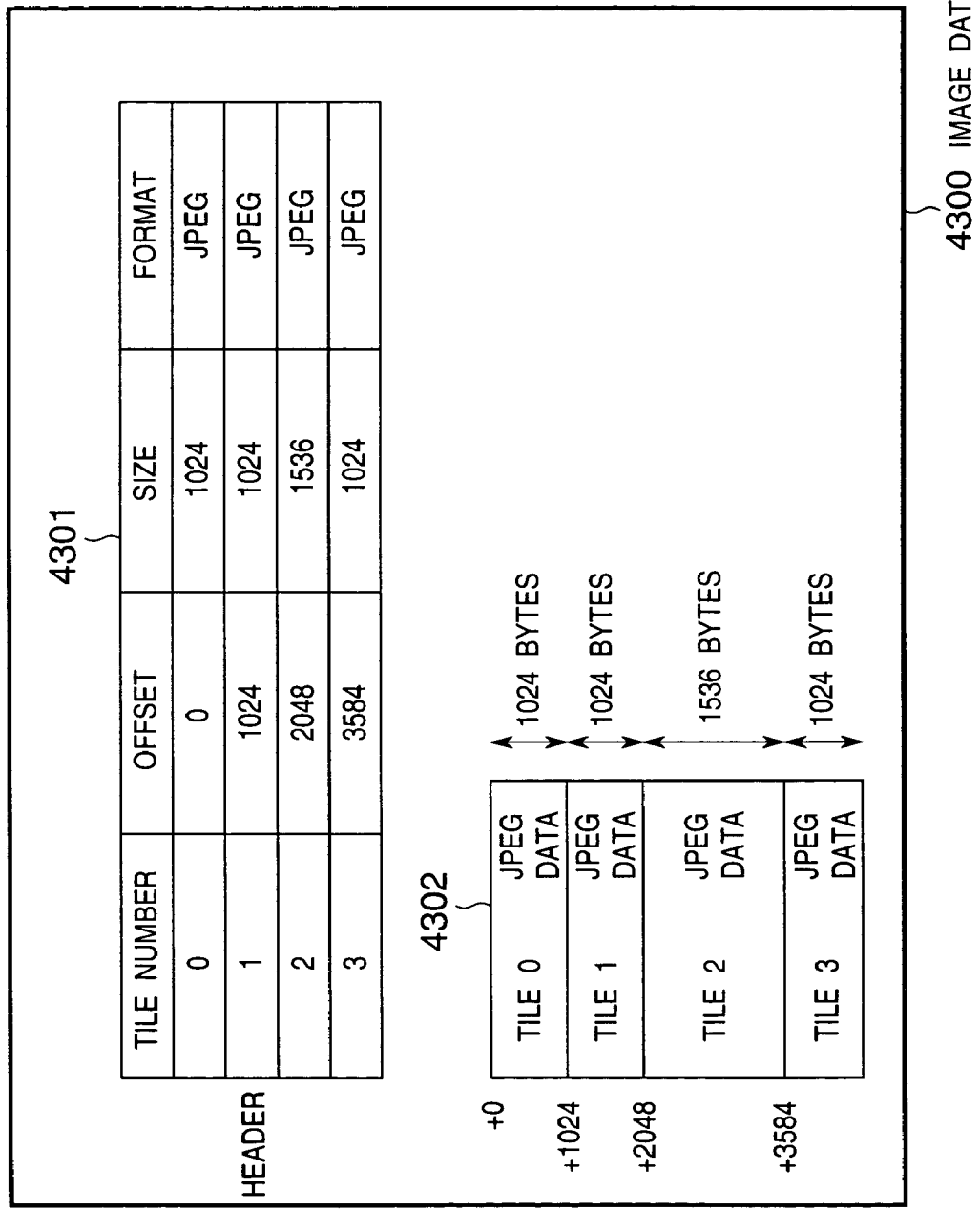
FIG. 28 shows an example of the data structure of an image data file for management of division for each partial area.

FIG. 28 shows an example of a data structure of an image data file for managing each segment separately. In FIG. 28, a header 4301 contains information about image data and a data part 4302 stores actual data. In the header 4301, a tile number represents the position of each segment (herein after also referred to as a tile). For example, tile number 1 of the image 607 corresponds to segment A and tile number 2 corresponds to segment B. The header 4301 contains, for each tile, the address indicating a location. where actual image data is stored, the size and format of the image data. The address of the image data is indicated by an offset from the beginning of the data part. For example, segment A (tile number 0) is stored from the beginning (offset 0) of the image data part 4302 and has a size of 1024 bytes and a data storage format of JPEG compression, as shown in the figure. Similarly, segment B (tile number 1) is stored from the 1024th byte from the beginning of the image data part, and has a size of 1024bytes and a storage format of JPEG. Similar information is indicated in the headers for segments C and D (tile number 3, 4). The number of tiles in a image is determined uniquely if the width and height of the image and the width and height of the tile are specified. Accordingly, the header contains information indicating the width and height of each tile.

The data structure described above and shown in FIG. 28 allows data of a desired segment to be obtained from the image data file 4300. That is, by specifying a file name and a tile number, image data corresponding to the specified in the specified file can be obtained.

In FIG. 27, image 4201 is an image ("integrated image") formed by combining segments of existing images. In this example, the integrated image 4201 is divided into four segments 4202, 4203, 4204, and 4205, and as image data for these segments, segment A of image 607, segment F of image 908, segment K of image 609, and segment P of image 610 are referenced, respectively. That is, image 4201 does not contain actual image data. It contains, an indicator, for example a file name or a URL, which indicates the location of image data and a tile number or a tile position data indicating a tile to which the image is applied.

Figure 29:
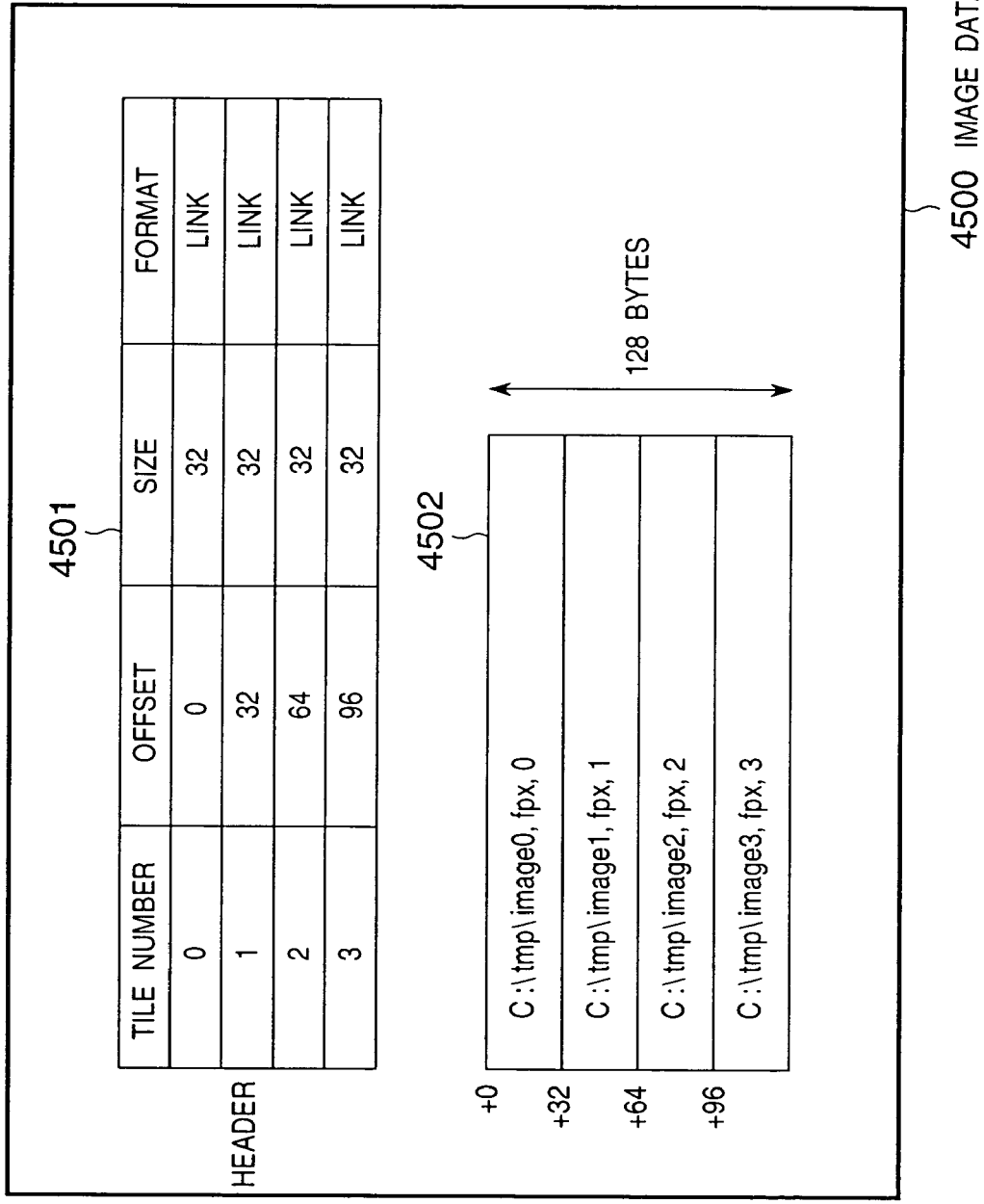
FIG. 29 shows an example of the data structure of an image data file for an integrated image according to a sixth embodiment.

FIG. 29 shows a exemplary data structure of an image data file of an integrated image according to the embodiment. As with the data format shown in FIG. 28, image data 4500 has a header 4501 and a data part 4502. In FIG. 29, the header 4501 contains, for each tile, an offset to the address in which the image data is stored and the size and format of the image data. The data format differs from the one shown in FIG. 28 in that a "link" representing a reference is added as an image format. A "link" indicates that the actual data of the tile is not contained in that image data file, instead, in another file, for example in a file on a hard disk 103 or CD-ROM, or in a file in a image database to which the system is connected through a network.

If the data format is a "link," the content of the data part 4502 will be, for example, "C:\tmp\image0.fpx.0" where the number following comma after the filename "image0.fpx" is a tile number in the image file "image0.fpx." Accordingly "C:\tmp\image0.fpx,0" indicates image data of tile number 0 in the file "C:\tmp\image0.fpx."

The process for generation such a file is described bellow with reference to a flowchart.

Figure 30:
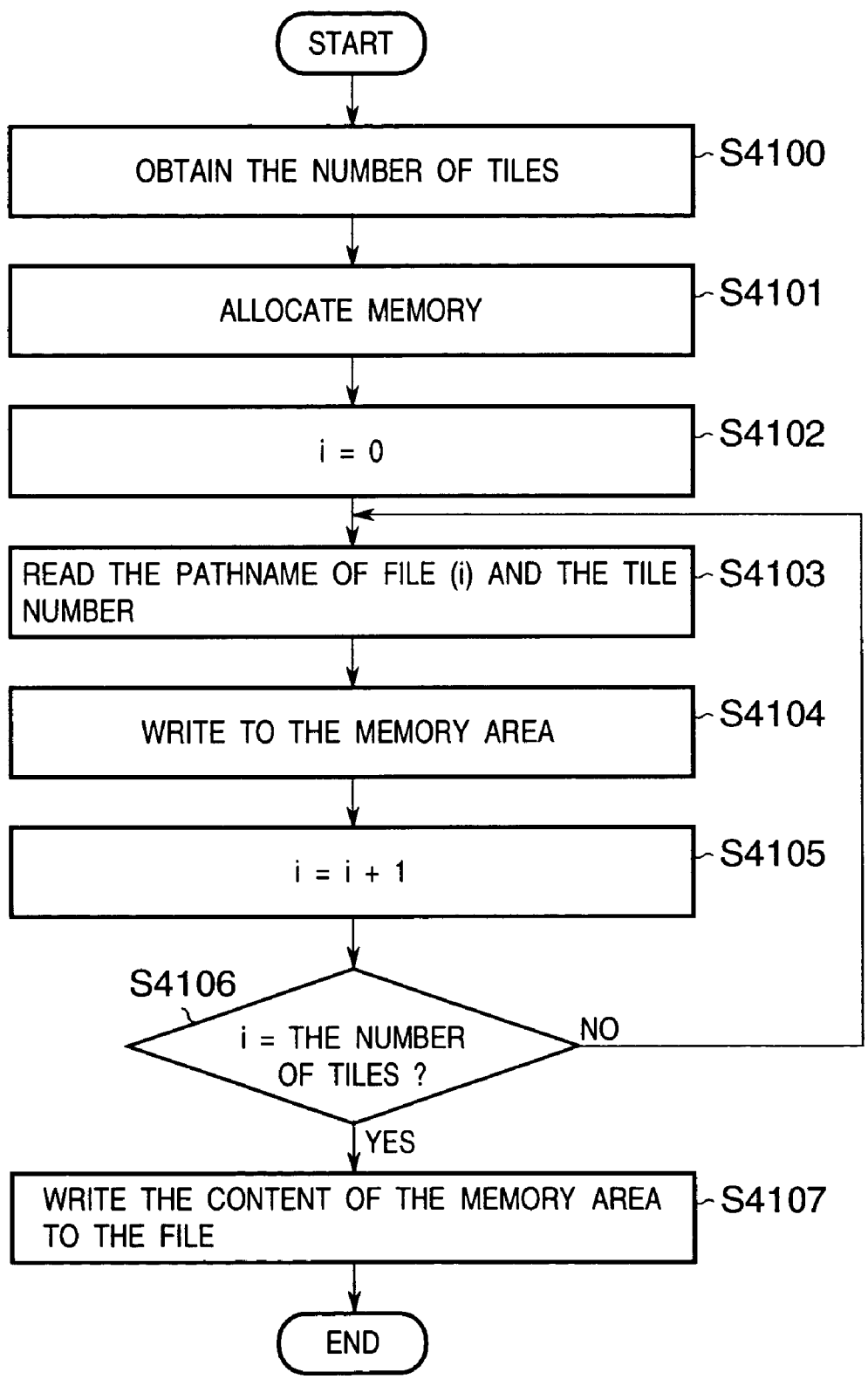
FIG. 30 shows a flowchart describing a procedure for generating an integrated image file according to the sixth embodiment.

FIG. 30 is a flowchart showing a procedure for generating an integrated image file according to the embodiment. First, the number of tiles in the integrated image is obtained at step S4100. In this example, it is assumed that the number of tiles is four. An area required for constructing the image 4201 on memory 1102 is allocated. In this example, 32 bytes of memory is allocated to the data part 4502 for each tile. Therefore, required memory is 32 ×4=128 bytes. Four byte of memory is allocated to each of the tile number, offset, size, and format values in the header 4501 for each tile (16 byte in total). At step S4102, the counter is initialized.

At step 4103, the image file name the segment number (tile number) to be referenced for segment 4202 is read. At step S4104, the image file name and the tile number are written in the format as shown in FIG. 28 into the memory. Similar process is performed on al of the segments. After process are performed for all the tiles (four segments in this example), data as shown in the data part 4502 in FIG. 29 is generated. The data in the memory 1102 provided as described above is, for example, written in the hard disk 1103 at step S4107.

At step S4103, the image file name and the segment number to be referenced may be input by the user through the keyboard, or an image similar to each segment (tile image) may be retrieve rom an image database. In the embodiment, there is no restriction on how an image filename and segment number are obtained.

According to the embodiment described above, a new image data generated by combining segments of existing images can be represented by references to each of the existing images to prevent duplication of image data of each segment, allowing an efficient memory use.

In this example, all images (original images) to be retrieved are contained in the hard disk 1103. Therefore, the description of all references in the data part are full path data filenames. However, the reference is not limited to within the same machine. A reference to data on a network such as the Internet may be used.

Figure 31:
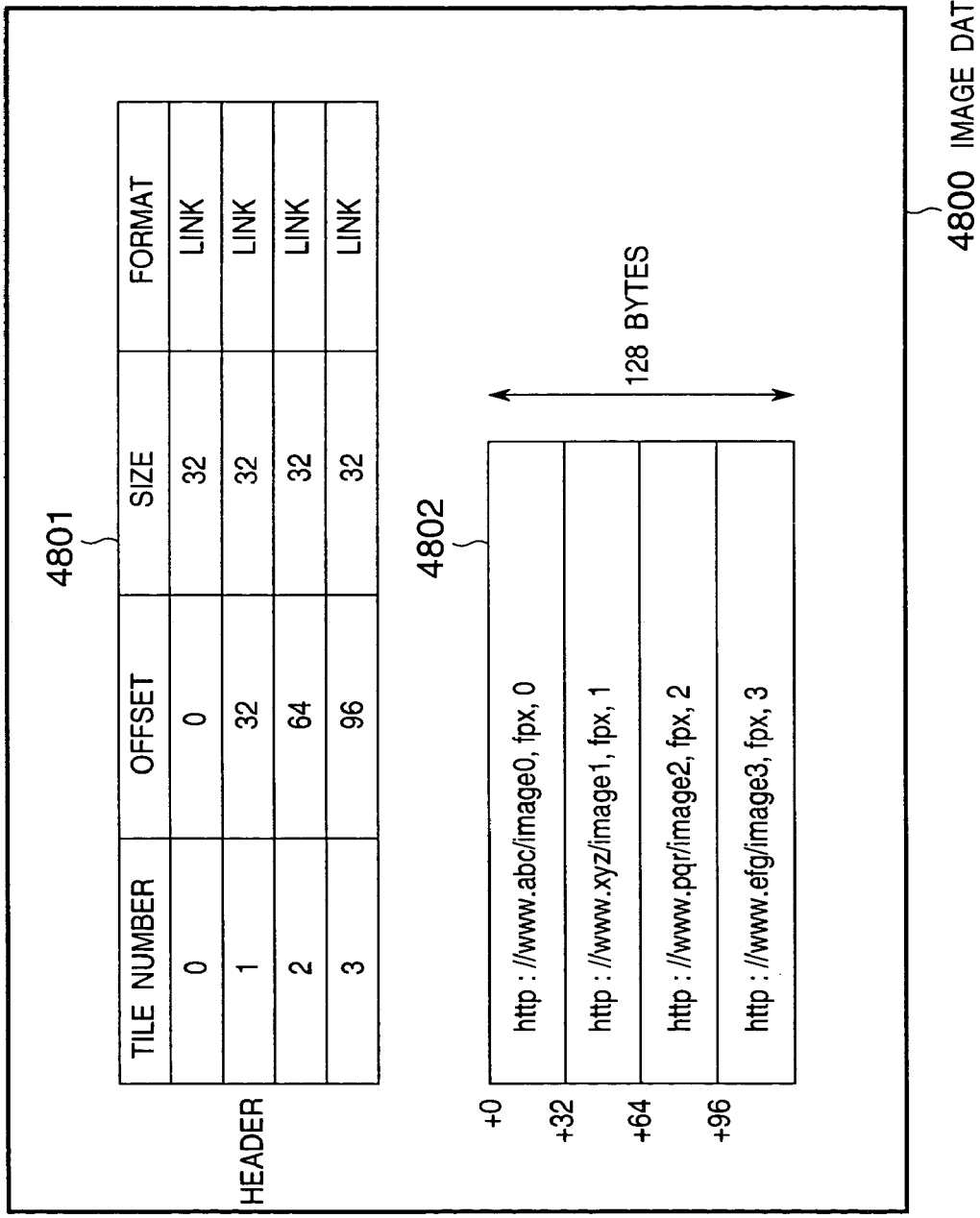
FIG. 31 shows an example of the data structure of an image data file according to the sixth embodiment.

FIG. 31 shows a data structure of an image data file which references to image data resides on a WWW server connected through the Internet.

FIG. 31 shows a data structure of an image data file which references image data resides on a WWW server on the Internet. In FIG. 31, segments of images in various locations on the network are specified as a data to be linked. The header 4801 is the same as that in FIG. 29. Files on the network are specified as data in the data part 4802.

In the example shown in FIG. 31, URLs (Uniform Resource Locators), which are generally used on the Internet, are used to specify files on the network. However, files may be specified in other ways. For example, if other network such as a Local Area Network is used, a file specification appropriate for its protocol may be used.

While in the examples in FIGS. 29 and 31 all integrated data files consist of references, references and image data may be mixed. FIG. 32 shows a data structure of an image data file. In the header 4901, JPEG is specified as the format of the image data of tile number 0 and image data of JPEG format is stored at the position in the data part 4902 indicated by offset 0.

In the example in FIG. 32, an image file in the hard disk, an image file contained in CD-ROM, and an image file on the network are specified as link targets. For example, "C:\tmp\image1,1" indicates that the tile 1 in the image data file "image1" in the holder "tmp" on the hard disk (drive C) is referenced. Similarly, "E:\images\image2,2" indicates that tile 2 in the image data file "image2" in the holder "images" on the CD-ROM (drive E) is referenced. "http://www.abc/image3,3" indicates that tile 3 in the file "image3" managed at a WWW server having the address "abc" on the Internet is referenced.

In this way, the image processing system generates an integrated image by specifying image data stored in computers or media that are accessible to the system as a reference target, regardless of the location of the original image data.

Figure 33:
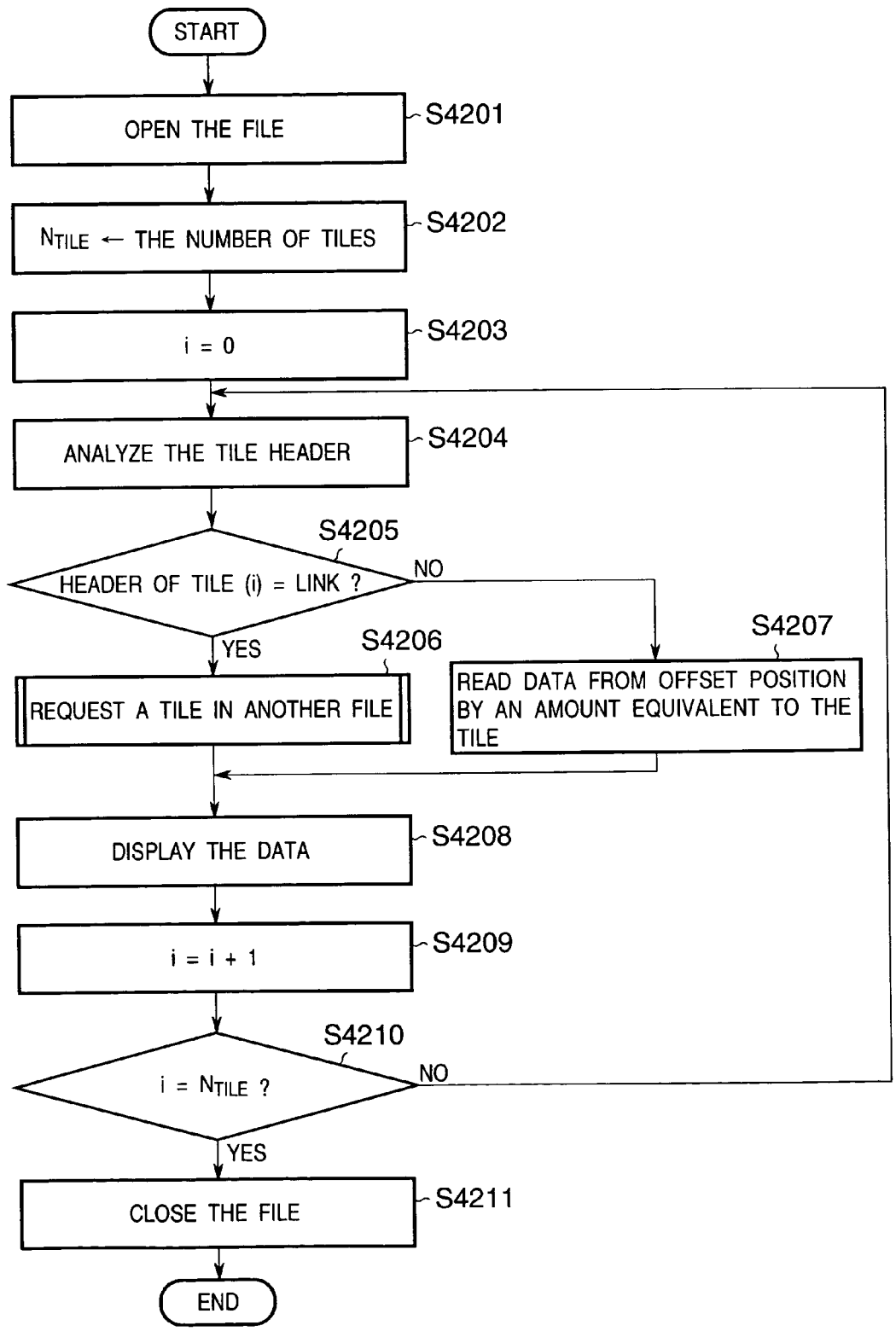
FIG. 33 shows a flowchart of a procedure for an image data read operation according to the sixth embodiment.

A process for reading image data of the integrated image stored according to the embodiments described above is described bellow. FIG. 33 is a flowchart describing a procedure for reading image data according to the present embodiment.

First, an image data file stored in a format described in above embodiments is opened at step S4201. The header of the image data file is referenced to obtain the number of segments (tiles) and stored invariable $N_{TILE}$ at step S4202. The counter is reset at step S4203.

Next, an entry corresponding to the tile number represented by a variable "i" in the header is analyzed at step S4204. If the result of the analysis indicates that the data format corresponding to the tile number is not "link," the procedure proceeds from step S4205 to step S4207 and data is read from the offset position in the data part by an amount equivalent to the size of the tile.

If the result of the analysis at step S4204 indicates that the file format is "link," the procedure proceeds from step S4205 to step S4206 and a program for reading a segment image data in another file is activated. The procedure of the program is shown in FIG. 9. Data indicating the location of the required segment, which is stored in the data area (indicated by the offset) corresponding to the tile is passed to the program as an argument. For example, for tile number 0 in the example shown in FIG. 29, "C: \tmp\image0.fpx,0" is passed as an argument to the program for reading the segment image data.

At step S4206, the segment data is retrieved from the referenced file. The procedure at step S4206 will be described later in connection with FIG. 9.

At step S4208, the obtained image data is displayed on a monitor 1105. At this point, if other tiles are already displayed on the monitor, the new segment image is displayed in an appropriate relationship with the displayed tile. For example, when segment 4203 is displayed on the display on which segment 4202 is already displayed, segment 4203 is placed to the right of the segment 4202. Furthermore, when segment 4204 is displayed, it is placed below segment 4202.

Steps S4204 to S4209 are repeated until the counter i reaches $N_{TILE}$ to display all the segments in the image file. After all the segments are processed, the procedure proceeds from step S4210 to step S4211 and the image file is closed.

Figure 34:
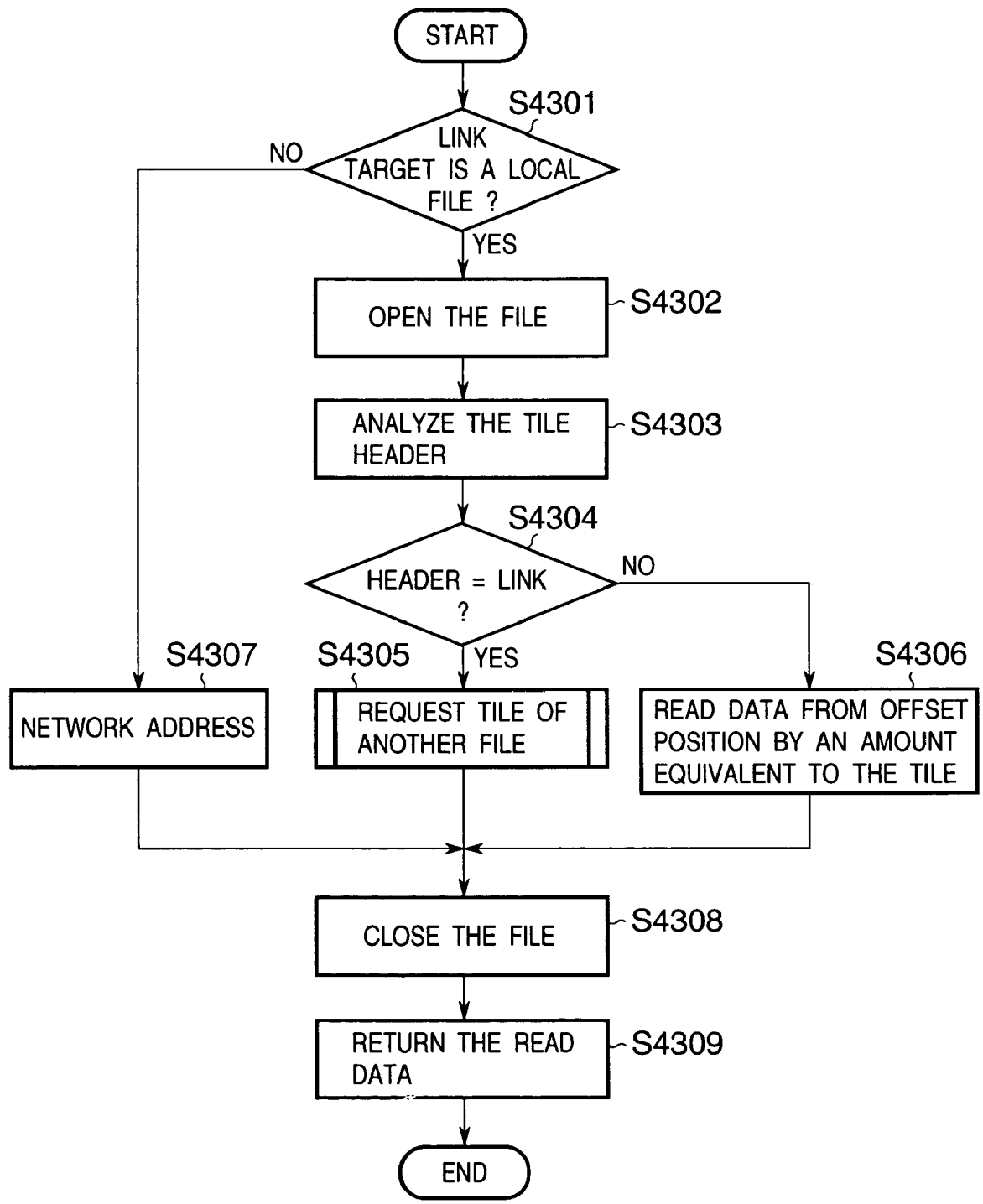
FIG. 34 shows a flowchart of a procedure for linking procedure to another file according to the sixth embodiment.

FIG. 34 is a flowchart describing the process performed at step 4206 as shown in FIG. 33. The process is invoked when the referenced file is required. In the example description below, the reference target "C: \tmp\image0.fpx,0" or "http://www.abc/mage3.3" is passed to the program as an argument.

At step S4301, it is determined whether the reference target is in a local file or a remote file connected through the network. For example, if the reference target "C: \tmp\image 0.fpx,0" is passed to the program, the program determines that the link target is a local file in the local drive (drive C) of the machine based on the description of "C:". On the other hand, if the reference target "http://www.abc/image3.fpx.3" is passed to the program as an argument, the program determines that the link target is a remote file on the network.

If it is determined that the target is a local file at step S4301, the process proceeds to the step S4302 and a file named "C:\tmp\image0.fpx" is opened. Then, at step S4303, as indicated by the value "0" that specifies the segment passed with the referenced filename, the 0th tile header of the opened file "image0.fpx" is analyzed. If the type of the header is not "link," required image data is read from the file. That is, the process is the same as step S4207 described above.

On the other hand, if the header of the tile indicates "link," the process proceeds to step S4305 and a program for reading another file is activated. That is, the program shown in FIG. 34 is executed recursively.

If it is determined that the link target is a remote file on the network at step S4301, the process proceeds to step S4309 and a network access process is activated. In the network access process, a file stored in a server through the network interface 1106 is accessed. For example, if "http://www.abe/image3.fpx,3" is specified, a WWW server at the network address "abc" is accessed and the image file "image3.fpx" is obtained. Then, the processes of steps S4302 to S4306 are performed on this obtained image file.

After the image data of the required tile is obtained as described above, the process proceeds to step s4307 and the file is closed. Then, the image data read at step S4308 is passed to the calling program.

Thus, according to the embodiment, image data stored in the format as described above and shown in FIGS. 28, 29, 31, and 32 can be displayed on the monitor 105. The output target is not limited to the monitor. The image data may be output on a printer 1109.

If the integrated image data references an image file, tile retrieval of tile images from the image file is performed recursively. Thus, even if the linked image file is linked to another file, the tile image can be obtained properly.

While at step S4307 the specified segment (tile) in the specified image file is downloaded, the embodiment is not limited to that implementation. The entirety of the specified image file may be downloaded to the local disk before execution of the processes of step S4302 to S4306. This implementation allows for "caching." In such implementation, even if the specified image file does not link to a local file, when there is a hit in the cache, the process at step S4301 branches to "YES" and steps S4302 to S4306 are performed. In this way, when a number of tiles are retrieved from the same image file, retrieval over the network is not required once the file is downloaded, thus the processing speed is improved.

As described above, according to the embodiment, when a new image is formed by obtaining segment images from existing image files, the image file representing the formed image includes only the reference to the original image. Thus, the size of the image file is reduced. In addition, when the original image is modified, the latest information at the time of reference can be obtained without updating the image file for the formed image.

In addition, this embodiment is applicable to the case where a mosaic image is generated as described in the first to the fourth embodiments. That is, instead of including image data of a material image in an image data file that constitutes a mosaic image, link information to the material image is included in the image data file.

In the embodiment, the image file may be the file stored in the FlashPix format. The description of the multi-resolution concept with a plurality of resolutions in FlashPix™ has been omitted for simplicity of explanation. If the multi-resolution structure is used, for example, the image data specification "filename +layer number +tile number" may be used instead of "filename +tile number" in the data part 4502 shown in FIG. 29.

As described above, according to the embodiment, duplication of the same image data is avoided when an image data generated by combining segments of existing images is stored so that the memory media can be used efficiently.

Seventh Embodiment

In a situation where an image file is on the client and information relating to that image file is on a server accessible through a communication channel, if information is obtained from the server by using the image contained in the client, more specifically, if, from a segment image file, a whole-image file on the server is obtained, from an image file, the latest updated image on the server is obtained, from an image file, another image similar to the image is retrieved, or from an image file, bibliography information concerning it is obtained, the relationship between the image file on the client and the image to be retrieved (or the server) should be indicated by, memorizing or writing down the relationship by the user to record it, or providing data (for example, Hyper Link format data such as HTML) for managing the relationship by the user or the administrator of the server.

For example, in the mosaic image generation system according to the third and fourth embodiments, scale-down images of images contained in an image database held by the server are downloaded to a client. In such a case, information indicating the relationship between the scale-down images held by the client and the original images held by the server should be kept in the server and/or the client. However, the description of the relationship between the image data on the client and the image data on the server is outside of he image data files. Therefore, if, for example, the information indicating the relationship is lost or forgotten, the relationship would be lost.

In an image communication system according to the seventh embodiment, an identifier is embedded in a replicated-image file generated from whole or part of an original image file on a image communication server and the relationship between the identifier and the original image is kept on the server. The identifier allows the replicated image on the client to be associated with the original image on the server, so that the information about the original image on the image communication server corresponding to the replicated image can be easily obtained from the image communication client program.

Figure 36:
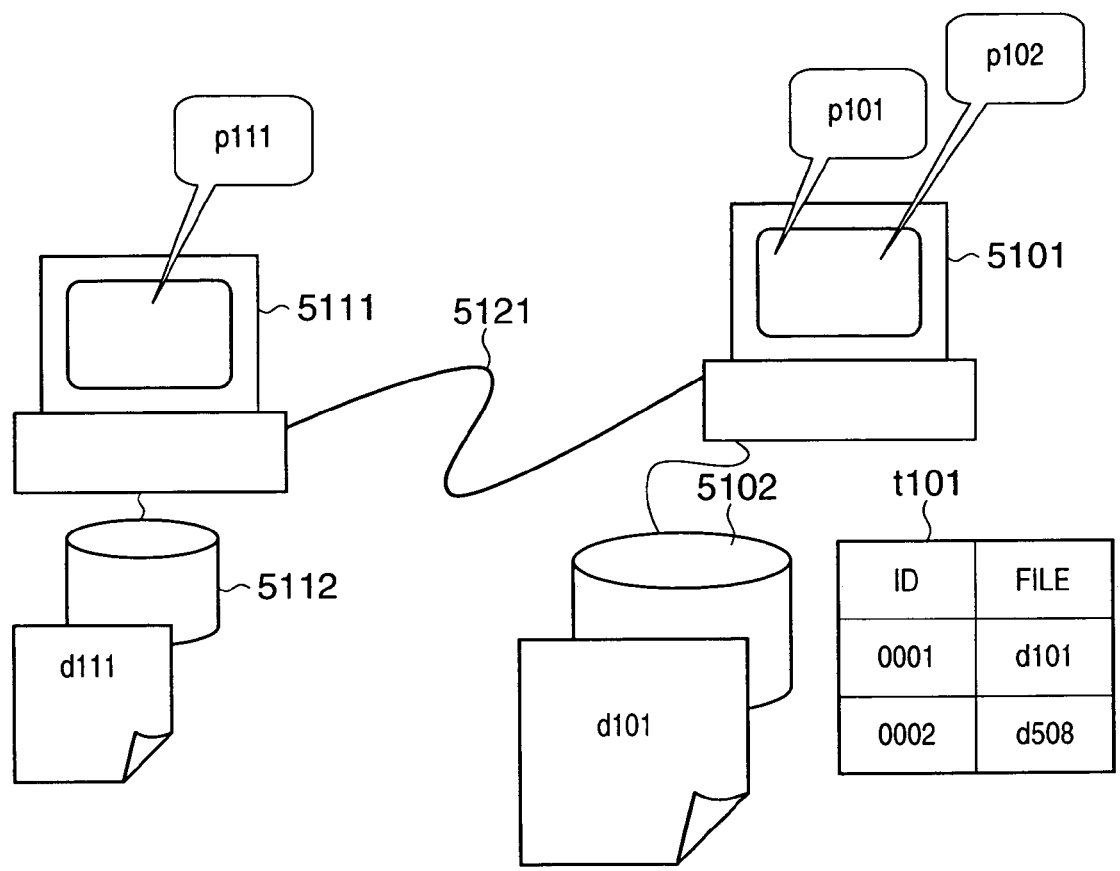
FIG. 36 shows a system configuration according to seventh and eighth embodiments.

FIG. 36 shows a system according to the embodiment. In FIG. 36, an image communication server 5101 provides an image communication service according to the present invention. A storage device 5102 stores image files provided by the image communication server 5101 and connects the image communication server 5101.

Inside the image communication server 5101, an image communication server program p101 and an image replication program p102 are running, and a correlation table t101 that indicates the correlation between replicated-image file identifiers and original images is contained in a storage area to which both of the image communication server program p101 and the image replication program p102 can be referred.

Image files are stored in the storage device 5102 and, for example, the operator can select a desired image file as an original image file d101.

An image communication client 5111 is a client machine of the image communication service and an image communication client program p111 is running on it.

A storage device 5112 is connected to the image communication client 5111. The storage device 5112 stores a replicated-image file d111. The replicated-image file is generated by the image replication program p102 from an original image filed d101 and has an identifier within itself. In this example, it is assumed that the replicate-image file d111 has been provided by the image communication server 5101 to the image communication client 5111 through some means such as a communication channel or recording media.

The image communication server 5101 and the image communication client 5111 are interconnected through an information connection channel 5121 and can communicate with each other. The image communication channel 5121 may be any communication channel that enables the server and the client to communicate with each other. While the channel 5121 typically is a wired connection such as an Ethernet cable, a telephone line, or a RS232C, it may be other connections, such as a wireless connection through radio waves or infrared rays, or a their combination. The communication channel 5121 may include a number of intermediary machines or programs (for example, relay stations, or relay programs such as proxy programs).

Each of the image communication server 5101 and the client 5111 is configured as shown in FIG. 11. The storage devices 5102, 5112 may be the same as the storage 1103 of the serve 5101 and the client 5111.

Figure 40:
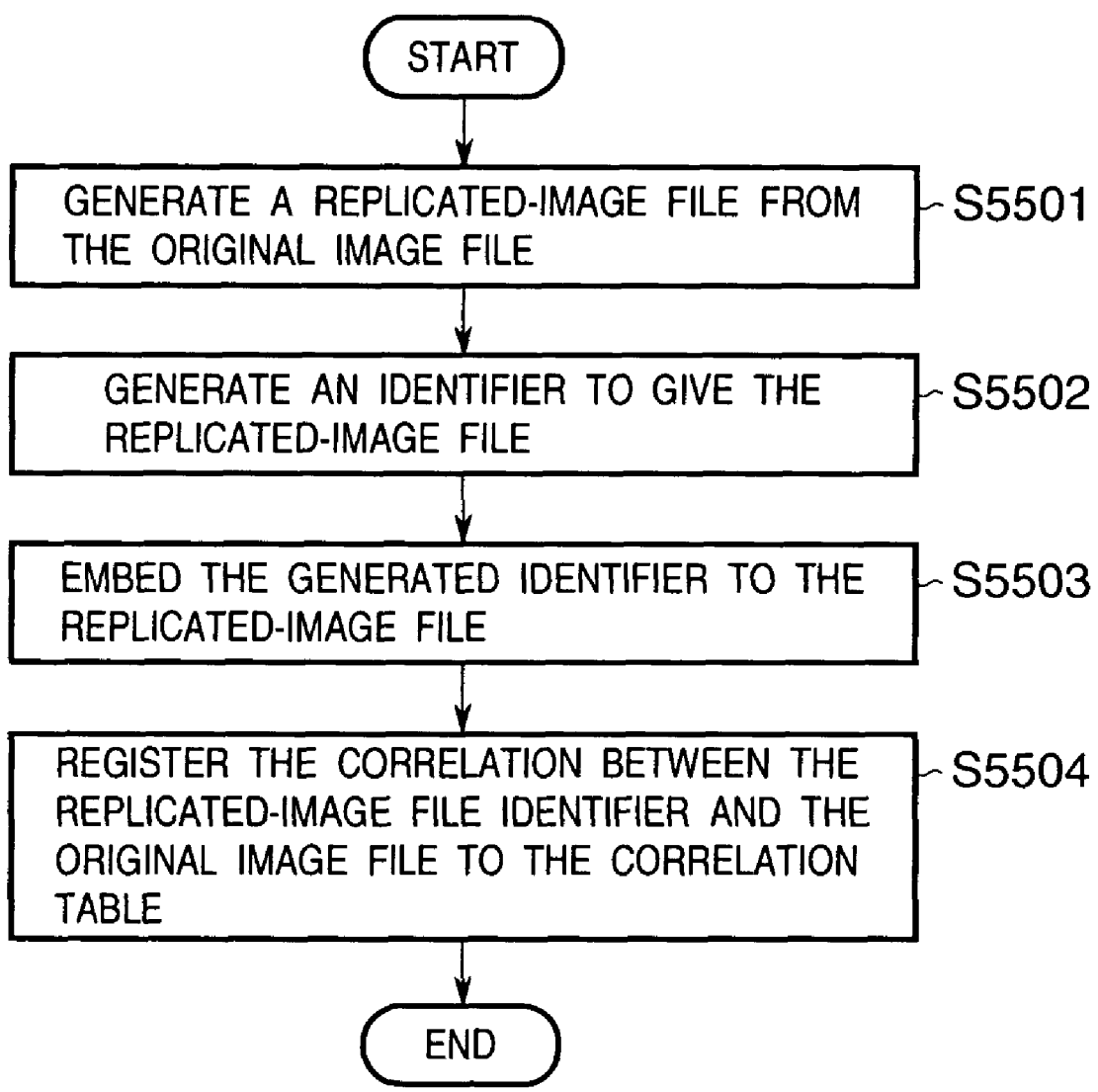
FIG. 40 shows a process flow of a duplicated image generation program.

FIG. 40 show a process flow of the image replication program p102.

The image replication program p102 first generates a replicated-image file d111 from the whole or a part of an original image file d101 contained in the storage device 5102 for distribution (S5501). It then generates an identifier to be added to the replicated image file d111 (S5502). The replicated-image file identifier may be simply a string of characters or digits, or may be an identifier that contains information about the location of the image communication server 101 on the communication channel 121, such as a URL (Uniform Resource Locator) or a telephone number. Next, the image replication program embeds the generated identifier in the replicated-image file (S5503). The program p102 then enter the correlation between the replicated-image file identifier and the original image d101 into the correlation table t101 (S5504).

The arrangement of the steps S5501 to SS04 described above is only for explanation. The order of these steps may be changed or some steps may be combined into one step.

The identifier may be embedded in the original image file in advance and the identifier embedded in the original image may be copied to the replicated-image file as replicated-image file identifier at step S5501. Some data, for example a character string, may be added to the identifier pre-embedded in the original image file, or the pre-embedded identifier may be converted into some value by an appropriate operation to apply the converted value to the replicated-image file as its identifier.

The replicated-image file d111 generated as described above is provided to the image communication client 5111 by some means. The providing means may be recording media such as a floppy disk or CD-ROM on which the replicated-image file d111 is recorded and which is provided to the user of the image communication client. Alternately, the replicated-image file d111 may be contained in the image communication server 5101 or another server on the communication channel 5121 or other communication channels, and the image communication client 5111 may read and store it in the storage device 5112. Or, the replicated-image file d111 maybe contained in the image communication server 5101 or another server on the information communication channel 5121 or other communication channels, and the image communication client 5111 may read and store it in the storage device 5112. Or, other methods may be used.

Figure 37:
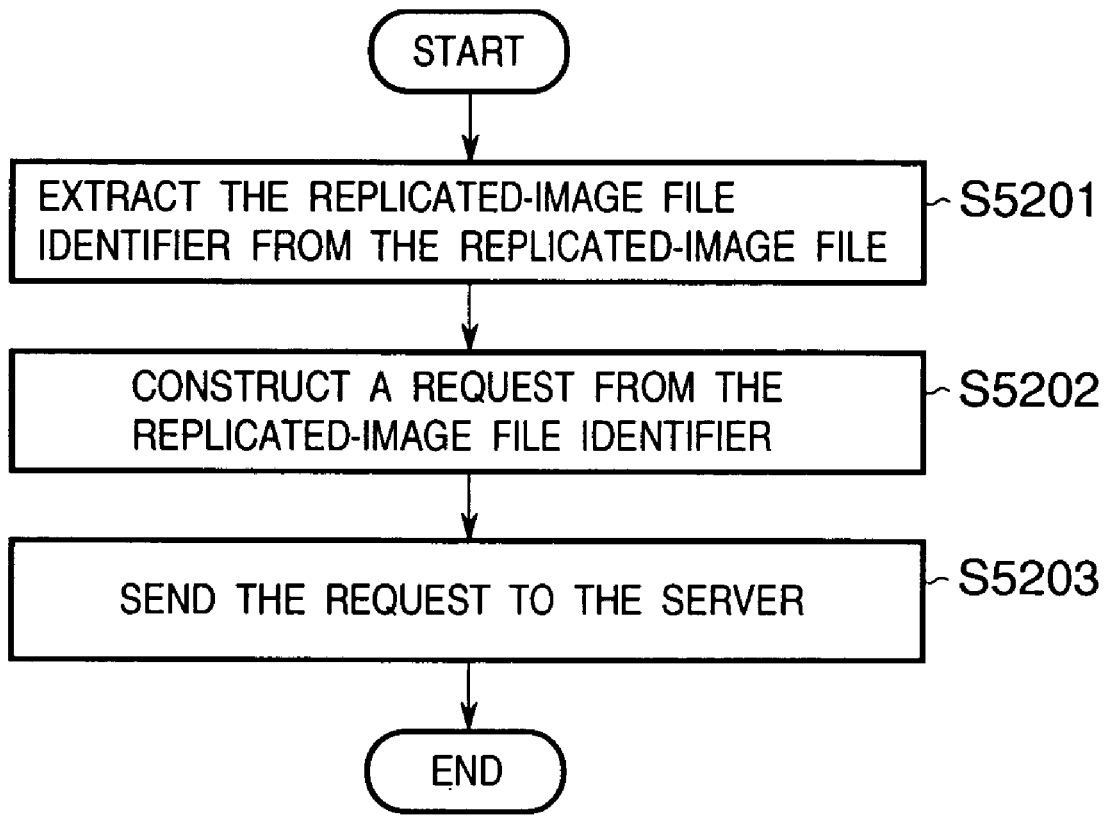
FIG. 37 shows a process flow of a client program according to the seventh embodiment.

FIG. 37 shows a process flow of the image communication client program p111.

The image communication client program p111 running on the image communication client 5111 looks up the replicated-image file d111 stored in the storage device 5112 and retrieves the replicated-image file identifier embedded in it (S5201). It then constructs a request containing the replicated-image identifier based on the replicated-image identifier retrieved at step S5201 (S5202) and sends the request to the image communication server 5101 (S5203). The request is issued in order to request the original image file d101 itself or information relating the original image file d101. If the replicated-image file identifier does not contain information about the location of the image communication server 5101, the request can be constructed and sent to the server 5101 by using information about the location of the image communication server 5101 on the communication channel 5121, which is included in advance in the image communication client program p111.

The series of processes by the image communication client program p111 may be transparent to the user. Therefore, for example, the user interface of the client program p111 may present the replicated-image file d111 to the user and have the user perform an operation which initiates the request process of the client.

Figure 41:
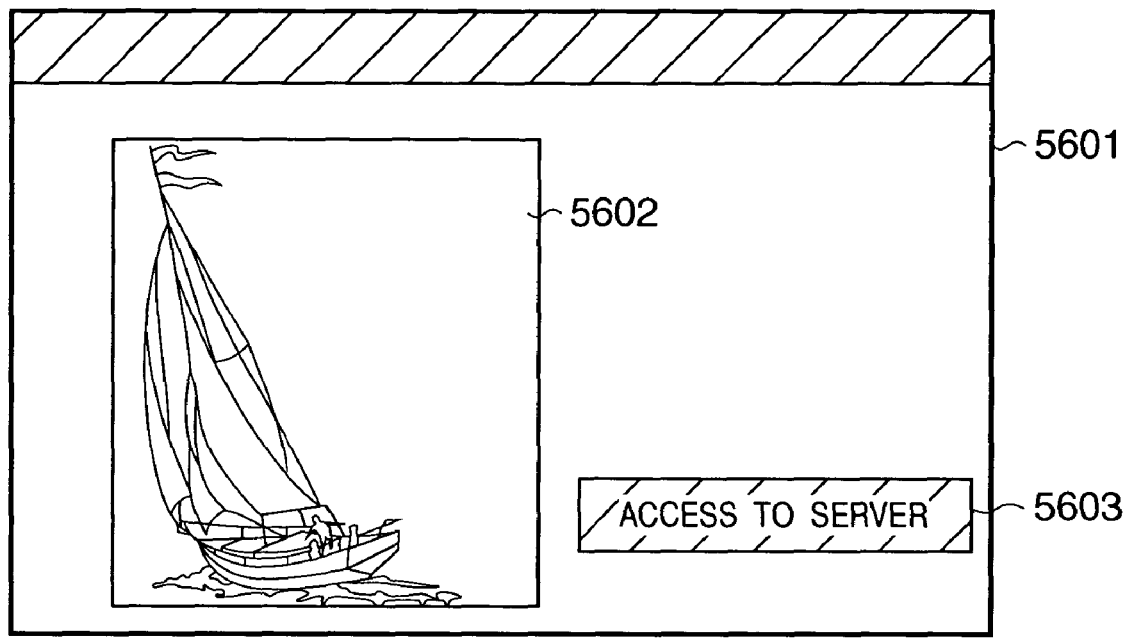
FIG. 41 shows an example of an interface to a client program.

FIG. 41 shows an example of a graphical user interface for the presentation of the replicated-image file d111 and the request operation. In this example, the graphical user interface 5601 of the image communication client program p111 presents the content of the replicated-image file d111 in the image display area 5602. When the user pushes the button 5603, the operation triggers the issuance of the request to the server.

Figure 42:
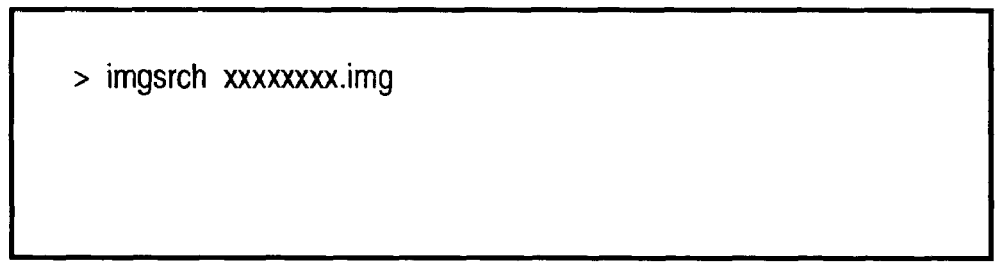
FIG. 42 shows an example of an interface to a client program.

FIG. 42 shows an example of a character-based version, such as a command line, of the user interface for the presentation of the replicated-image file d111 and triggering the initiation of a request process. In FIG. 42, the character string "imgsrch" is a command for activating the client program p111. Activation of the client program initiates the request. "xxxxxxxx.img" is the name of the replicated-image file d111 and is equivalent to a filename in MS-DOS and UNIX systems. The name is provided as an argument of the command "imgsrch" to specify the replicated-image file d111 as the file to be requested.

Figure 38:
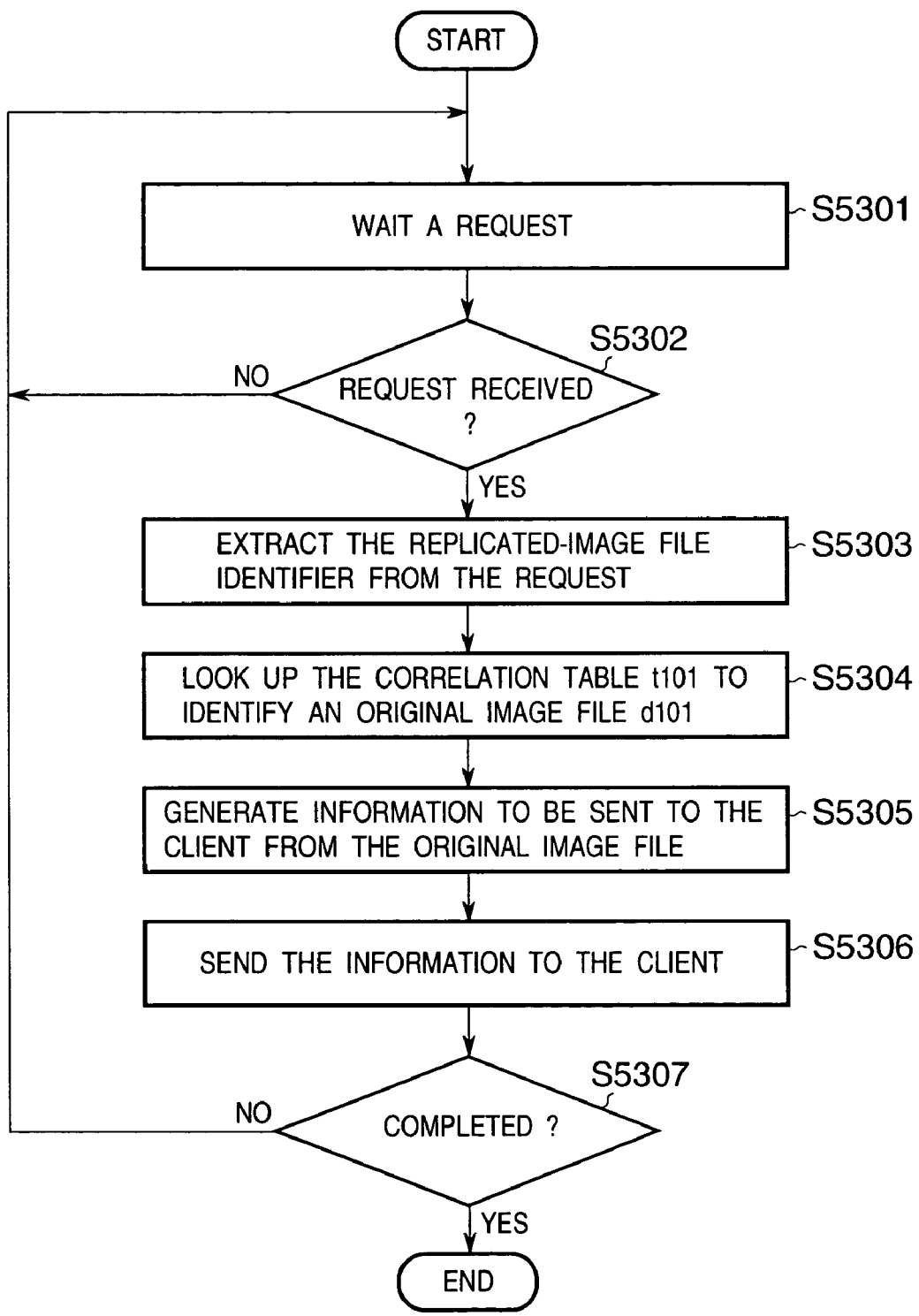
FIG. 38 shows a process flow of a server program according to the seventh embodiment.

FIG. 38 shows a process flow of the image communication server program p101.

After being activated, the image communication server program p110 waits for a request from a client program (for example, image communication client program p111) (S5301) Upon receiving the request (S5302), the server program extracts the identifier of the replicated image file d111 from the request (S5303). The server program p110 then looks up the correlation table t101 to identify an original image d101 that correlates with the replicated-image file identifier (S5304). Then, the server program p110 generates information relating to the original image file d101 (S5305) and sends it to the image communication client p111 (S5306).

At step S5307, it is determined whether the process by the server program has completed or not. Usually, the determination by the server program at step S5307 is false and the process returns to the step S5301 and wait for a further request.

The information relating to the original image file d101 is, for example:
- information about the method for capturing or generating the digital data. (File source)
- information about the copyright (Intellectual property)
- information about the content of the image (a person or location in the image) (Content description)
- information about the camera used to capture the image (Camera information)
- information about the settings of the camera when capturing the image (exposure, shutter speed, focal length, use of flash, etc.) (Per picture camera setting)
- information about a resolution specific to the digital camera or a mosaic filter (Digital camera characterization)
- the manufacturer name, product name, and type (negative/positive, color/monochrome) of the film (Film description)
- if the original image is a publication or print, information about the type and size of it (Original document scan description)
- if the image is a scanned image, information about the scanner and software used and the operator (Scan device)
- a keyword or other information added to the original image file 101

This information is contained in the original image file of the embodiment as non-image information. The information is extracted by the image communication server 5101 from the original image file d101 in response to a request from the image communication client 5111 and sent back to the image communication client 5111.

As described above, the image communication server 5101 is easily accessed by using the replicated-image file d111 having replicated-image identifier to extract information about the original image file d101.

The technology for embedding identifier information in a replicated image as described in the embodiment can be applied to a mosaic image generation. That is a database of a material image is provided on the server and a replicated image of the material image is distributed to the client. An identifier is embedded in the distributed replicated image of the material image. The replicated image distributed may be a scale-down image rather than a simple replication of an original image. Whenever the server generates a replicated image, it updates the table of correlation between the identifier added to the replicated image and the original image. The client generates positioning information of a material image from the distributed replicated image of the material image and a original image which is separately provided. The positioning information contains the replicated image including the identifier of the material, and its position. When the server receives the positioning, it retrieves a material image associated with the identifier embedded in the replicated image from its database. Then, it positions the retrieved material image to create a mosaic image.

Alternately, the database of material images may be provided on the client and the replicated images of the material images may be on the server. In such a case, an original image is sent to the server and the server generates positioning information of a mosaic image based on the replicated image. The positioning information is sent to the client. The positioning information includes the replicated image in which its identifier is embedded, and its positioning information. The client obtains the material image from its database based on the positioning information to create the mosaic image.

Thus, according to the embodiment, the machine that has a replicated image of a material image or its user does not require to manage its identifier even if a mosaic image is created.

(Variation 1 of Seventh Embodiment)

At step S5305 in FIG. 38, a second replicated-image file that is a replication of the whole or a part of the original image file d101 may be generated, and, at step S5306, sent back to the client program p111.

(Variation 2 of Seventh Embodiment)

In the variation 2 of the seventh embodiment, an image file of a multi-frame format such as a Tiff format is used as an original image file d101 in the variation 1 of the embodiment. In multi-frame formats like a Tiff format, a replicated data of a image is created from one or more than one item of frame image data contained in its original image file. The format of the replicated-image file d111 or a second replicated-image file is not required to be the same as that of its original image file d101.

(Variation 3 of Seventh Embodiment)

Figure 39:
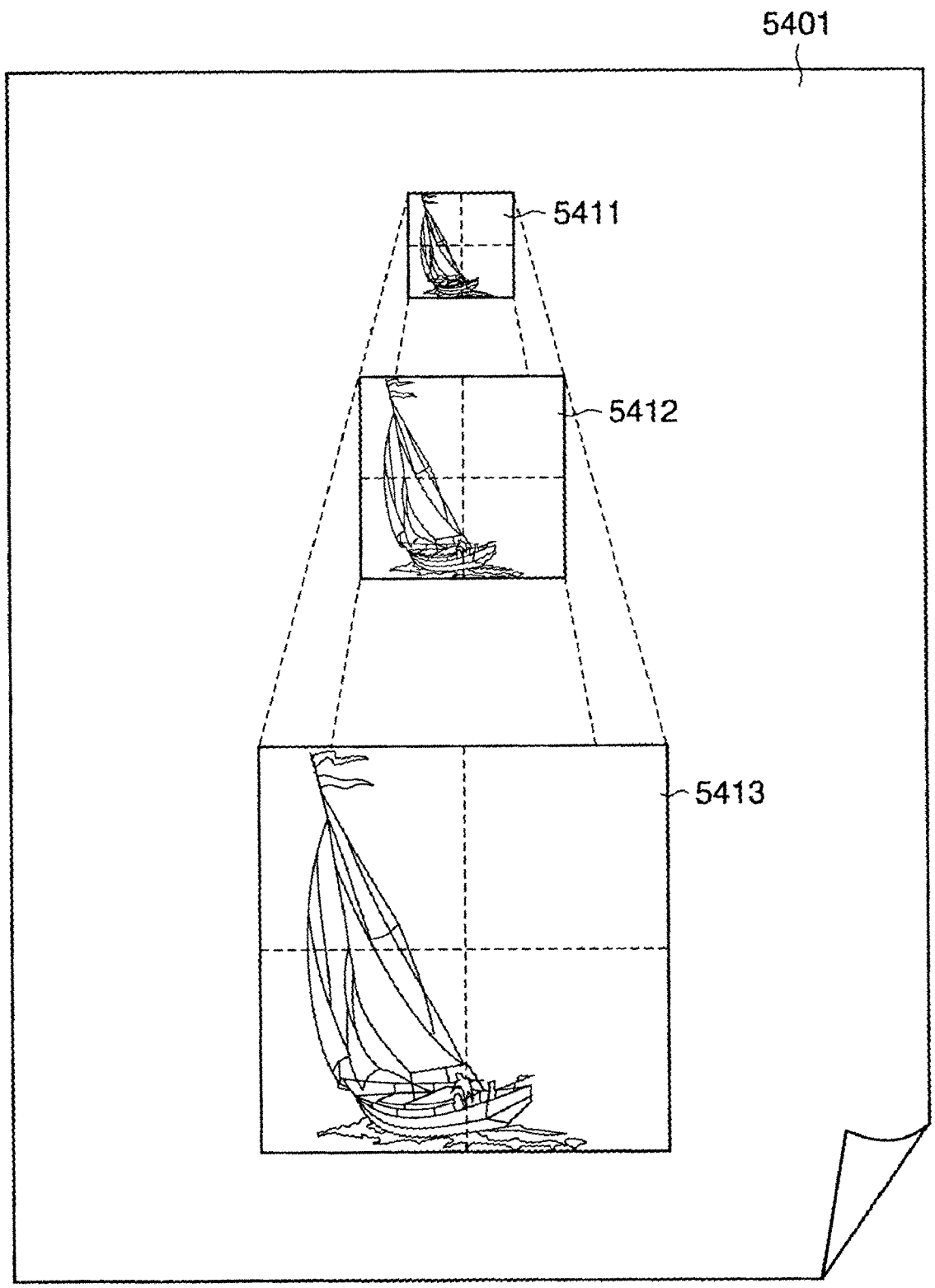
FIG. 39 shows a conceptual view of an image file including multilevel images having different resolutions.

FIG. 39 shows the concept of a multilevel image file that has a plurality of the same images of different resolutions, such as the FlashPix format. In FIG. 39, three items of image data 5411, 5412, and 5413 which represent the same image of three different resolution are contained in a single image file 5401.

In variation 1 of the seventh embodiment, a multilevel image file that has image data of different resolutions for one image as shown in FIG. 39 can be used as an original image file d101. In such a case, a replicated-image file d111 may be generated from image data of any of the resolutions contained in the original image file d101. The format of the replicated-image file or a second replicated-image data file does not required to be the same as that of the original image file d101.

Thus, a reduced amount of image data can be delivered to the client by using a low-resolution image data as a replicated image data without image compression.

(Variation 4 of Seventh Embodiment)

In variation 1 of the seventh embodiment, a multilevel image file in which each level holds image data may be used as an original image file d101. This type of image files includes, for example, an image file of a progressive JPEG image coding defined in ISO/IEC 10918 and an image file of JBIG image coding defined ISO/IEC 11544. A replicated-image file d111 may be any image file that is generated from image data enough to form an image of any level of the original file d101. The format of the replicated-image file d111 or a second replicated-image file does not required to be the same as the original image file d101. This allows difference information to be retrieved which required to create image data of another resolution based on image data of a resolution provided to the client. As described above, according to the variation of the embodiment, an identifier is embedded in a replicated-image file created from the whole or a part of an original image file on the image communication server and the correlation between the identifier and the original image is kept on the server. This allows a image communication client that has the replicated-image file to retrieve easily the original image on the image communication server based on the replicated-image file.

Eighth Embodiment

In the eighth embodiment, the original file d101 is an image file, for example a weather image sent by a meteorological satellite, that is updated automatically or manually over time.

Figure 43:
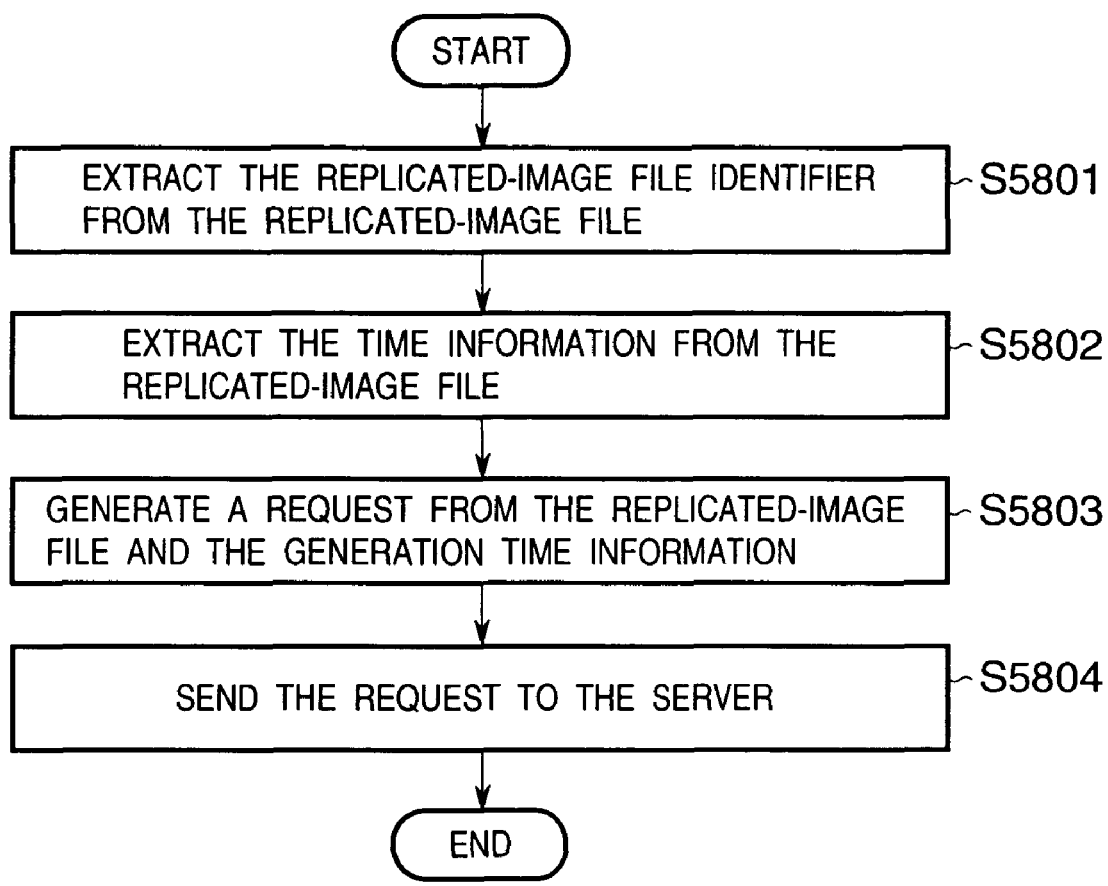
FIG. 43 shows a process flow of a client program according to the eighth embodiment.

FIG. 43 shows a process flow of an image communication client program. In FIG. 43, step S5802 is added to the process by the image communication client program of the seventh embodiment described in FIG. 37.

In FIG. 43, after an identifier is extracted from a replicated-image file d111 at step S5801, generation time information is extracted from the replicated-image file (S5802). The generation time information represents the time the replicated-image file d111 is generated from an original image file d101 and may be the time stamp of the replicate-image file d111. If the format of the image file contains a field of image file generation time as in the. FlashPix format, the field may be referenced to. If, at step S5502 in FIG. 40 an image replication program embedded in the identifier information about the time the image was replicated, at step S5802 the time information is extracted from the replicated-image file identifier extracted step S5801.

Next, a request is generated from the replicated-image file identifier and the information about the time when replicated-image file is generated (S5803) and sent to the image communication server 5101 (S5804).

Figure 44:
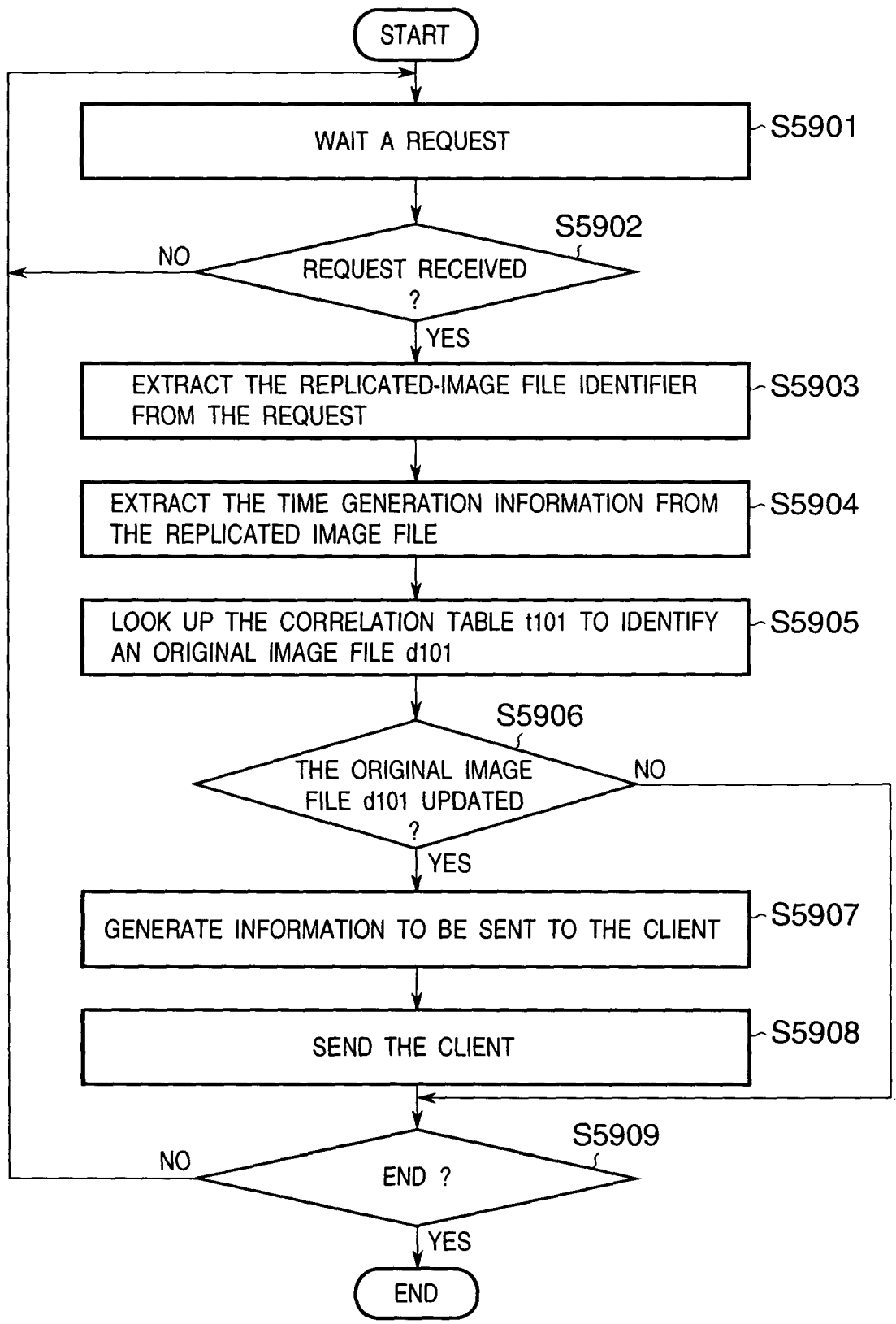
FIG. 44 shows a process flow of a server program according to the eighth embodiment.

FIG. 44 shows a process flow of an image communication server program.

In FIG. 44, steps S5904 and S5906 are added to the process by the image communication server program shown in FIG. 38.

In FIG. 44, a request from the image communication client program is received (S5901, S5902), a replicated-image identifier is extracted from the request at step S5903, then generation time information is extracted from the replicated-image file (S5904).

Next, an original image of the replicated-image file received with the request is identified based on the identifier (S5905). Information about the time when the original image file is generated is extracted from, for example, from the time stamp of the original image or a predetermined field depending on the format of the original image, and compared with the generation time information of the replicated-image file extracted earlier to determine whether the original image file was updated after the replicated-image file was generated (S5906).

If the determination of the comparison at step S5906 indicates that the original image file was updated after the replication, at step S5907 information to be sent to the image communication client, for example a new replicated-image file and its identifier, is generated. The generated information is sent to the client 5111 at step S5908. On the other hand, if the determination at step S5906 indicates that the original image was not updated, the process proceeds to the step S5909 to determine whether the process is completed.

Thus, in addition to the effects of the seventh embodiment, according to the eighth embodiment, a replicated image to be provided to the client can easily be updated in case that the original image was updated.

The first to seventh embodiments may be applied to a system comprised of more then one components (for example, a host computer, interface apparatus, reader, and printer) or a system comprising one apparatus (for example, a copier or a facsimile).

The objectives of the present invention can be achieved by providing a storage medium on which software program code is recorded which implement the functionality of the embodiments described above to a system or apparatus, and causing a computer (or a central processing unit or a micro processing unit) system or apparatus of the system or apparatus to read and execute the program code stored in the recording media. The program code recorded on the storage medium is a code for implementing the processes shown in FIGS. 3, 8 to 10, 13, 15 to 17, 19, 21 to 23, 30, 33 to 34, 37 to 38, 40, and 43 to 44 with the CPU.

The program code itself implements the functionality of the embodiments described above, and the storage medium on which the program code is stored constitutes the present invention.

The storage medium for providing the program code may be, for example, a floppy disk, hard disk, optical disk, magneto-optical disk, CD-ROM, CD-R, magnetic tape, non-volatile memory card, and ROM.

The present invention also includes implementation in which, besides the functionality of the embodiments described above being achieved by the execution of the program code read by a computer, an operating system (OS) and the like running on the computer performs all or part of the actual process and the process implements the functionality of the embodiments described above based on the instruction of the program code.

In addition, the present invention includes implementation in which the program code read from the storage medium is written into memory provided in an extender board inserted in a computer or an extension unit connected a computer, then a CPU or other components provided in the extender board or extension unit performs all or part of the actual process based on the instruction of the program code, and the functionally of the embodiments described above is achieved by the process.

What is claimed is:

1. An image processing system comprising:
   an image processing apparatus, which combines material images to generate a mosaic image in imitation of an original image;
   an image storage apparatus; and
   a communication channel between the image processing apparatus and the image storage apparatus;
   wherein the image processing apparatus includes:
      means for holding color information of each of a plurality of material images, the color information corresponding respectively to the plurality of material images, and the color information being retrieved from the image storage apparatus;
      receiving means for receiving the color information corresponding to the plurality of material images from the image storage apparatus;
      division means for dividing the original image into a plurality of blocks;
      selection means for selecting subsets of the material images out of the plurality of material images such that each subset of the material images has color information similar to color information of a corresponding block of the plurality of divided blocks based on the color information of each of the plurality of material images and the color information of each of the plurality of divided blocks;
      first output means for outputting identifications of the subsets of the material images selected by the selection means to the image storage apparatus via the communication channel; and
      combining means for combining material images,
   wherein the image storage apparatus includes:
      storage means for storing the plurality of material images; and
      second output means for outputting the subsets of the material images selected by the selection means out of the plurality of material images stored in the storage means according to the identifications of the subsets of the material images output by the first output means via the communication channel,
   wherein the combining means combines the subsets of the material images output by the second output means, and
   wherein the image processing apparatus receives the subsets of the material images selected by the selection means from the image storage apparatus by the receiving means and arranges the subsets of the material images received by the receiving means according to the positions selected by the selection means to form a mosaic image.

2. The system according to claim 1, wherein the color information corresponding to the plurality of material images is obtained from a plurality of scale-down images or a plurality of image characteristic parameters corresponding to the plurality of material images.

3. The system according to claim 1, wherein the receiving means receives the color information corresponding to the plurality of material images during activation of the image processing system.

4. The system according to claim 1, wherein the storage means stores the plurality of material images by dividing the plurality of material images into a plurality of groups, and the selection means selects the subsets of the material images according to the color information corresponding to a plurality of material images contained in a selected group.

5. The system according to claim 1, wherein the receiving means receives a mosaic image generated by the first output means.

6. The system according to claim 1, wherein a plurality of the image processing apparatus are provided and the image storage apparatus can be shared between the plurality of image processing apparatus.

7. An image processing apparatus that combines a plurality of material images to generate a mosaic image in imitation of an original image, comprising:
   holding means for holding color information of each of a plurality of material images, the color information corresponding respectively to the plurality of material images and the color information being retrieved from an image storage apparatus;
   receiving means for receiving the color information corresponding to the plurality of material images from the image storage apparatus;
   division means for dividing the original image into a plurality of blocks;
   selection means for selecting subsets of the material images out of the plurality of material images, each subset of the material images being associated with each of the plurality of blocks divided from the original image, such that each subset of the material images has color information similar to color information of a corresponding block of the plurality of divided blocks;
   first output means for outputting identifications for each of the subsets of material images associated with each of the plurality of blocks divided from the original image to the image storage apparatus via a communication channel between the image processing apparatus and the image storage apparatus; and means for combining the subsets of material images output by the image storage apparatus that outputs the material images corresponding to the identifications output by the first output means, wherein the image processing apparatus retrieves the selected material images determined by the selection means from the image storage apparatus by the receiving means and arranges the selected material images received by the receiving means.

8. An image processing system comprising:

an image processing apparatus according to claim 7; and the image storage apparatus, wherein the image storage apparatus includes:
storage means for storing the plurality of material images; and
second output means for outputting the selected material images selected by the selection means out of the plurality of material images stored in the storage means according to the identifications of the selected material images output by the first output means.

9. The image processing apparatus according to claim 7, wherein the color information corresponding to the plurality of material images is obtained from a plurality of scale-down images or a plurality of image characteristic parameters corresponding to the plurality of material images.

10. The image processing apparatus according to claim 7, wherein the receiving means receives the color information corresponding to the plurality of material images during activation of an image processing system.

11. The image processing system according to claim 8,
wherein the image storage means stores the plurality of material images by dividing the plurality of material images into a plurality of groups, and
wherein the selection means selects the subsets of material images according to the color information corresponding to a plurality of material images contained in a selected group.

12. The system according to claim 8, wherein a plurality of the image processing apparatus are provided and the image storage apparatus can be shared between the plurality of image processing apparatus.

13. An image processing apparatus that combines a plurality of material images to generate a mosaic image in imitation of an original image, comprising:

holding means for holding color information of each of a plurality of material images, the color information corresponding respectively to the plurality of material images and the color information being retrieved from an image storage apparatus;

receiving means for receiving the color information corresponding to the plurality of material images from the image storage apparatus;

division means for dividing the original image into a plurality of tiles;

selection means for selecting subsets of the material images out of the plurality of material images, each subset of the material images being for each of the plurality of tiles divided from the original image, such that each of subset of the material images has color information similar to color information of a corresponding divided tile of the plurality of divided tiles;

first output means for outputting identifications for each of the subsets material images associated with each of the plurality of tiles divided from the original image to the image storage apparatus via a communication channel between the image processing apparatus and the image storage apparatus; and means for combining the subsets of material images output by the image storage apparatus that outputs the material images corresponding to the identifications output by the first output means, wherein the image processing apparatus retrieves the selected material images determined by the selection means from the image storage apparatus by the receiving means and arranges the selected material images received by the receiving means.

* * * * *